US012234592B2

(12) United States Patent
Park et al.

(10) Patent No.: US 12,234,592 B2
(45) Date of Patent: Feb. 25, 2025

(54) WASHING MACHINE AND METHOD OF CONTROLLING THE SAME, AND CONTROL PANEL OF THE SAME

(71) Applicant: Samsung Electronics Co., Ltd., Suwon-si (KR)

(72) Inventors: Haeyoon Park, Suwon-si (KR); Bobin Kim, Suwon-si (KR); Jihoon Park, Suwon-si (KR); Romon Son, Suwon-si (KR); Cheolmin Yeom, Suwon-si (KR); Tallae Lee, Suwon-si (KR); Joonho Lee, Suwon-si (KR); Kyoungae Lim, Suwon-si (KR); Jeongwon Hahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1035 days.

(21) Appl. No.: 17/185,123

(22) Filed: Feb. 25, 2021

(65) Prior Publication Data

US 2021/0269959 A1 Sep. 2, 2021

(30) Foreign Application Priority Data

Feb. 28, 2020 (KR) ........................ 10-2020-0025350

(51) Int. Cl.

*D06F 34/05* (2020.01)
*D06F 34/04* (2020.01)

(Continued)

(52) U.S. Cl.

CPC .............. *D06F 34/05* (2020.02); *D06F 34/04* (2020.02); *D06F 34/20* (2020.02); *D06F 34/28* (2020.02);

(Continued)

(58) Field of Classification Search

CPC ...................................................... D06F 34/05

See application file for complete search history.

(56) References Cited

U.S. PATENT DOCUMENTS

| | | | |
|---|---|---|---|
| 2005/0138835 | A1 | 6/2005 | Lyu et al. |
| 2010/0011609 | A1 | 1/2010 | Park et al. |
| 2020/0024784 | A1 | 1/2020 | Yoon et al. |

FOREIGN PATENT DOCUMENTS

| | | | |
|---|---|---|---|
| EP | 1 548 174 | A1 | 6/2005 |
| EP | 3 348 704 | A1 | 7/2018 |

(Continued)

OTHER PUBLICATIONS

European Search Report dated May 30, 2023, issued in European Application No. 21761470.0.

(Continued)

*Primary Examiner* — Jason Y Ko
(74) *Attorney, Agent, or Firm* — Jefferson IP Law, LLP

(57) ABSTRACT

A washing machine capable of communicating with a drying machine, and a method therefor are provided. The washing machine includes a communication circuitry configured to exchange data with an external device including a drying machine, a control panel including a dedicated button configured to obtain a user input for activating or deactivating a common function common with the drying machine, and at least one processor configured to, in response to obtaining the user input for activating the common function through the dedicated button, control the communication circuitry to activate the common function and transmit a communication signal for activating the common function to the drying machine, such that even if the drying machine is installed on the washing machine, the user may operate the drying machine without inconvenience.

19 Claims, 28 Drawing Sheets

(51) Int. Cl.

| | |
|---|---|
| ***D06F 34/20*** | (2020.01) |
| ***D06F 34/28*** | (2020.01) |
| ***G08C 17/02*** | (2006.01) |
| ***G08C 19/00*** | (2006.01) |
| *D06F 103/40* | (2020.01) |
| *D06F 105/58* | (2020.01) |

(52) U.S. Cl.
CPC ............. *G08C 17/02* (2013.01); *G08C 19/00* (2013.01); *D06F 2103/40* (2020.02); *D06F 2105/58* (2020.02)

(56) References Cited

FOREIGN PATENT DOCUMENTS

| | | | |
|---|---|---|---|
| JP | 6253237 | B2 | 12/2017 |
| JP | 6490887 | B2 | 3/2019 |
| KR | 10-2001-0113346 | A | 12/2001 |
| KR | 10-2002-0047634 | A | 6/2002 |
| KR | 10-2003-0054235 | A | 7/2003 |
| KR | 10-2007-0003312 | A | 1/2007 |
| KR | 10-0674718 | B1 | 1/2007 |
| KR | 10-0707451 | B1 | 4/2007 |
| KR | 10-2013-0085276 | A | 7/2013 |
| KR | 10-2013-0090252 | A | 8/2013 |
| KR | 10-2014-0032262 | A | 3/2014 |
| KR | 10-0347939 | B1 | 8/2020 |

OTHER PUBLICATIONS

Samsung Electronics Co., Ltd., 'Grande AI' 'Washer?Dryer Release', Samsung Newsroom [Online], Jan. 29, 2020 [retrieved May 20, 2021].

International Search Report dated Jun. 22, 2021, issued in International Patent Application No. PCT/KR2021/002475.

WASHING MACHINE AND METHOD OF CONTROLLING THE SAME, AND CONTROL PANEL OF THE SAME

CROSS-REFERENCE TO RELATED APPLICATION(S)

This application is based on and claims priority under 35 U.S.C. § 119 of a Korean patent application number 10-2020-0025350, filed on Feb. 28, 2020, in the Korean Intellectual Property Office, the disclosure of which is incorporated by reference herein in its entirety.

BACKGROUND

1. Field

The disclosure relates to a washing machine. More particularly, the disclosure relates to a washing machine capable of communicating with a drying machine.

2. Description of Related Art

In general, a washing machine is an apparatus configured to wash laundry inside of a tub by rotating a drum rotatably installed in the tub to accommodate the laundry. The washing machine may perform a washing process using water to separate pollutants from the laundry, a rinsing process rinsing the laundry, and a dehydrating process removing water from the wet laundry.

In addition, a drying machine may include a drum that is rotatably installed, and may dry an object to be dried (laundry) by injecting high-temperature dry hot air into the drum while the drum is rotating. The drying machine may perform a drying process for drying the object to be dried.

Recently, the drying machine having a heat pump and operating only with electricity has been commercialized. As a result, restrictions on installing the drying machine have been reduced, and the number of households equipped with the washing machine with the drying machine is increasing.

For example, the drying machine may be placed side by side (horizontally) with the washing machine, or may be placed at the same position of the washing machine.

When the drying machine is placed side by side with the washing machine, a user may immediately put the washed laundry into the drying machine. However, because the drying machine is arranged side by side with the washing machine, a space occupied by the drying machine and the washing machine increases.

When the drying machine is placed on top of the washing machine, the user may immediately put the laundry into the drying machine, and the space occupied by the drying machine may be reduced similarly to using only the washing machine.

However, when the drying machine is placed on top of the washing machine, a control panel of the drying machine is located at a high position, thus the user has inconvenience in operating the drying machine.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a washing machine capable of controlling a drying machine using a control panel of the washing machine, and a method of controlling the washing machine.

Another aspect of the disclosure is to provide a washing machine capable of integrating a menu (or input button) for controlling common functions of the washing machine and a drying machine, and a method of controlling the washing machine.

Additional aspects will be set forth in part in the description which follows and, in part, will be apparent from the description, or may be learned by practice of the presented embodiments.

In accordance with an aspect of the disclosure, a washing machine is provided. The washing machine includes a communication circuitry configured to exchange data with an external device including a drying machine, a control panel including a dedicated button configured to obtain a user input for activating or deactivating a common function common with the drying machine, and at least one processor configured to, in response to obtaining the user input for activating the common function through the dedicated button, control the communication circuitry to activate the common function and transmit a communication signal for activating the common function to the drying machine.

In accordance with another aspect of the disclosure, a method of controlling a washing machine operable to communicate with an external device including a drying machine is provided. The method includes, in response to obtaining a user input through a dedicated button provided on a control panel of the washing machine and configured to obtain the user input for activating or deactivating a common function common with the drying machine, activating, by at least one processor, the common function, and in response to obtaining the user input through the dedicated button, controlling a communication circuitry to transmit a communication signal for activating the common function to the drying machine.

In accordance with another aspect of the disclosure, a washing machine operable to communicate with an external device including a drying machine is provided. The washing machine includes a first control switch configured to obtain a user input for activating controlling the drying machine, a second control switching configured to obtain a user input for activating controlling the washing machine, a setting switch configured to obtain a user input for selecting a drying setting while controlling the drying machine is activated, and obtain a user input for selecting a washing setting while controlling the washing machine is activated, and a dedicated switch configured to obtain a user input for activating or deactivating a common function common with the drying machine.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
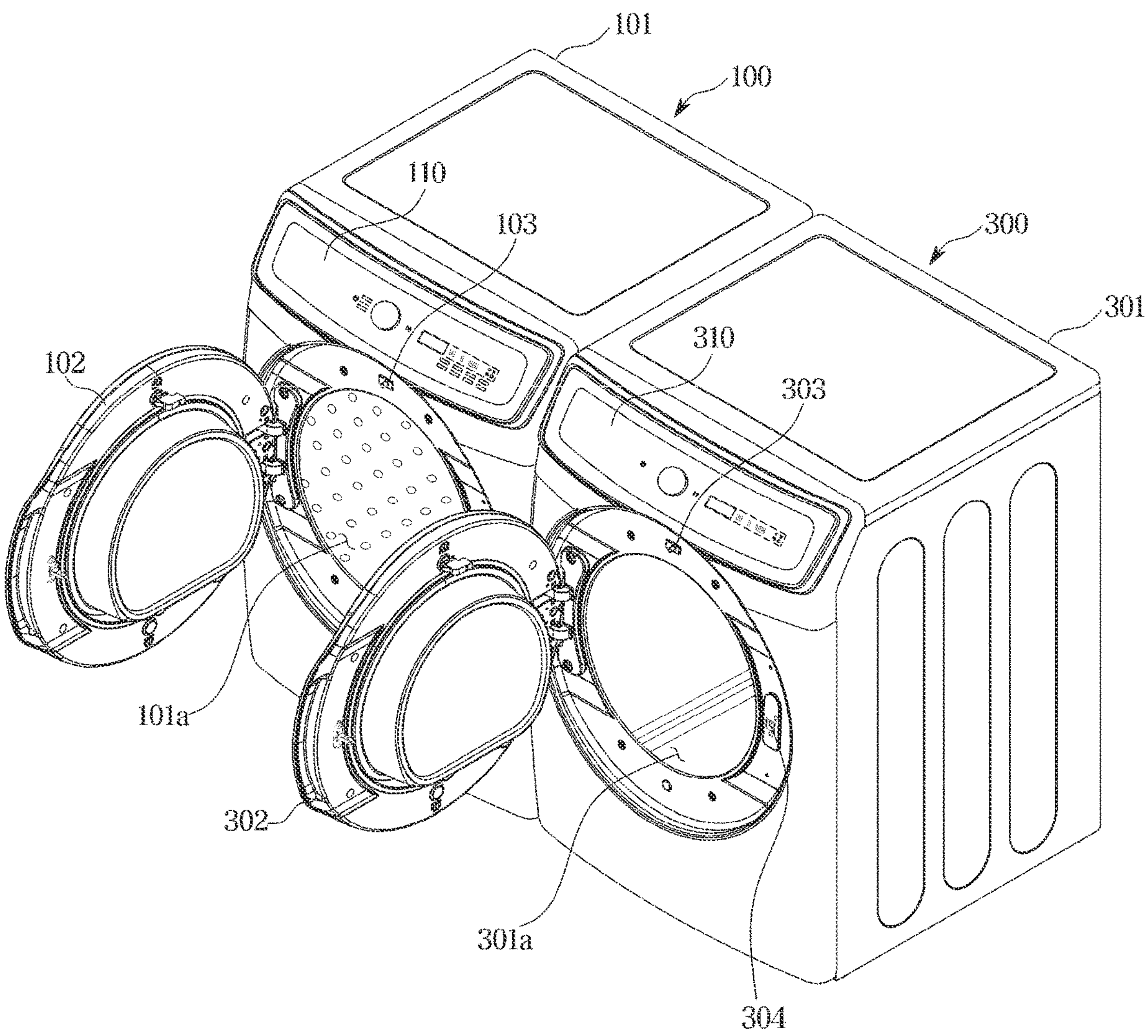
FIG. 1 is a view illustrating that a washing machine is arranged horizontally with a drying machine according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skill in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

It will be understood that, although the terms first, second, etc. may be used herein to describe various elements, these elements should not be limited by these terms. These terms are only used to distinguish one element from another. As used herein, the term “and/or,” includes any and all combinations of one or more of the associated listed items.

It will be understood that when an element is referred to as being “connected,” or “coupled,” to another element, it can be directly connected or coupled to the other element or intervening elements may be present. In contrast, when an element is referred to as being “directly connected,” or “directly coupled,” to another element, there are no intervening elements present.

The terminology used herein is for the purpose of describing particular embodiments only and is not intended to be limiting. As used herein, the singular forms “a,” “an,” and "the," are intended to include the plural forms as well, unless the context clearly indicates otherwise.

Reference will now be made in detail to the embodiments of the disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the operation principles and embodiments of the disclosure will be described with reference to the accompanying drawings.

Figure 2:
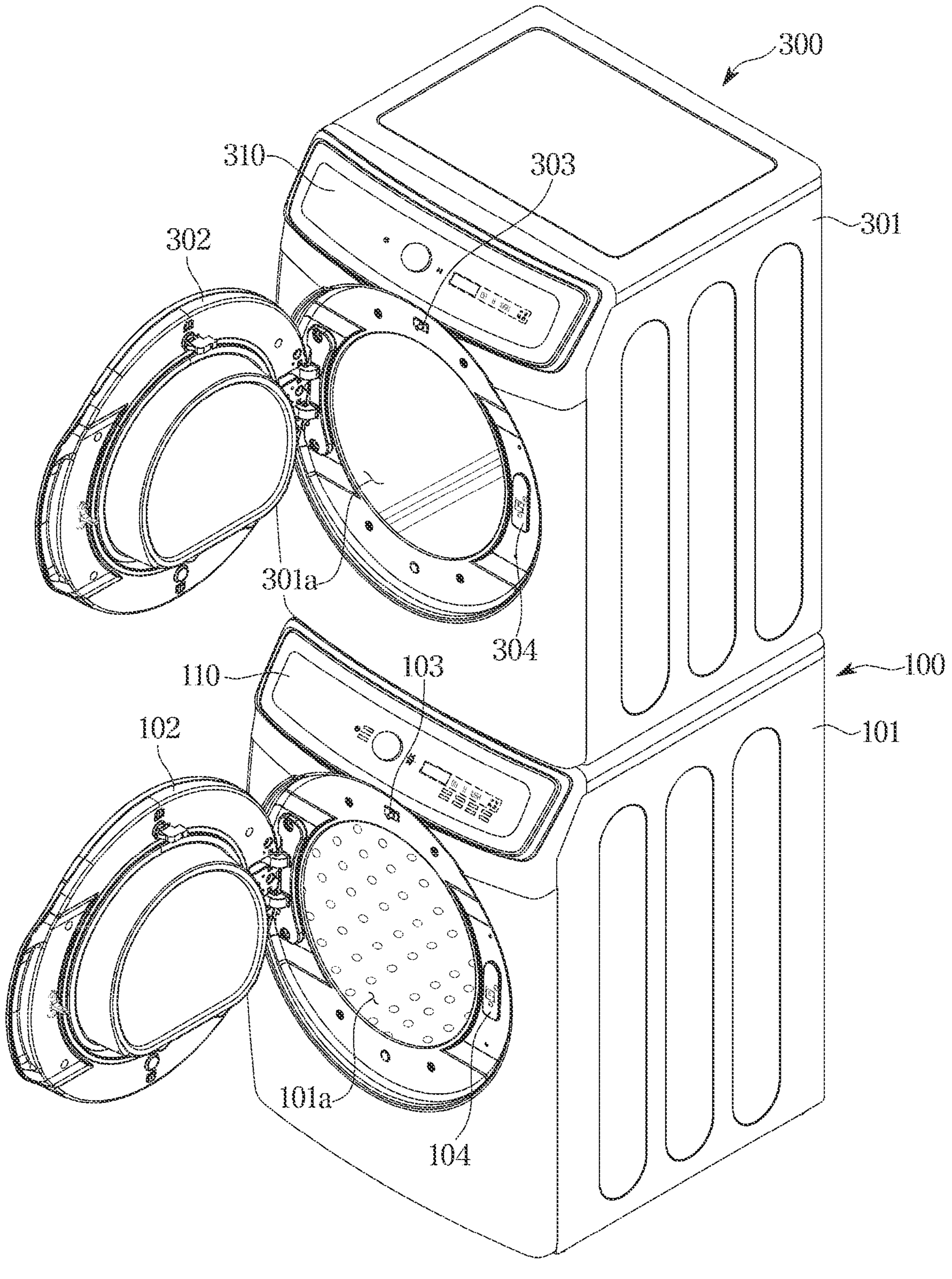
FIG. 2 is a view illustrating that a washing machine is arranged vertically with a drying machine according to an embodiment of the disclosure.

FIG. 1 is a view illustrating that a washing machine is arranged horizontally with a drying machine according to an embodiment of the disclosure. FIG. 2 is a view illustrating that a washing machine is arranged vertically with a drying machine according to an embodiment of the disclosure.

Referring to FIGS. 1 and 2, a washing machine 100 may be disposed adjacent to a drying machine 300. As such, because the washing machine 100 is disposed adjacent to the drying machine 300, a user may move laundry from the washing machine 100 to the drying machine 300 without lifting and moving the laundry.

As illustrated in FIG. 1, the washing machine 100 may be placed side by side (horizontally) with the drying machine 300. Because the washing machine 100 is placed side by side with the drying machine 300, the user may easily move the laundry from the washing machine 100 to the drying machine 300, as well as easily use a control panel of the washing machine 100 and a control panel of the drying machine 300. On the other hand, because the washing machine 100 is arranged side by side with the drying machine 300, the user's living space may be reduced.

Also, as illustrated in FIG. 2, the drying machine 300 may be disposed on the washing machine 100 (vertical). The washing machine 100 usually washes laundry (for example, clothes or shoes) using water, and thus a weight of the washing machine 100 may increase significantly during a washing operation. On the other hand, the drying machine 300 dries objects to be dried (e.g., clothing or shoes, etc.) using high-temperature dry hot air, so that a weight of the drying machine 300 does not change significantly during a drying operation. Thus, the relatively light drying machine 300 (during operation) may be placed on top of the washing machine 100.

Thus, because the drying machine 300 is disposed on top of the washing machine 100, a space occupied by the washing machine 100 and the drying machine 300 may be similar to a case where the washing machine 100 is used alone. In other words, the user's living space may not be significantly reduced due to the drying machine 300. However, because the drying machine 300 is placed on top of the washing machine 100, the control panel of the drying machine 300 is placed at a high position. As a result, some of the users may have difficulty using the control panel of the drying machine 300.

In order to prevent or reduce the user from having difficulty using the control panel of the drying machine 300 when the drying machine 300 is placed on top of the washing machine 100, or in order for the user to control the drying machine 300 and the washing machine 100 collectively when the drying machine 300 is placed side by side with the washing machine 100, the washing machine 100 may provide a user interface for controlling the drying machine 300 using the control panel of the washing machine 100. In other words, the user may control the drying machine 300 using the control panel of the washing machine 100.

In order for the washing machine 100 to provide the user interface for controlling the drying machine 300, the washing machine 100 may communicate with the drying machine 300 either by wire or wirelessly. For example, the washing machine 100 may not only obtain washing settings (e.g., washing temperature, number of rinsing times, dehydrating strength, etc.) for the washing operation from the user, but also obtain drying settings (e.g., degree of drying, additional time for preventing or reducing wrinkles, drying time, etc.) for the drying operation from the user. In addition, the washing machine 100 may transmit the drying settings obtained from the user to the drying machine 300 by wire or wirelessly, and the drying machine 300 may dry an object to be dried depending on the drying settings received from the washing machine 100.

Figure 3:
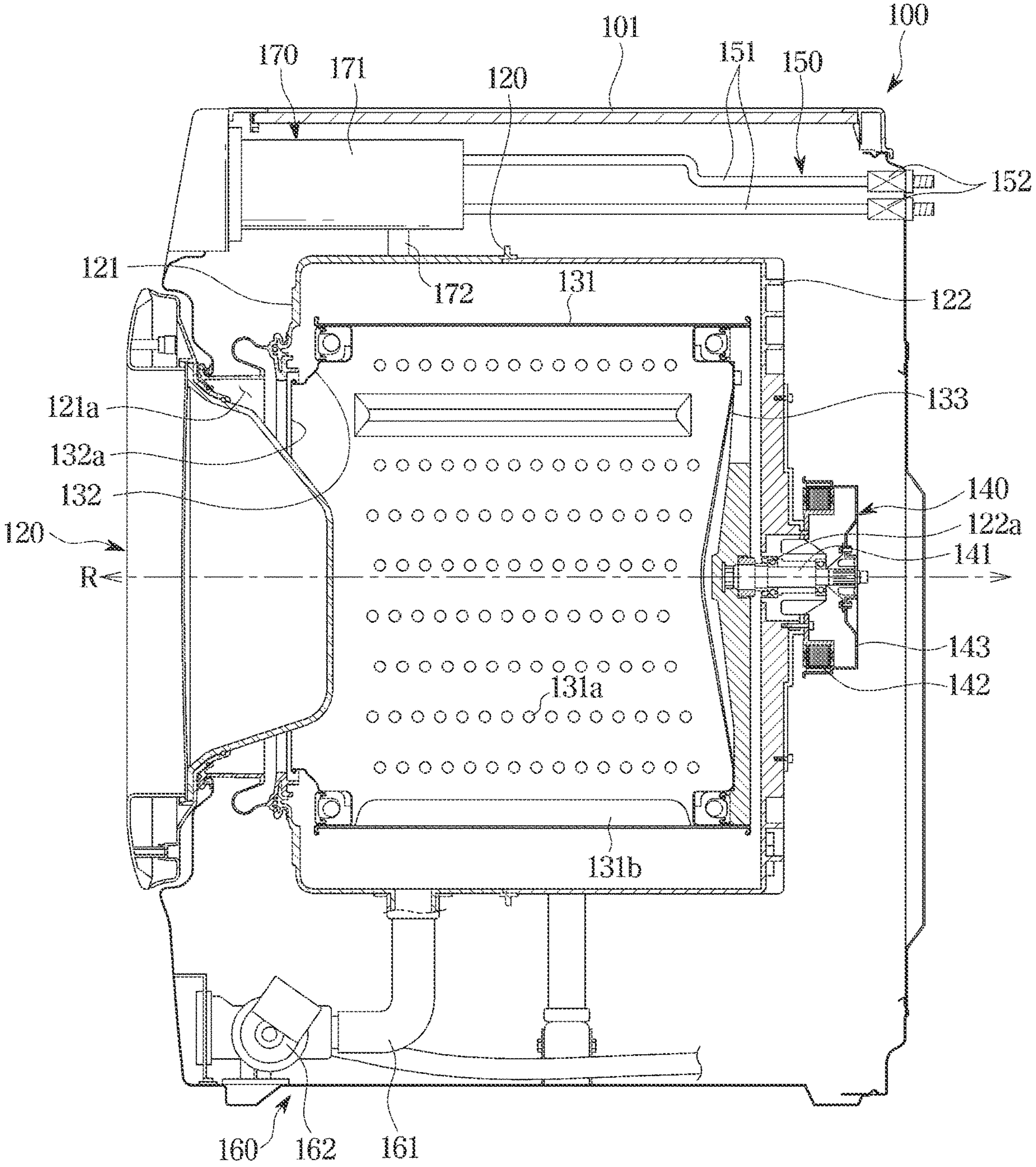
FIG. 3 is a view illustrating a side cross-section of a washing machine according to an embodiment of the disclosure.

FIG. 3 is a view illustrating a side cross-section of a washing machine according to an embodiment of the disclosure.

Referring to FIG. 3, a configuration of the washing machine 100 will be described with reference to FIG. 3 and FIGS. 1 and 2 described above.

The washing machine 100 may include a cabinet 101. In addition, the washing machine 100 may further include a door 102, a control panel 110, a tub 120, a drum 130, a drum motor 140, a water supplier 150, a water drain 160, and a detergent supplier 170 accommodated in the cabinet 101.

At the center of a front surface of the cabinet 101, an inlet **101*a*** may be formed to which laundry is put into or taken out of.

The door 102 may be provided in the inlet **101*a*. The door 102 is rotatably mounted to the cabinet 101** by a hinge.

The door 102 may open and close the inlet **101*a*. The closing of the inlet 101*a* by the door 102 may be detected by a door switch 103. When the inlet 101*a* is closed and the washing machine 100 is operated, the door 102 may be locked by a door lock 104**.

The control panel 110 including a display configured to display operation information of the washing machine 100 and a user inputter configured to obtain a user input for the washing machine 100 from the user may be provided on a front upper side of the cabinet 101. The control panel 110 will be described in more detail below.

The tub 120 may be provided inside the cabinet 101 and may accommodate water for washing and/or rinsing.

The tub 120 may include a tub front part 121 having an opening **121*a* formed at a front surface thereof, and a tub rear part 122** having a cylindrical shape with a closed rear surface thereof.

The front of the tub front part 121 is provided with the opening **121*a* for injecting laundry into the drum 130 provided in the tub 120 or withdrawing laundry from the drum 130**.

A rear wall of the tub rear part 122 is provided with a bearing **122*a* for rotatably fixing the drum motor 140**.

The drum 130 is rotatably provided in the tub 120 and may accommodate laundry.

The drum 130 may include a cylindrical drum body 131, a drum front part 132 provided at the front of the drum body 131, and a drum rear part 133 provided at the rear of the drum body 131.

The inner surface of the drum body 131 provides a through hole **131*a* connecting the inside of the drum 130 and the inside of the tub 120 and a lifter 131*b* for raising laundry to an upper portion of the drum 130 during the rotation of the drum 130. The drum front part 132 is provided with an opening 132*a* for injecting laundry into the drum 130 or withdrawing laundry from the drum 130. The drum rear part 133 may be connected to a shaft 141 of the drum motor 140 that rotates the drum 130**.

The drum motor 140 is provided outside the tub rear part 122 of the tub 120 and is connected to the drum rear part 133 of the drum 130 through the shaft 141. The shaft 141 penetrates the tub rear part 122 and is rotatably supported by the bearing 122*a* provided in the tub rear part 122.

The drum motor 140 includes a stator 142 fixed to the outside of the tub rear part 122, and a rotor 143 rotatably provided and connected to the shaft 141. The rotor 143 may rotate through magnetic interaction with the stator 142, and the rotation of the rotor 143 may be transmitted to the drum 130 through the shaft 141.

The drum motor 140 may include, for example, a Brushless Direct Current Motor (BLDC Motor) or a Permanent Synchronous Motor (PMSM).

The water supplier 150 is provided above the tub 120 and may supply water to the tub 120/the drum 130.

The water supplier 150 includes a water supply conduit 151 connected to an external water supply source for supplying water to the tub 120, and a water supply valve 152 provided on the water supply conduit 151.

The water supply conduit 151 may extend from the external water supply source to a detergent compartment 171 and guide water to the tub 120 via the detergent compartment 171.

The water supply valve 152 may allow or block the water supply from the external water source to the tub 120 in response to an electrical signal. The water supply valve 152 may include, for example, a solenoid valve that opens and closes in response to the electrical signal.

The water drain 160 is provided below the tub 120 and may discharge the water contained in the tub 120/the drum 130 to the outside.

The water drain 160 may include a drain conduit 161 extending from the tub 120 to the outside of the cabinet 101 and a drain pump 162 provided on the drain conduit 161. The drain pump 162 may pump water from the drain conduit 161 outside the cabinet 101.

The detergent supplier 170 may be provided at the upper side of the tub 120 and may supply detergent to the tub 120/the drum 130.

The detergent supplier 170 may include the detergent compartment 171 for storing the detergent and a mixing conduit 172 connecting the detergent compartment 171 with the tub 120.

The detergent compartment 171 is connected to the water supply conduit 151 and the water supplied through the water supply conduit 151 may be mixed with the detergent in the detergent compartment 171. The mixture of the detergent and water may be supplied to the tub 120 through the mixing conduit 172.

Figure 4:
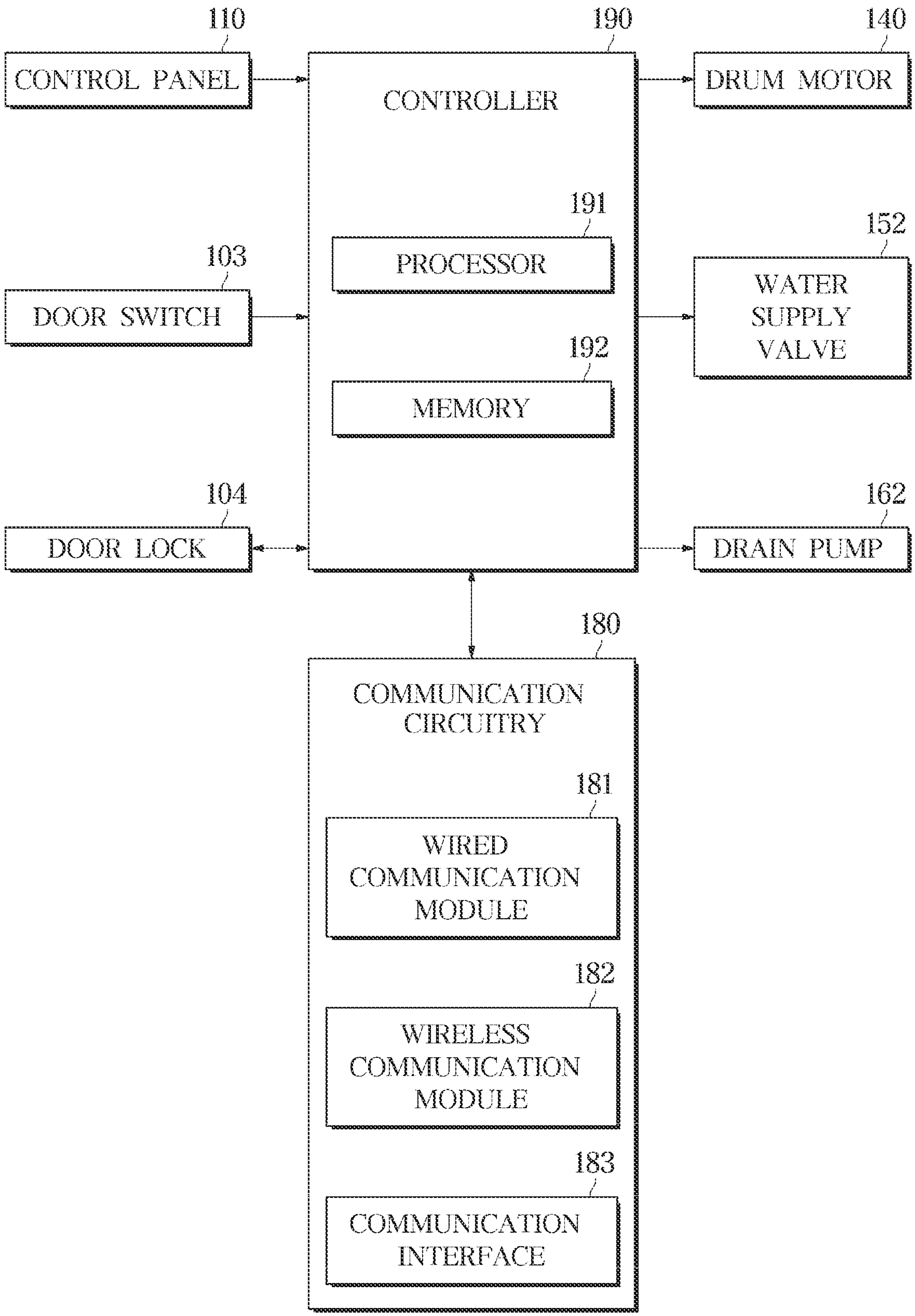
FIG. 4 is a view illustrating a configuration of a washing machine according to an embodiment of the disclosure.
Figure 5:
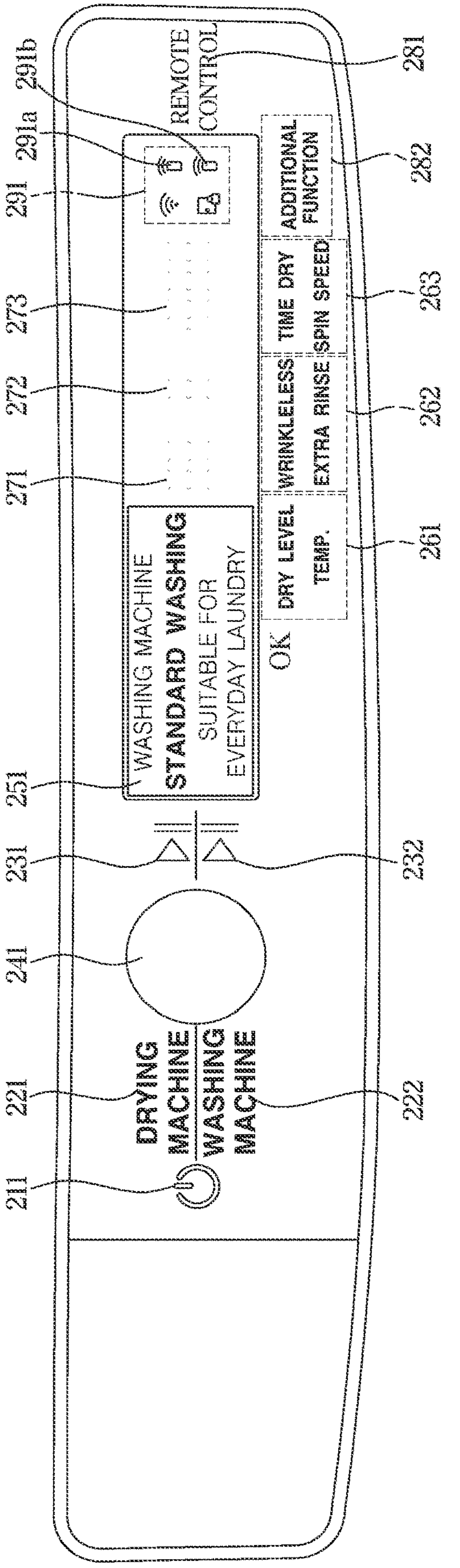
FIG. 5 is a view illustrating a control panel included in a washing machine according to an embodiment of the disclosure.
Figure 6:
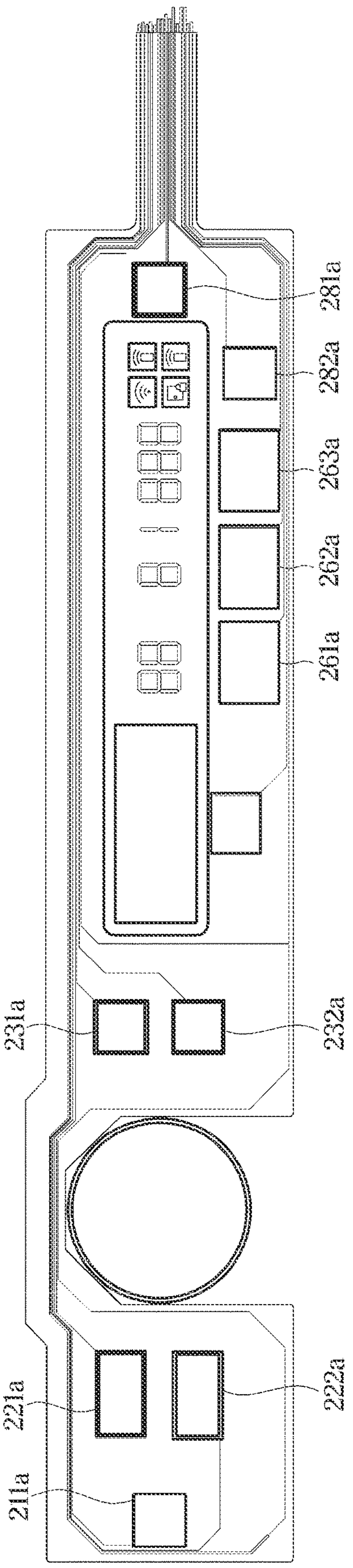
FIG. 6 is a view illustrating a touch panel of a control panel included in a washing machine according to an embodiment of the disclosure.
Figure 7:
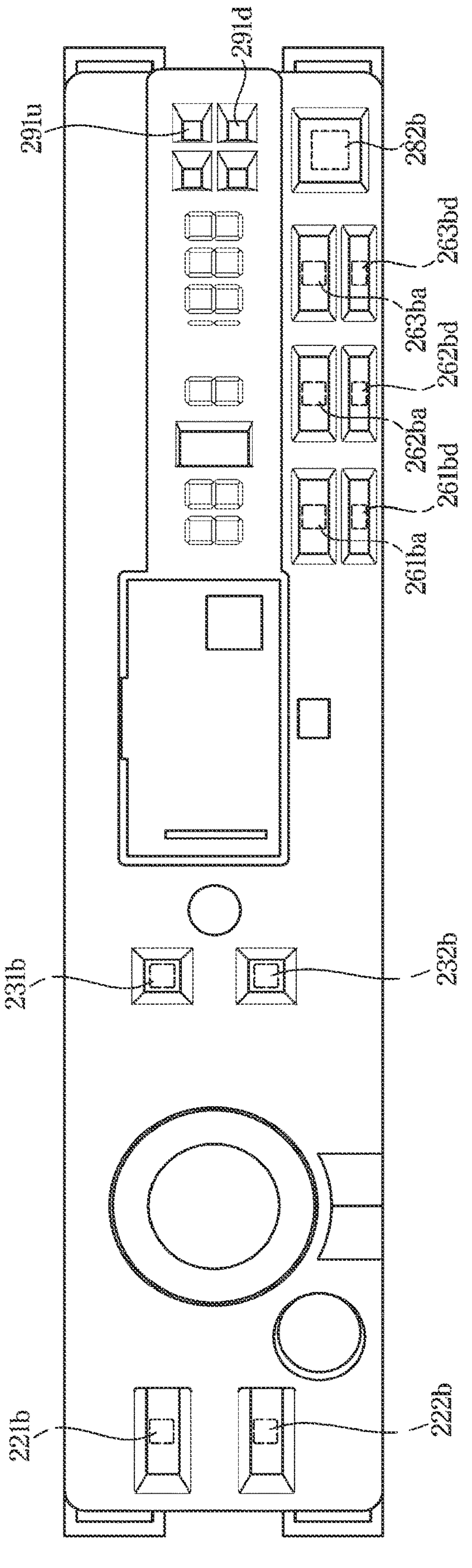
FIG. 7 is a view illustrating light sources of a control panel included in a washing machine according to an embodiment of the disclosure.
Figure 8:
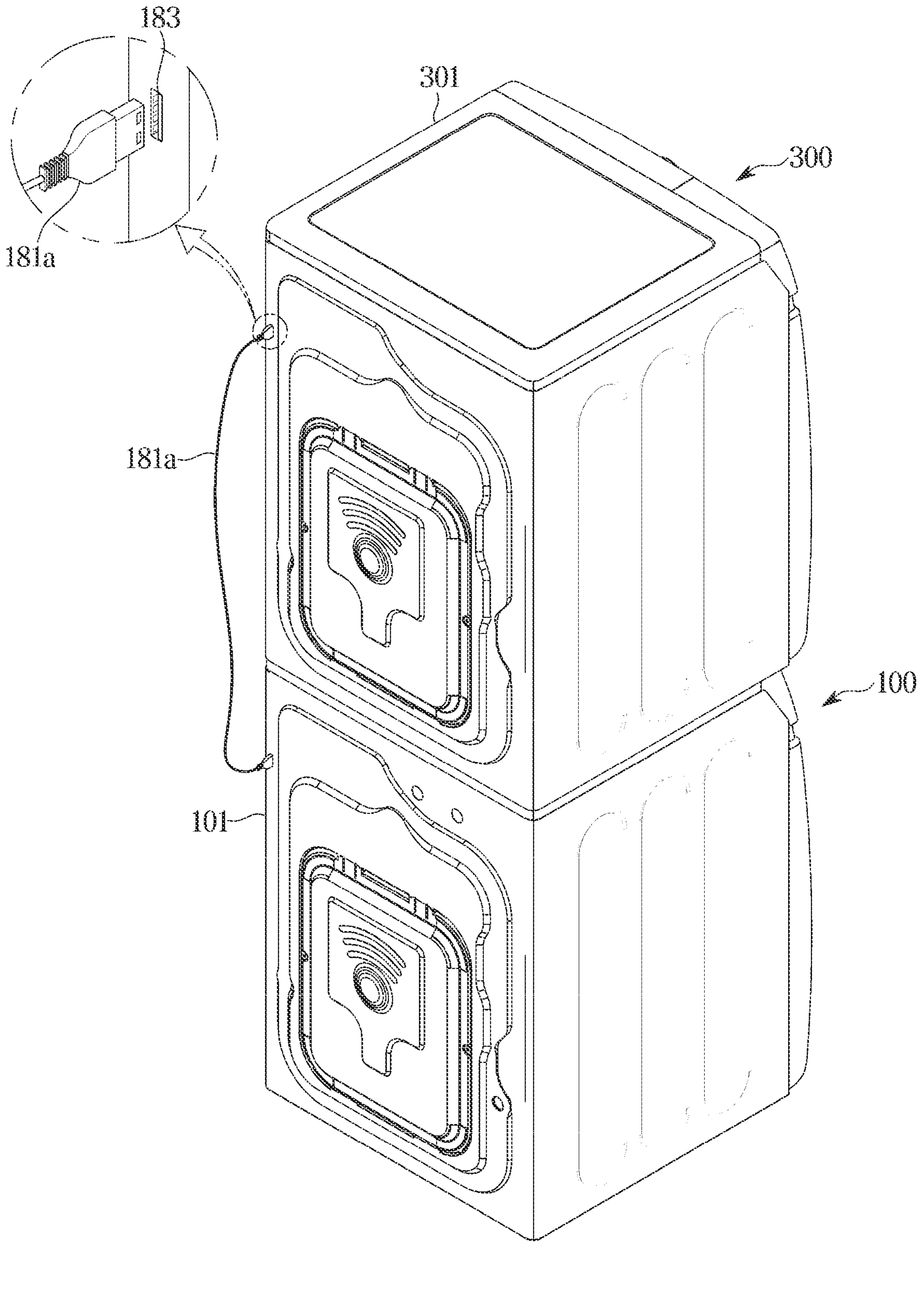
FIG. 8 is a view illustrating an example in which a washing machine is connected to a drying machine by wire according to an embodiment of the disclosure.
Figure 9:
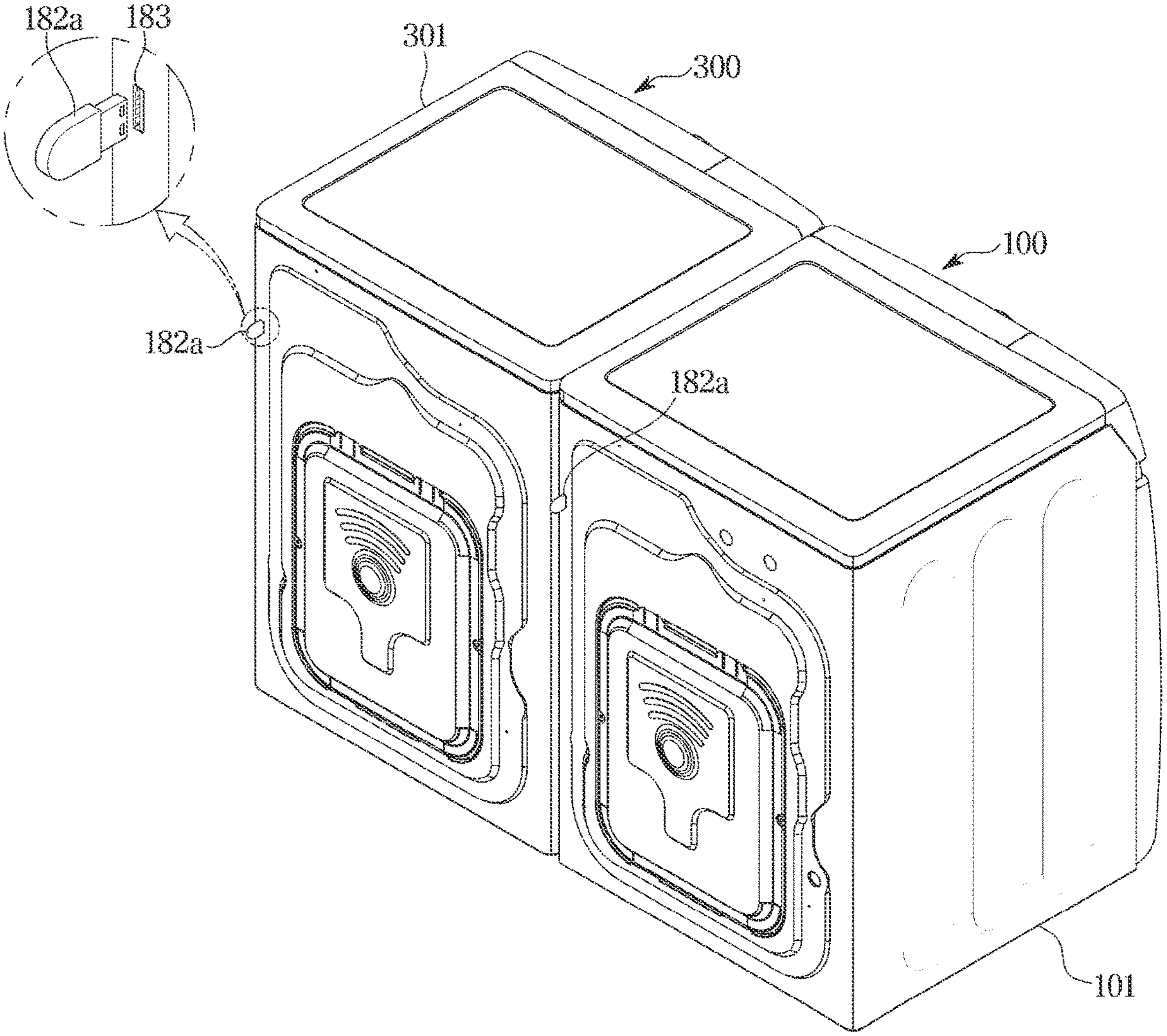
FIG. 9 is a view illustrating an example in which a washing machine is wirelessly connected to a drying machine according to an embodiment of the disclosure.

FIG. 4 is a view illustrating a configuration of a washing machine according to an embodiment of the disclosure. FIG. 5 is a view illustrating a control panel included in a washing machine according to an embodiment of the disclosure. FIG. 6 is a view illustrating a touch panel of a control panel included in a washing machine according to an embodiment of the disclosure. FIG. 7 is a view illustrating light sources of a control panel included in a washing machine according to an embodiment of the disclosure. FIG. 8 is a view illustrating an example in which a washing machine is connected to a drying machine by wire according to an embodiment of the disclosure. FIG. 9 is a view illustrating an example in which a washing machine is wirelessly connected to a drying machine according to an embodiment of the disclosure.

The washing machine 100 may further include the following electrical components as well as mechanical components described with reference to FIG. 3. The washing machine 100 may include the drum motor 140, the water supply valve 152, the drain pump 162, the door switch 103, the door lock 104, the control panel 110, a communication circuitry 180, and a controller 190.

The drum motor 140 may rotate the drum 130 in response to a driving signal from the controller 190. For example, the drum motor 140 may receive a reference speed from the controller 190 and rotate the drum 130 so that a rotational speed of the drum 130 follows the reference speed of the controller 190.

The water supply valve 152 may maintain a normally closed state and may be opened in response to a water supply signal from the controller 190. By opening the water supply valve 152, water can be supplied to the tub 120 through the water supply conduit 151.

The drain pump 162 may pump water from the drain conduit 161 out of the cabinet 101 in response to a drain signal from the controller 190. By pumping the drain pump 162, water accommodated in the tub 120 may be discharged to the outside of the cabinet 101 through the drain conduit 161.

The door switch 103 may detect a state in which the door 102 is closed and a state in which the door 102 is open, respectively. For example, the door switch 103 may be opened (off) when the door 102 is open, and the door switch 103 may be closed (on) when the door 102 is closed. The door switch 103 may provide a signal indicating the closed state of the door 102 or a signal indicating the open state of the door 102 to the controller 190.

The door lock 104 may lock the door 102 in response to a lock signal from the controller 190. For example, when the door 102 closes the inlet 101*a* and the washing machine 100 operates, the controller 190 may control the door lock 104 to lock the door 102.

The control panel 110 may include the user inputter for obtaining the user input, and the display for displaying the washing setting and/or washing operation information in response to the user input. In other words, the control panel 110 may provide an interface (hereinafter referred to as 'user interface') for the user and the washing machine 100 to interact.

Referring to FIG. 5, the control panel 110 may include a washer power button 211 for obtaining the user input for powering on the washing machine 100 or obtaining the user input for powering off the washing machine 100.

In relation to the power source, the washing machine 100 may be placed in three states including an "unplugged state," a "standby state," and an "on state," and may perform different operations depending on a power state of the washing machine 100.

The washing machine 100 may be placed in the "unplugged state" where a plug is not inserted into a power socket. In the "unplugged state," no power is supplied to a display device, and the washing machine 100 may not perform any operation.

The washing machine 100 may be placed in a "off state" in which the plug is inserted into the power socket and the user's power-on command (for example, touching a power button) is not input. In the "off state," some of the components included in the washing machine 100 may be powered. For example, in the "standby state," power may be supplied to a part of the control panel 110, the communication circuitry 180, and the controller 190.

The washing machine 100 may be placed in the "on state" where the plug is inserted into the power socket and the user's power-on command (e.g., action of touching the power button) is input. In the "on state," the power may be supplied to all of the components included in the washing machine 100.

In comparison, the drying machine 300 may be placed in four states, including a "ready state" with the "unplugged state", the "off state", the "on state". The operation of the drying machine 300 in each of the "unplugged state", the "off state" and the "on state" may be the same as the washing machine 100. The "ready state" may be similar to the "on state". However, in the "ready state", the display of the control panel 310 of the drying machine 300 may be deactivated.

When the washer power button 211 is touched or pressed by the user while the plug of the washing machine 100 is inserted into the socket, the washing machine 100 may be switched from the "off state" to the "on state" and the power is supplied to all the components included in the washing machine 100, and all functions of the washing machine 100 may be activated. When the washer power button 211 is touched or pressed by the user in the "on state," the washing machine 100 may be switched from the "on state" to the "off state" and many functions of the washing machine 100 may be deactivated.

In addition, when the washing machine 100 can communicate with the drying machine 300 and the washer power button 211 is touched or pressed by the user when the drying machine 300 is the "off state", the drying machine 300 Is switched from the 'off state' to the 'ready state'. Particularly, in response to the washer power button 211 being touched by the user, the controller 190 may transmit a request message for switching to the 'ready state' to the drying machine 300 through the communication circuitry 180. In addition, the drying machine 300 may be switched from the "off state" to the "ready state" in response to a request from the washing machine 100.

The washer power button 211 may include a tact switch, a push switch, a slide switch, a toggle switch, a micro switch, or a touch switch. Referring to FIG. 6, the washer power button 211 may include a first touch switch 211*a* for obtaining the user's touch input, and the first touch switch 211*a* may be connected to the controller 190.

The control panel 110 may further include a dryer control button 221 that obtains the user input to activate a dryer control for controlling the drying machine 300 and a washer control button 222 that obtains the user input to activate a washer control for controlling the washing machine 100 as illustrated in FIG. 5.

As described above, the washing machine 100 may provide a first user interface for controlling the washing machine 100 and a second user interface for controlling the drying machine 300 using one of the control panels 110. The washing machine 100 may operate in a dryer control mode for obtaining the user input to the drying machine 300 or in a washer control mode for obtaining the user input to the washing machine 100 in order to provide a plurality of user interfaces using one of the control panels 110.

The washing machine 100 may provide the dryer control button 221 and the washer control button 222 so that the user can select the dryer control or the washer control. In response to the dryer control button 221 being touched or pressed, the washing machine 100 may operate in the dryer control mode for obtaining the user input to the drying machine 300. In other words, the washing machine 100 may provide the user with the first user interface for obtaining the user input to the drying machine 300 using the control panel 110.

In addition, in response to the washer control button 222 being touched or pressed, the washing machine 100 may operate in the washer control mode that obtains the user input to the washing machine 100. In other words, the washing machine 100 may provide the user with the second user interface for obtaining the user input to the washing machine 100 using the control panel 110.

For example, as illustrated in FIG. 6, the dryer control button 221 may include a second touch switch 221*a*, and the washer control button 222 may include a third touch switch 222*a*. The second touch switch 221*a* and the third touch switch 222*a* may be respectively connected to the controller 190.

The dryer control button 221 and the washer control button 222 may respectively display the control mode of the control panel 110. For example, when the control panel 110 operates in the dryer control mode, the dryer control button 221 may emit light and the washer control button 222 may not emit light. In addition, when the control panel 110 operates in the washer control mode, the washer control button 222 may emit light and the dryer control button 221 may not emit light. Referring to FIG. 7, the dryer control button 221 may further include a second light source 221*b* that emits light depending on the dryer control mode of the control panel 110, and the washer control button 222 may further include a third light source 222*b* that emits light depending on the washer control mode of the control panel 110. Each of the second light source 221*b* and the third light source 222*b* may include a light emitting diode.

The control panel 110 may further include a drying operation button 231 that obtains the user input for starting the drying operation of the drying machine 300 or pausing the drying operation, and a washing operation button 232 that obtains the user input for starting the washing operation of the washing machine 100 or pausing the washing operation, as illustrated in FIG. 5.

As described above, in the dryer control mode, the washing machine 100 may obtain the user input related to the drying operation of the drying machine 300 through the button included in the control panel 110. In the washer control mode, the washing machine 100 may obtain the user input related to the washing operation of the washing machine 100 through the button included in the control panel 110. In other words, the washing machine 100 may obtain the user input for controlling the drying machine 300 in the dryer control mode, and the user input for controlling the washing machine 100 in the washer control mode.

In comparison, the drying operation button 231 may obtain the user input to start or pause the drying operation of the drying machine 300 regardless of the control mode. Particularly, the drying operation button 231 may not only obtain the user input for starting or pausing the drying operation of the drying machine 300 in the dryer control mode, but also obtain the user input for starting or pausing the drying operation of the drying machine 300 in the washer control mode.

Thereby, the user may quickly stop the operation of the drying machine 300 in an urgent situation. For example, in order to input an additional object to be dried into the drying machine 300 in operation, the user may pause the operation of the drying machine 300 by directly touching the drying operation button 231 without touching the dryer control button 221 to switch from the washer control mode to the dryer control mode.

The washing operation button 232 may also obtain the user input for starting the washing operation of the washing machine 100 or pausing the washing operation regardless of the control mode. Particularly, the washing operation button 232 may not only obtain the user input for starting or pausing the washing operation of the washing machine 100 in the washer control mode, but also obtain the user input for starting or pausing the washing operation of the washing machine 100 in the dryer control mode.

The drying operation button 231 and the washing operation button 232 may each include a push switch, a slide switch, a toggle switch, a micro switch, or a touch switch. Referring to FIG. 6, the drying operation button 231 may include a fourth touch switch 231*a*, and the washing operation button 232 may include a fifth touch switch 232*a*. The fourth touch switch 231*a* and the fifth touch switch 232*a* may be connected to the controller 190, respectively.

The drying operation button 231 and the washing operation button 232 may display whether the drying machine 300 is operating and whether the washing machine 100 is operating, respectively. For example, when the drying machine 300 is in operation, the drying operation button 231 may emit light. In addition, when the washing machine 100 is operating, the washing operation button 232 may emit light. For example, the drying operation button 231 may further include a fourth light emitting diode that emits light depending on whether the drying machine 300 is operating. The washing operation button 232 may further include a fifth light emitting diode that emits light depending on whether the washing machine 100 is operating.

The control panel 110 may further include a dial 241 and a display panel 251 as illustrated in FIG. 5.

The dial 241 may obtain the user input for selecting a drying course in the dryer control mode and the user input for selecting a washing course in the washer control mode. The display panel 251 may display the drying course selected by the rotation of the dial 241 in the dryer control mode, and may display the washing course selected by the rotation of the dial 241 in the washer control mode.

Here, the drying course may include the drying settings (e.g., degree of drying, additional time for preventing or reducing wrinkles, drying time, etc.) preset by a designer of the drying machine 300 according to the type of object to be dried (for example, quilt, underwear, etc.) and material (for example, wool, etc.). For example, standard drying may include the drying setting that can be applied to most objects to be dried, and quilt drying may include the drying setting optimized for drying a quilt.

The drying course may be classified into, for example, standard drying, synthetic fiber drying, wool drying, delicate drying, quilt drying, towel drying, small load drying, shelf drying, dusting, and the like.

The dial 241 may obtain the user input (dial rotation) for selecting one drying course among a plurality of the drying courses in the dryer control mode. Further, the display panel 251 may display the plurality of drying courses in a predetermined order depending on the rotation of the dial 241 in the dryer control mode. The drying display paneled on the display panel 251 when the rotation of the dial 241 is stopped may be selected as a course for drying the object to be dried.

The washing course may include the washing settings (e.g., washing temperature, number of rinsing times, dehydrating strength, etc.) preset by the designer of the washing machine 100 according to the type of object to be dried (for example, quilt, underwear, etc.) and the material (for example, wool, etc.). For example, standard washing may include the washing settings that can be applied to most laundry, and quilt washing may include the washing setting optimized for washing quilts.

The washing course may be classified into, for example, standard washing, strong washing, wool washing, duvet washing, baby clothes washing, towel washing, small load washing, boiled washing, power saving washing, outdoor washing, rinsing/dehydrating, dehydrating, and the like.

The dial 241 may obtain the user input (dial rotation) for selecting one washing course among a plurality of the washing courses in the washer control mode. Also, the display panel 251 may display the plurality of washing courses in a predetermined order depending on the rotation of the dial 241 in the washer control mode. The washing display paneled on the display panel 251 when the rotation of the dial 241 is stopped may be selected as a course for washing laundry.

The display panel 251 may display operation information of the drying machine 300 in operation in the dryer control mode. For example, the display panel 251 may display the time remaining until the end of the drying operation of the drying machine 300 in the dryer control mode.

Further, the display panel 251 may display operation information of the washing machine 100 in operation in the washer control mode. For example, the display panel 251 may display the time remaining until the end of the washing operation of the washing machine 100 in the washer control mode.

When both the drying machine 300 and the washing machine 100 are in operation, the display panel 251 may display both the time remaining until the end of the drying operation of the drying machine 300 and the time remaining until the end of the washing operation of the washing machine 100.

The display panel 251 may include, for example, a liquid crystal display (LCD) panel, a light emitting diode (LED) panel, and the like.

The control panel 110 may include a plurality of setting buttons 261, 262 and 263 and a plurality of setting displays 271, 272 and 273 as illustrated in FIG. 5. The control panel 110 may include the first setting button 261, the first setting display 271, the second setting button 262, the second setting display 272, the third setting button 263, and the third setting display 273 as illustrated in FIG. 5.

The first setting button 261 may obtain the user input for selecting drying information in the dryer control mode and the user input for selecting the washing temperature in the washer control mode. The first setting display 271 may display the drying information selected through the first setting button 261 in the dryer control mode and the washing temperature selected through the first setting button 261 in the washer control mode.

The first setting button 261 may include a sixth touch switch 261*a* as illustrated in FIG. 6, and the sixth touch switch 261*a* may be connected to the controller 190.

The first setting button 261 may display text or symbol meaning 'degree of drying', and text or symbol meaning 'washing temperature'. For example, in the dryer control mode, on the first setting button 261, the text 'degree of drying' may be displayed on a part of the first setting button 261, and in the washer control mode, as illustrated in FIG. 8, the text 'washing temperature' may be displayed on another part of the first setting button 261.

The first setting button 261 may include a sixth upper light source 261*ba* that emits light so that the text 'degree of drying' is displayed in the dryer control mode, and a sixth lower light source 261*bd* that emits light so that the text 'washing temperature' is displayed in the washer control mode. Each of the sixth upper light source 261*ba* and the sixth lower light source 261*bd* may include the light emitting diode.

In the dryer control mode, the first setting display 271 may display the selected degree of drying (for example, text or numbers indicating the drying degree, such as 1, 2, or 3) depending on the number of touches of the first setting button 261. In addition, in the washer control mode, the first setting display 271 may display the selected washing temperature (for example, text and numbers indicating the washing temperature such as 30 degrees, 40 degrees or 50 degrees, etc.) depending on the number of touches of the first setting button 261.

The first setting display 271 may include, for example, a 7-segment display as illustrated in FIG. 6.

The second setting button 262 may obtain the user input for selecting an additional time for preventing or reducing wrinkles in the dryer control mode and the user input for selecting a number of rinsing times in the washer control mode. The second setting display 272 may display the additional time for preventing or reducing wrinkles selected through the second setting button 262 in the dryer control mode and the number of rinsing times selected through the second setting button 262 in the washer control mode.

The second setting button 262 may include a seventh touch switch 262*a* as illustrated in FIG. 6, and the seventh touch switch 262*a* may be connected to the controller 190.

The second setting button 262 may display text or symbol meaning 'anti-wrinkle', and text or symbol meaning 'number of rinsing times'. For example, in the dryer control mode, on the second setting button 262, the text 'anti-wrinkle' may be displayed on a part of the second setting button 262, and in the washer control mode, the text 'number of rinsing times' may be displayed on another part of the second setting button 262.

Referring to FIG. 7, the second setting button 262 may include a seventh upper light source 262*ba* that emits light so that the text 'anti-wrinkle' is displayed in the dryer control mode, and a seventh lower light source 262*bd* that emits light so that the text 'number of rinsing times' is displayed in the washer control mode. Each of the seventh upper light source 262*ba* and the seventh lower light source 262*bd* may include the light emitting diode.

In the dryer control mode, the second setting display 272 may display the selected additional time for preventing or reducing wrinkles (for example, text and numbers indicating the additional time such as 1 hour, 2 hours, or 3 hours) depending on the number of touches of the second setting button 262. In addition, in the washer control mode, the second setting display 272 may display the selected number of rinsing times (or text and numbers indicating the number of rinsing times, such as once, twice, or three times) depending on the number of touches of the second setting button 262.

The second setting display 272 may include, for example, a 7-segment display as illustrated in FIG. 6.

The third setting button 263 may obtain the user input for selecting the drying time in the dryer control mode and the user input for selecting the dehydrating strength in the washer control mode. The third setting display 273 may display the drying time selected through the third setting button 263 in the dryer control mode and the dehydrating strength selected through the third setting button 263 in the washer control mode.

The third setting button 263 may include an eighth touch switch 263*a* as illustrated in FIG. 6, and the eighth touch switch 263*a* may be connected to the controller 190.

The third setting button 263 may display text or symbol meaning 'time setting', and text or symbol meaning 'dehydrating strength'. For example, in the dryer control mode, on the third setting button 263, the text 'time setting' may be displayed on a part of the third setting button 263, and in the washer control mode, the text 'dehydrating strength' may be displayed on another part of the third setting button 263.

As illustrated in FIG. 7, the third setting button 263 may include an eighth upper light source 263*ba* that emits light so that the text 'time setting' is displayed in the dryer control mode, and an eighth lower light source 263*bd* that emits light so that the text 'dehydrating strength' is displayed in the washer control mode. Each of the eighth upper light source 263*ba* and the eighth lower light source 263*bd* may include the light emitting diode.

In the dryer control mode, the third setting display 273 may display the selected drying time (for example, text and numbers indicating the additional time such as 1 hour, 2 hours, or 3 hours) depending on the number of touches of the third setting button 263. In addition, in the washer control mode, the third setting display 273 may display the dehydrating strength (or text and numbers indicating the dehydrating strength such as 1, 2, or 3) depending on the number of touches of the third setting button 263.

The third setting display 273 may include, for example, a 7-segment display as illustrated in FIG. 6.

As such, each of the first, second, and third setting buttons 261, 262, and 263 may be implemented as a single touch switch, and may obtain different user inputs in different control modes. On each of the first, second, and third setting buttons 261, 262, and 263, text or symbols indicating the different user inputs may be displayed in the different control modes.

In addition, each of the first, second, and third setting displays 271, 272, and 273 may display different information in different control modes.

The control panel 110 may include a remote control button 281 and an additional setting display 291 as illustrated in FIG. 5.

The remote control button 281 may obtain the user input for activating or inactivating remote control of the drying machine 300 and/or the washing machine 100 by an external device such as a user device in the dryer control mode and the washer control mode. The remote control button 281 may include a ninth touch switch 281*a* as illustrated in FIG. 6, and the ninth touch switch 281*a* may be connected to the controller 190.

The remote control may refer to control of the washing machine 100 or the drying machine 300 by the external device such as a terminal, a portable device, a user device, a computing device, a communication circuitry, or a server device. When the remote control is activated, control of the washing machine 100 or the drying machine 300 by the external device may be allowed. For example, the user may identify an operating state of the washing machine 100 and/or the drying machine 300 through the user device, and may change the operation of the washing machine 100 during the operation of the washing machine 100 and/or the drying machine 300.

For safety reasons, the remote control of the washing machine 100 may be activated only by the remote control button 281 provided in the washing machine 100. Further, the remote control of the drying machine 300 may be activated only by the remote control button 281 provided on the washing machine 100 or a remote control button provided on the drying machine 300.

In addition, for safety reasons, the remote control of the washing machine 100 may be activated only when the door 102 is closed. When the remote control of the washing machine 100 is activated, the door 102 is locked with the door lock 104 closed. The remote control of the drying machine 300 may also be activated only when the door of the drying machine 300 is closed, and when the remote control of the drying machine 300 is activated, the door of the drying machine 300 is closed and locked.

The additional setting display 291 may display whether the remote control of the drying machine 300 is activated, whether the remote control of the washing machine 100 is activated, and the like. The additional setting display 291 may include, for example, an LCD panel, an LED panel, and the like.

The additional setting display 291 may include a first indicator 291*a* indicating activation by the remote control of the drying machine 300 and a second indicator 291*b* indicating activation by the remote control of the washing machine 100.

The first indicator 291*a* may be displayed when the remote control of the drying machine 300 is activated, and may not be displayed unless the remote control of the drying machine 300 is activated. The first indicator 291*a* may include a ninth upper light source 291*u* that emits light depending on whether the remote control of the drying machine 300 is activated.

The second indicator 291*b* may be displayed when the remote control of the washing machine 100 is activated, and may not be displayed unless the remote control of the washing machine 100 is activated. The second indicator 291*b* may include a ninth lower light source 291*d* that emits light depending on whether the remote control of the washing machine 100 is activated.

An additional function button 282 may obtain a user input for selecting additional functions (e.g., a child lock function) in the dryer control mode and the washer control mode. The additional function button 282 may include a tenth touch switch 282*a* as illustrated in FIG. 6, and the tenth touch switch 282*a* may be connected to the controller 190. In addition, the additional function button 282 may include a tenth light source 282*b* as illustrated in FIG. 7.

The user may touch the additional function button 282 to activate the selection of the additional function of the washing machine 100 or the drying machine 300. The washing machine 100 may display the additional functions of the washing machine 100 or the drying machine 300 on the display panel 251 in response to a touch to the additional function button 282. In addition, the user may rotate the dial 241 to select the additional functions of the washing machine 100 or the drying machine 300. The washing machine 100 may sequentially display a plurality of additional functions on the display panel 251 in response to the rotation of the dial 241.

The plurality of additional functions may include the child lock function that blocks the user input by the touch of the control panel 110. When the rotation of the dial 241 is stopped while a "child lock" function is displayed on the display panel 251, the "child lock" function may be activated.

The child lock may indicate a function of blocking acquisition of the user input through the control panel 110. For example, the buttons 211, 221, 222, 231, 232, 261, 262, 263, 281, and 282 of the control panel 110 may be manipulated only by touch. When children manipulate the control panel 110 with curiosity, there is a concern of a safety accident. In order to prevent this, by setting the child lock, the washing machine 100 may block obtainment of the user input through the control panel 110.

As such, the control panel 110 may include a plurality of buttons and a plurality of displays. The plurality of buttons may obtain the different user inputs in the different control modes, and the plurality of displays may display different information in the different control modes.

The communication circuitry 180 (e.g., a transceiver) may transmit data to the drying machine 300 or the server device, etc. through an access point and receive data from the drying machine 300 or the server device. Here, the access point is a device that relays a connection between the terminal and the server by wire or wireless, and may be referred to by various names such as hub, switch, and router.

The communication circuitry 180 may include a wired communication module 181 that exchanges data with the drying machine 300 or the server device by wire, a wireless communication module 182 that exchanges data with the drying machine 300 or the server device by wireless, and a communication interface 183 that is a passage for exchanging data with the drying machine 300.

The wired communication module 181 may exchange data with the drying machine 300 or the server device using various wired communication standards.

For example, the wired communication module 181 may exchange data with the drying machine 300 or the server device through a universal asynchronous receiver/transmitter (UART). The wired communication module 181 may exchange data with the drying machine 300 using a communication standard such as RS-422 or RS-485 through the UART. In addition, the wired communication module 181 may connect to the access point by wire using Ethernet (IEEE 802.3 technology standard), and may exchange data with the drying machine 300 or the server device through the access point.

The wired communication module 181 may include a communication circuit (e.g., a network interface controller) including a processor and/or memory for modulating/demodulating data for wired communication.

The wireless communication module 182 may exchange data with the drying machine 300 using various wireless communication standards.

For example, the wireless communication module 182 may connect to the access point using Wi-Fi (WiFi™, IEEE 802.11 technology standard) wireless communication and exchange data with the drying machine 300 or the server device through the access point. The Wi-Fi wireless communication may provide peer to peer communication between nodes (e.g., the display device and an audio device) without going through the access point. As such, the peer to peer communication using Wi-Fi wireless communication is referred to as "WiFi P2P" or "WiFi direct." The wireless communication module 182 may exchange data with the drying machine 300 using a Wi-Fi P2P communication standard.

In addition, the wireless communication module 182 may exchange data with the drying machine 300 using Bluetooth (Bluetooth™, IEEE 802.15.1 technology standard) or ZigBee™ (IEEE 802.15.4 technology standard) wireless communication. Alternatively, the wireless communication module 182 may exchange data with the drying machine 300 using Near Field Communication (NFC).

The wireless communication module 182 may include a communication circuit (e.g., a wireless network interface controller) including a processor and/or memory for decoding/encoding data for wireless communication.

The communication interface 183 may form a wired or wireless channel for exchanging data with the drying machine 300.

Referring to FIGS. 8 and 9, the communication interface 183 may be provided on the rear side of the cabinet 101 so that it is not visible to the user. The communication interface 183 may be implemented as a connection terminal through which a communication line 181*a* or a wireless dongle 182*a* can be inserted.

For example, when the communication line 181*a* is connected to the communication interface 183 as illustrated in FIG. 8, the wired communication module 181 may be activated, and the wired communication module 181 may exchange data with the drying machine 300 by wire through the communication interface 183 and the communication line 181*a*.

As another example, when the wireless dongle 182*a* for wireless communication is connected to the communication interface 183 as illustrated in FIG. 9, the wireless communication module 182 may be activated, and the wireless communication module 182 may exchange data with the drying machine 300 by wire through the communication interface 183 and the wireless dongle 182*a*.

The communication interface 183 may have various types of connectors. For example, the communication interface 183 may include a universal serial bus (USB) terminal or an RJ-45 terminal.

The controller 190 (e.g., at least one processor) may be mounted on a printed circuit board provided on the rear side of the control panel 110, for example.

The controller 190 may be electrically connected to the drum motor 140, the water supply valve 152, the drain pump 162, the door switch 103, the door lock 104, the control panel 110, and the communication circuitry 180.

The controller 190 includes a processor 191 for generating a control signal for controlling the operation of the washing machine 100, and a memory 192 for memorizing or storing a program and data for generating a control signal for controlling the operation of the washing machine 100. The processor 191 and the memory 192 may be implemented as separate chips or as a single chip. In addition, the controller 190 may include a plurality of processors or a plurality of memories.

The processor 191 may process data and/or signals according to a program provided from the memory 192, and provide a control signal to each component of the washing machine 100 based on a processing result.

The processor 191 may receive the user input from the control panel 110 and process the user input.

The processor 191, in response to the user input, may operate in the dryer control mode for controlling the drying operation of the drying machine 300 and changing the drying setting, or the washer control mode for controlling the washing operation of the washing machine 100 and changing the washing setting. For example, the processor 191, based on the user input through the dryer control button 221, may provide communication data to the communication circuitry 180 for switching to the dryer control mode and changing the drying setting of the drying machine 300. In addition, the processor 191, based on the user input through the washer control button 222, may switch to the washer control mode and change the washing setting of the washing machine 100.

The processor 191 may control the control panel 110 to display the washing setting (or drying setting) and the washing operation information (or drying operation information) in response to the user input. For example, the processor 191 may control the control panel 110 to display the drying operation information or the drying settings of the drying machine 300 based on the user input through the dryer control button 221. Further, the processor 191 may control the control panel 110 to display the washing operation information or the washing settings of the washing machine 100 based on the user input through the washer control button 222.

The processor 191 may control the drum motor 140, the water supply valve 152, the drain pump 162, and the door lock in response to the user input. The processor 191 may set the washing settings in response to the user input through the dial 241, the first setting button 261, the second setting button 262, and the third setting button 263, and may control the drum motor 140, the water supply valve 152, the drain pump 162 and the door lock 104 based on the washing setting. For example, the processor 191 may control the drum motor 140, the water supply valve 152, the drain pump 162, and the door lock 104 to sequentially perform a washing process, a rinsing process, and a dehydrating process.

The processor 191 may provide communication data to the communication circuitry 180 to control the operation of the drying machine 300 in response to the user input. The processor 191 may set the drying settings in response to the user input through the dial 241, the first setting button 261, the second setting button 262, and the third setting button 263, and may provide the drying setting to the communication circuitry 180 so as to transmit information about the drying setting to the drying machine 300.

The processor 191 may include an operation circuit, a memory circuit, and a control circuit. The processor 191 may include one chip or may include a plurality of chips. In addition, the processor 191 may include one core or may include a plurality of cores.

The memory 192 may memorize/store data including a program for controlling the washing operation according to the washing course, and data including the washing settings according to the washing course and the drying settings according to the drying course. Also, the memory 192 may memorize/store the currently selected washing course, washing setting, drying course, and drying setting based on the user input.

The memory 192 may include a volatile memory such as Static Random Access Memory (S-RAM) and Dynamic Random Access Memory (D-RAM), and a non-volatile memory such as Read Only Memory (ROM) and Erasable Programmable Read Only Memory (EPROM). The memory 192 may include one memory element or a plurality of memory elements.

As described above, the washing machine 100 may provide the first user interface for controlling the operation of the drying machine 300 and the second user interface for controlling the operation of the washing machine 100 using one of the control panels 110. The washing machine 100 may transmit the communication data for controlling the drying operation of the drying machine 300 to the drying machine 300 based on the user input received through the first user interface. Further, the washing machine 100 may provide a control signal for controlling the washing operation based on the user input received through the second user interface.

Figure 10:
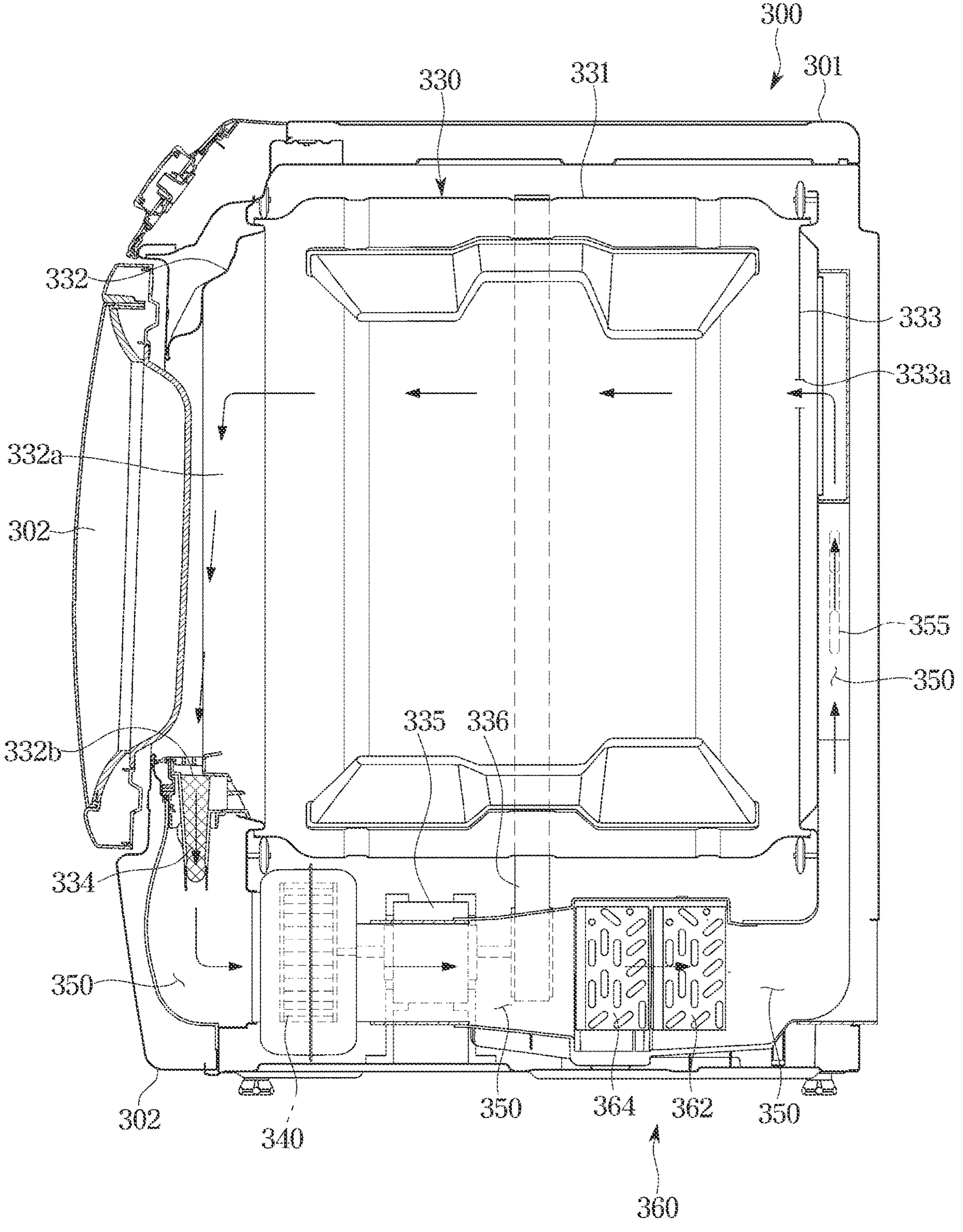
FIG. 10 is a view illustrating a side cross-section of a drying machine according to an embodiment of the disclosure.
Figure 11:
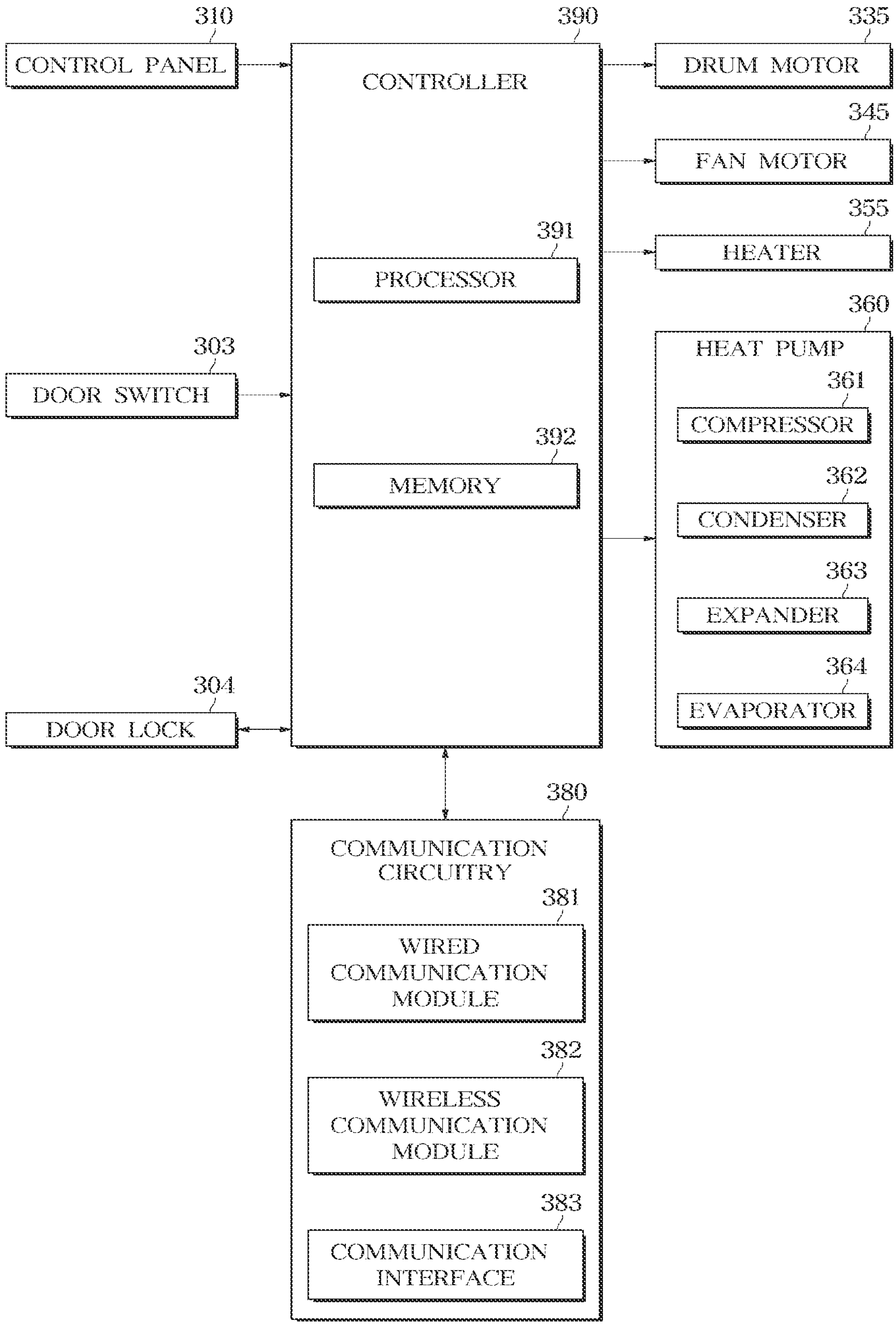
FIG. 11 is a view illustrating circulation of air and circulation of refrigerant in a drying machine according to an embodiment of the disclosure.

FIG. 10 is a view illustrating a side cross-section of a drying machine according to an embodiment of the disclosure. FIG. 11 is a view illustrating circulation of air and circulation of refrigerant in a drying machine according to an embodiment of the disclosure.

A configuration of the drying machine 300 will be described with reference to FIGS. 10 and 11 together with FIGS. 1 and 2 described above.

The drying machine 300 may include a cabinet 301. Further, the drying machine 300 may further include a door 302, a control panel 310, a drum 330, a drum motor 335, a fan 340, a fan motor 345, a duct 350, a heater 355, and a heat pump 360 accommodated in the cabinet 301.

At the center of a front surface of the cabinet 301, an inlet 301*a* may be formed to which laundry is put into or taken out of.

The door 302 may open and close the inlet 301*a*. The closing of the inlet 301*a* by the door 302 may be detected by a door switch 303. When the inlet 301*a* is closed and the drying machine 300 is operated, the door 302 may be locked by a door lock 304.

The control panel 310 including a display configured to display operation information of the drying machine 300 and a user inputter configured to obtain a user input for the drying machine 300 from the user may be provided on a front upper side of the cabinet 301. The control panel 310 will be described in more detail below.

The drying machine 300 may include the drum 330 configured to accommodate the object to be dried and dry the object to be dried. The drum 330 may be rotatably installed in the cabinet 301.

The drum 330 may include a drum body 331 formed in a cylindrical shape whose center of rotation is formed in a front-rear, horizontal direction. A front panel 332 having an opening 332*a* formed therein to allow the object to be dried to be put into the drum 330 may be disposed at a front surface of the drum body 331. Also, a rear surface of the drum body 331 may be closed by a rear panel 333 having an inlet 333*a* formed therein to allow introduction of high-temperature dry hot air.

An outlet 332*b* through which air used in drying the object to be dried is discharged may be provided in the front panel 332 of the drum 330. A filter 334 configured to collect foreign substances removed from the object to be dried may be installed in the outlet 332*b*. Accordingly, the foreign substances removed from the object to be dried may be collected by the filter 334.

The drum 330 may receive a rotary force from the drum motor 335 and rotate. The drum 330 may be connected to the drum motor 335 disposed in the cabinet 301 by a belt 336. The drum motor 335 may provide the rotary force to the drum 330 through the belt 336.

One or more heat sources may be provided in the drying machine 300, and the drying machine 300 may supply high-temperature air to the drum 330 through the heat sources. For example, the drying machine 300 may include, as the heat sources, the heater 355 and the heat pump 360. In this case, drying machines including a heat pump forming a refrigerant circuit may be classified into circulating-type drying machines and air discharge-type drying machines according to the flow of air being circulated. The circulating-type drying machine may refer to a drying machine capable of drying an object by circulating air without discharging or sucking air. The air discharge-type drying machine may refer to a drying machine which sucks outside air, uses the outside air in drying, and then discharges the outside air to the outside of the drying machine.

The drying machine 300 may include the fan 340 configured to circulate air inside the drum 330. The fan 340 may suck air from inside the drum 330 and discharge the air to the duct 350. By the fan 340, the air inside the drum 330 may circulate through the drum 330 and the duct 350. The fan 340 may rotate by the fan motor 345.

The heater 355 and the heat pump 360 may be provided in the duct 350 through which the air inside the drum 330 circulates.

Referring to FIG. 11, the heat pump 360 may include a compressor 361, a condenser 362, an evaporator 364, and an expander 363. The compressor 361, the condenser 362, the expander 363, and the evaporator 364 may be seated at a bottom surface of the cabinet 301.

The compressor 361 may compress refrigerant in a gaseous state to a high-temperature, high-pressure state and discharge the gaseous refrigerant in the high-temperature, high-pressure state. The discharged refrigerant may be transferred to the condenser 362.

The condenser 362 may condense the compressed gaseous refrigerant to a liquid. The condenser 362 may dissipate heat to surrounding portions thereof through the process of condensing the refrigerant. The condenser 362 may be provided in the duct 350 and heat the air through heat generated in the process of condensing the refrigerant. The liquid refrigerant condensed by the condenser 362 may be transferred to the expander 363.

The expander 363 may expand the high-temperature, high-pressure liquid refrigerant condensed by the condenser 362 to the liquid refrigerant in a low-pressure state. For example, the expander 363 may include an expansion valve configured to adjust a pressure difference of the refrigerant.

The evaporator 364 may evaporate the liquid refrigerant expanded by the expander 363. As a result, the evaporator 364 may cause the low-temperature, low-pressure gaseous refrigerant to return to the compressor 361.

The evaporator 364 may absorb heat from the surrounding portions thereof through an evaporation process in which the low-pressure liquid refrigerant is changed to the gaseous refrigerant. The evaporator 364 may be provided in the duct 350 and may cool air passing through the evaporator 364 in the evaporation process.

Air around the evaporator 364 may be cooled by the evaporator 364, and, when a temperature of the air around the evaporator 364 becomes lower than the dew point, the air around the evaporator 364 may be condensed. Due to the condensation occurring around the evaporator 364, the absolute humidity of the air passing through the evaporator 364 may be lowered. In other words, the amount of water vapor contained in the air passing through the evaporator 364 may be reduced.

Using the condensation occurring around the evaporator 364, the drying machine 300 may reduce the amount of water vapor contained in the air inside the drum 330 and dry the object to be dried.

The evaporator 364 may be disposed more upstream than the condenser 362 on the basis of the flow of air due to the fan 340. The air circulating due to the fan 340 may be dried (water vapor may be condensed) by the evaporator 364 while the air passes through the evaporator 364, and then the air may be heated by the condenser 362 while passing through the condenser 362.

The heater 355 may assist the condenser 362 in heating the air. For example, before the condenser 362 of the heat pump 360 sufficiently heats the air in the duct 350, the heater 355 may assist the condenser 362 in heating the air in the duct 350.

The temperature inside the drum 330 may more rapidly rise due to the heater 355 assisting the condenser 362, and the drying machine 300 may more rapidly dry the object to be dried.

The heater 355 may be disposed more downstream than the condenser 362 on the basis of the flow of air due to the fan 340. The heater 355 may be implemented through a heating coil. However, the heater 355 is not limited thereto and may be implemented through various other known devices.

Figure 12:
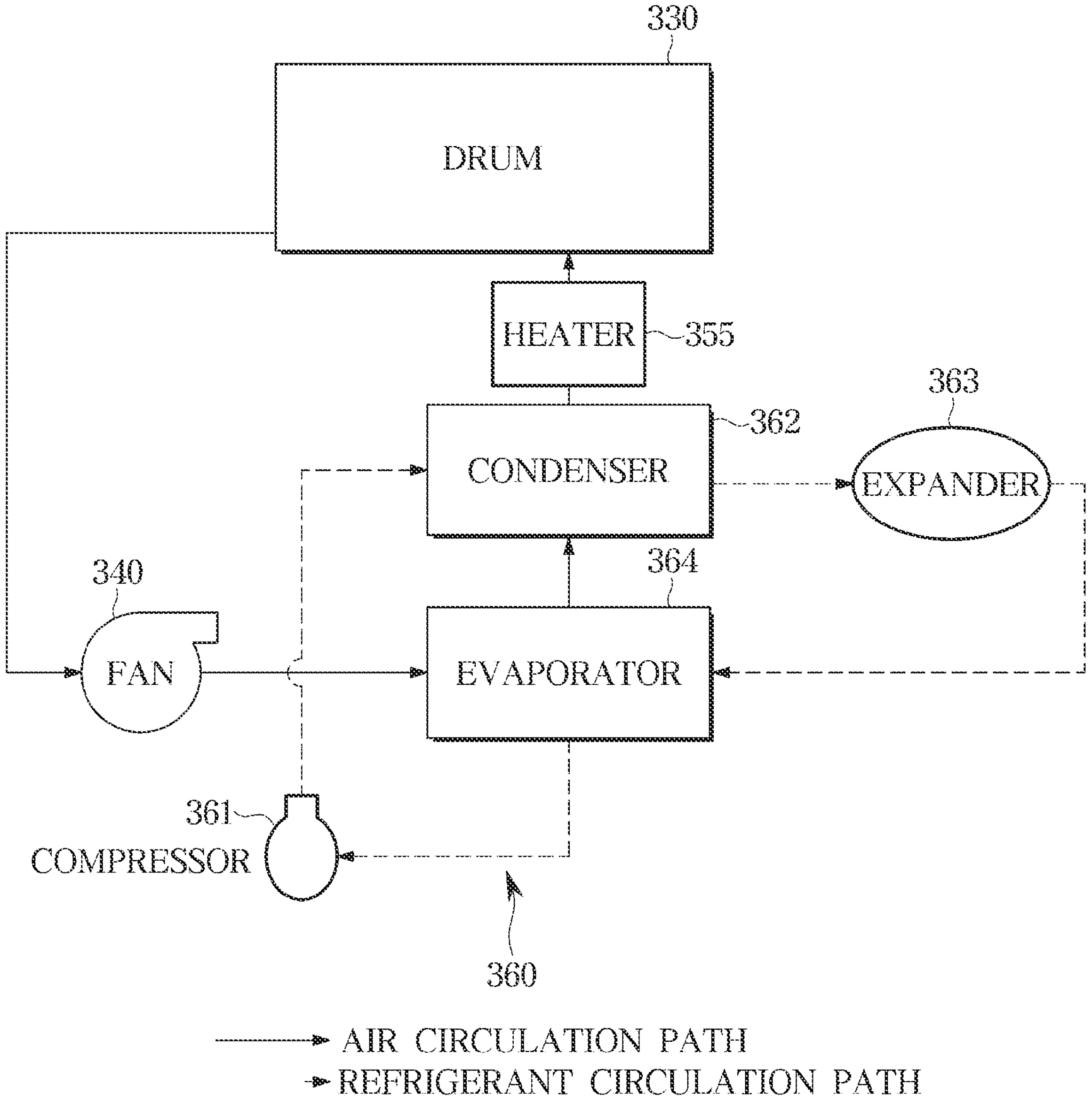
FIG. 12 is a view illustrating a configuration of a drying machine according to an embodiment of the disclosure.
Figure 13:
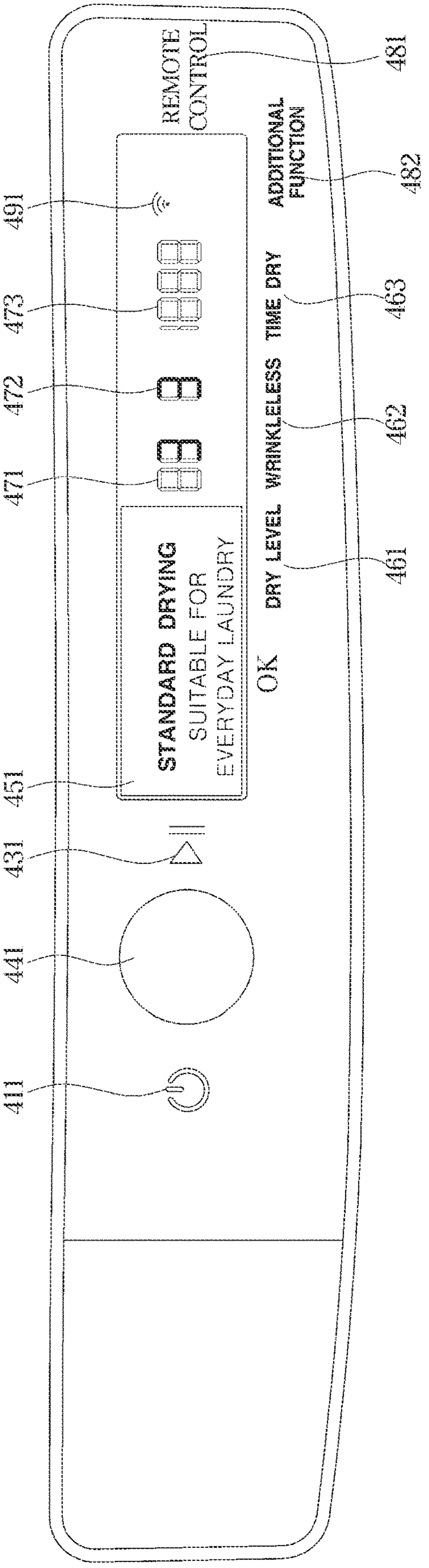
FIG. 13 is a view illustrating a control panel included in a drying machine according to an embodiment of the disclosure.

FIG. 12 is a view illustrating a configuration of a drying machine according to an embodiment of the disclosure. FIG. 13 is a view illustrating a control panel included in a drying machine according to an embodiment of the disclosure.

The drying machine 300 may further include the following electrical configurations as well as the mechanical configurations described in conjunction with FIGS. 10 and 11. The drying machine 300 may include the drum motor 335, the fan motor 345, the heater 355, the compressor 361, the door switch 303, the door lock 304, the control panel 310, a communication circuitry 380, and a controller 390.

The drum motor 335 may rotate the drum 330 in response to a driving signal from the controller 390. The fan motor 345 may rotate the fan 340 in response to the driving signal of the controller 390. The heater 355 may heat air in the duct 350 in response to a heating signal from the controller 390. The compressor 361 may circulate the refrigerant of the heat pump 360 in response to the driving signal of the controller 390.

The door switch 303 may detect a state in which the door 302 is closed and a state in which the door 302 is open, respectively. The door lock 304 may lock the door 302 in response to a lock signal from the controller 390. When the door 302 closes the inlet 301*a* and the drying machine 300 operates, the controller 390 may control the door lock 304 to lock the door 302.

The control panel 310 may include the user inputter for obtaining the user input, and the display for displaying the washing setting and/or the washing operation information in response to the user input. In other words, the control panel 310 may provide an interface (hereinafter referred to as 'user interface') for the user and the drying machine 300 to interact.

The control panel 310 may include a dryer power button 411 for obtaining the user input for powering on the drying machine 300 or obtaining the user input for powering off the drying machine 300, as illustrated in FIG. 13. In addition, the dryer power button 411 may display a power state of the drying machine 300.

In relation to the power source, the drying machine 300 may be placed in four states including the "ready state" with the "unplugged state", the "off state", the "on state". The operation of the drying machine 300 in each of the "unplugged state", the "off state" and the "on state" may be the same as the washing machine 100.

The "ready state" may be similar to the "on state". However, in the "ready state", the display of the control panel 310 of the drying machine 300 may be deactivated. For example, in the "ready state", a display panel 451 and first, second, and third setting displays 471, 472, and 473 to be described below may be turned off. In addition, in the "ready state", the first, second, and third setting displays 471, 472, and 473 may also not emit light.

The dryer power button 411 may include a tact switch, a push switch, a slide switch, a toggle switch, a micro switch, or a touch switch. For example, the dryer power button 411 may include the touch switch.

The control panel 310 may further include a drying operation button 431 that obtains the user input for starting the drying operation of the drying machine 300 or pausing the drying operation, as illustrated in FIG. 13. In addition, the drying operation button 431 may indicate whether the drying machine 300 is operating. The drying operation button 431 may be the same as the drying operation button 231 of the washing machine 100 (see FIG. 5).

The control panel 310 may further include a dial 441 for obtaining the user input for selecting the drying course, and a display panel 451 for displaying the drying course selected by the rotation of the dial 241, as illustrated in FIG. 13. The dial 441 and the display panel 451 may be the same as the dial 241 (see FIG. 5) and the display panel 251 (see FIG. 5) of the washing machine 100 in the dryer control mode.

The control panel 310 may include a first setting button 461, a first setting display 471, a second setting button 462, a second setting display 472, a third setting button 463, and a third setting display 473, as illustrated in FIG. 13. The first, second, and third setting buttons 461, 462, and 463 may be the same as the first, second, and third setting buttons 261, 262, and 263 (see FIG. 5) of the washing machine 100 in the dryer control mode. The first, second, and third setting displays 471, 472, and 473 may be the same as the first, second, and third setting displays 271, 272, and 273 (see FIG. 5) of the washing machine 100 in the dryer control mode.

Referring to FIG. 13, the control panel 310 may include a remote control button 481 for obtaining the user input for activating or deactivating the remote control of the drying machine 300 by the external device, such as the user device, an additional setting display 491 for displaying whether the remote control of the drying machine 300 is activated, and an additional function button 482 for obtaining a user input for selecting an additional function of the drying machine 300. The remote control button 481, the additional setting display 491, and the additional function button 482 may be the same as the remote control button 281 (see FIG. 5), the additional setting display 291 (see FIG. 5), and the additional function button 282 (see FIG. 5) of the washing machine 100 in the dryer control mode.

The communication circuitry 380 may transmit data to the washing machine 100 and receive data from the washing machine 100.

The communication circuitry 380 may include a wired communication module 381 that exchanges data with the washing machine 100 by wire, a wireless communication module 382 that exchanges data with the washing machine 100 wirelessly, and a communication circuitry 383 that is a passage for exchanging data with the washing machine 100.

The wired communication module 381, the wireless communication module 382, and the communication interface 383 may be the same as the wired communication module 181 (see FIG. 4), the wireless communication module 182 (see FIG. 4), and the communication interface 183 (see FIG. 4) of the washing machine 100.

The controller 390 may be mounted on a printed circuit board provided on the rear side of the control panel 310, for example.

The controller 390 may be electrically connected to the drum motor 335, the fan motor 345, the heater 355, the compressor 361, the door switch 303, the door lock 304, the control panel 310, and the communication circuitry 380.

The controller 390 may include a processor 391 for generating a control signal for controlling the operation of the drying machine 300, and a memory 392 for memorizing or storing a program and data for generating a control signal for controlling the operation of the drying machine 300. The processor 391 and the memory 392 may be implemented as separate chips or as a single chip. In addition, the controller 390 may include a plurality of processors or a plurality of memories.

The processor 391 may process data and/or signals according to a program provided from the memory 392 and provide control signals to each configuration of the drying machine 300 based on the processing results.

The processor 391 may receive the user input from the control panel 310 and process the user input.

The processor 391 may control the control panel 310 to display the drying setting and the drying operation information in response to the user input.

The processor 391 may control the drum motor 335, the fan motor 345, the heater 355, the compressor 361, and the door lock 304 to perform the drying operation in response to the user input.

In addition, the processor 391, the drum motor 335, the fan motor 345, the heater 355, the compressor 361, and the door lock 304 may perform the drying operation depending on the drying settings received through the communication circuitry 380.

The processor 391 may include an operation circuit, a memory circuit, and a control circuit. The processor 391 may include one chip or may include a plurality of chips. In addition, the processor 391 may include one core or may include a plurality of cores.

The memory 392 may memorize/store data including a program for controlling the washing operation according to the drying course, and data including the drying settings according to the drying course and the drying settings according to the drying course. Also, the memory 392 may memorize/store the currently selected drying course and drying setting based on the user input.

The memory 392 may include a volatile memory such as S-RAM and D-RAM, and a non-volatile memory such as ROM and EPROM. The memory 392 may include one memory element or a plurality of memory elements.

As described above, the drying machine 300 may not only perform the drying operation for drying the object to be dried based on the user input obtained through the control panel 310, but also perform the drying operation for drying the object to be dried based on the drying setting received through the communication circuitry 380.

Hereinafter, the operations of the washing machine 100 and the drying machine 300 will be described. The operation of the washing machine 100 may be performed under the control of the controller 190 and/or the processor 191, and the operation of the drying machine 300 may be performed under the control of the controller 390 and/or the processor 391.

Figure 14:
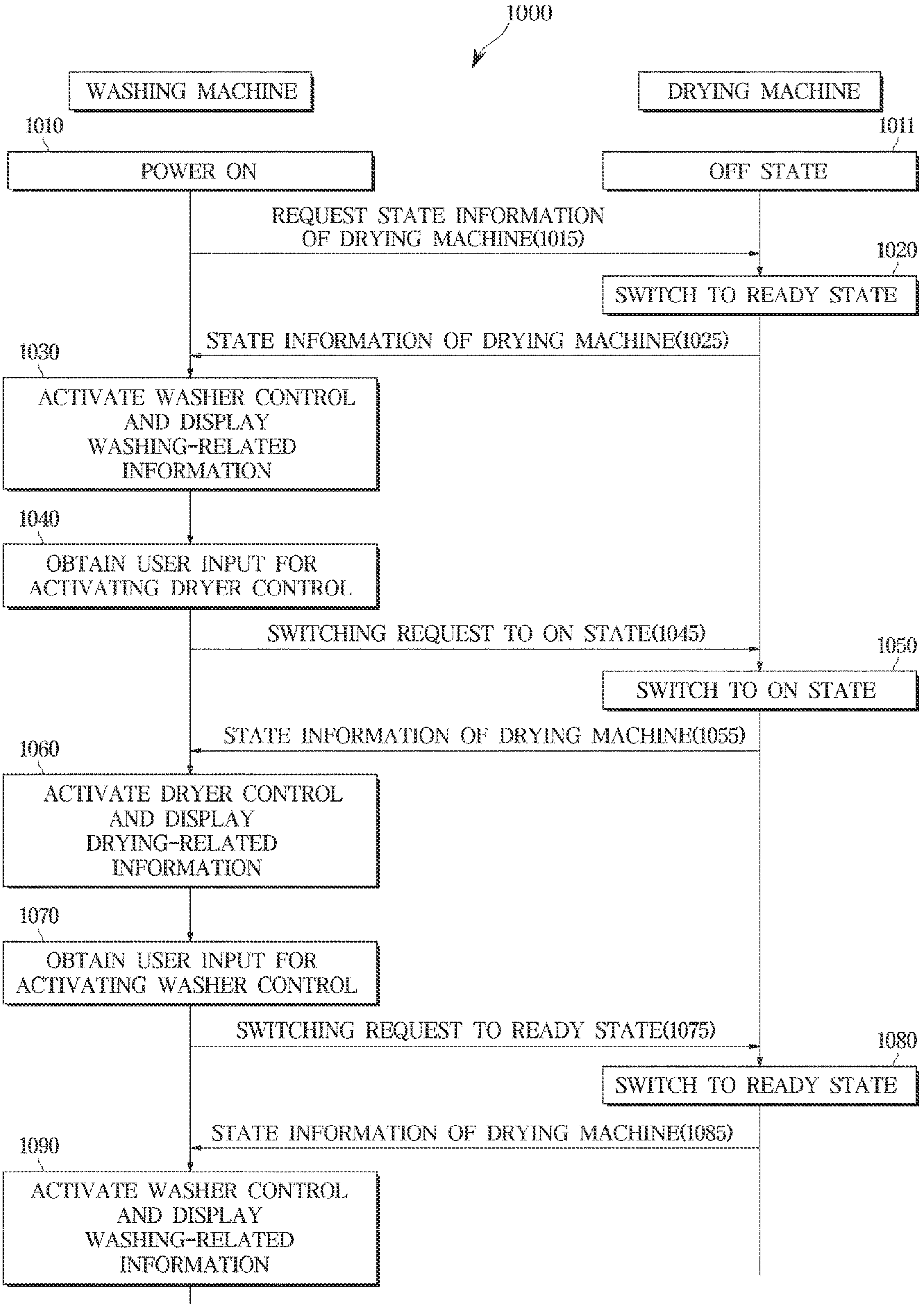
FIG. 14 is a view illustrating a linkage operation between a washing machine and a drying machine according to an embodiment of the disclosure.

FIG. 14 is a view illustrating a linkage operation between a washing machine and a drying machine according to an embodiment of the disclosure.

Referring to FIG. 14, a linkage operation 1000 of the washing machine 100 and the drying machine 300 will be described.

The drying machine 300 is in the 'off state' (1011), and the washing machine 100 is powered on (1010).

Both the washing machine 100 and the drying machine 300 may be placed in the "off state" in which the plug is inserted into the power socket and the user's power-on command is not input.

When the washer power button 211 of the control panel 110 is touched or pressed by the user, the washing machine 100 may be switched from the "off state" to the 'on state.' In the 'off state,' the power may be supplied to the controller 190 and the control panel 110. The power may be supplied to the first touch switch 211*a* of the washer power button 211. The first touch switch 211*a* may detect a user touch for powering on the washing machine 100 and provide the electrical signal according to the detection of the user touch to the controller 190. The controller 190 may supply power to all of the components included in the washing machine 100 in response to the user touch for power on. In other words, the washing machine 100 may be switched from the "standby state" to the "on state," and in the "on state," the power may be supplied to all of the components included in the washing machine 100.

The washing machine 100 may transmit a request for state information of the drying machine 300 to the drying machine 300, and the drying machine 300 may receive the request for state information from the washing machine 100 (1015).

The controller 190 of the washing machine 100 may determine whether the washing machine 100 is connected to the drying machine 300, and when it is determined that the washing machine 100 is connected to the drying machine 300, the controller 190 may request state information of the drying machine 300 from the drying machine 300.

The controller 190 may identify whether it is possible to communicate with the drying machine 300 through the communication circuitry 180. For example, the controller 190 may identify whether the communication line 181*a* or the wireless dongle 182*a* is inserted into the communication interface 183.

When the communication line 181*a* or the wireless dongle 182*a* is inserted into the communication interface 183, the controller 190 may transmit a request message for establishing communication and identify whether a response message for establishing communication has been received in response to the request message. When the response message is not received, the controller 190 may identify that it is not connected to the drying machine 300. When the response message is received, the controller 190 may identify whether the drying machine 300 can communicate by wire or wirelessly with the drying machine 300.

Upon identifying that the controller 190 can communicate with the drying machine 300, the controller 190 may transmit a message requesting the state information of the drying machine 300 to the drying machine 300 through the communication circuitry 180.

Upon receiving the state information request, the drying machine 300 may switches to the 'ready state' (1020).

In the 'off state', the controller 390 of the drying machine 300 may switch to the 'ready state' in response to the request of the washing machine 100. In the 'ready state', the power may be supplied to each component of the drying machine 300, but the displays 451, 471, 472, 473, and 491 of the control panel 310 may remain in the off state. In other words, the control panel 310 may not display information on the drying machine 300.

The drying machine 300 may transmit the state information of the drying machine 300 to the washing machine 100, and the washing machine 100 may receive the state information of the drying machine 300 (1025).

The controller 390 of the drying machine 300 may transmit the state information of the drying machine 100 to the washing machine 100 in the 'ready state', and the controller 190 of the washing machine 100 may obtain the state information of the drying machine 300.

The controller 190 of the washing machine 100 may receive the drying operation information and/or the drying setting information of the drying machine 300 through the communication circuitry 180. For example, the controller 190 may determine whether the drying machine 300 is in the "on state," and when it is in the "on state," the controller 190 may determine whether the drying machine 300 is in the drying operation. When the drying machine 300 is in the drying operation, the controller 190 may receive the time remaining until the drying operation is completed through the communication circuitry 180. Based on the information received from the drying machine 300, the controller 190 may determine whether the drying machine 300 is in the "on state," and when it is in the "on state," the controller 190 may determine whether the drying machine 300 is in the drying operation. When the drying machine 300 is in the drying operation, the controller 190 may identify the time remaining until the drying operation is completed.

As such, the washing machine 100 may identify whether the washing machine 100 is connected to the drying machine 300 after being powered on, and receive the operation information and/or the setting information of the drying machine 300 from the drying machine 300.

However, the disclosure is not limited thereto, and the washing machine 100 may supply power to the communication circuitry 180 at a predetermined cycle during the 'off state,' identify whether the washing machine 100 is connected to the drying machine 300 through the communication circuitry 180, and receive the operation information and/or the setting information of the drying machine 300 from the drying machine 300. In addition, the washing machine 100 may identify whether the washing machine 100 is connected to the drying machine 300 through the communication circuitry 180 at the predetermined cycle even during the "on state" and receive the operation information and/or the setting information of the drying machine 300 from the drying machine 300.

The washing machine 100 may activate the washer control and display washing-related information (1030). In addition, the washing machine 100 may obtain the user input related to the washing.

After the washing machine 100 is turned on, the washer control may be activated. In other words, the washer control mode may be a default setting of an operation mode of the washing machine 100. After the washing machine 100 is turned on, until the user input for switching the operation mode is obtained, the controller 190 may operate in the washer control mode.

When the washer control is activated, the controller 190 may display information of the washing machine 100 and obtain the user input to the washing machine 100. Particularly, in the washer control mode, the controller 190 may display the washing operation information and/or washing setting information and obtain the user input for controlling the washing operation and/or the washing setting.

The controller 190 may control the control panel 110 so that the washer control button 222 emits light. The controller 190 may control the control panel 110 to display the washing course on the display panel 251. In addition, the controller 190 may control the control panel 110 to display the 'washing temperature,' 'number of rinsing times,' and 'dehydrating strength' on the first setting button 261, the second setting button 262, and the third setting button 263, respectively. In other words, the controller 190 may control the control panel 110 to display information related to the operation of the washing machine 100 on the display, and obtain inputs related to the operation of the washing machine 100 through input buttons.

When the washing machine 100 is in operation, the controller 190 may display information about the washing operation of the washing machine 100 on the control panel 110. For example, the controller 190 may display the time remaining until the end of the washing operation on the display panel 251.

In addition, when the washing machine 100 is not in operation, the controller 190 may display information about the washing setting of the washing machine 100 on the control panel 110. For example, the controller 190 may display the washing course on the display panel 251, the washing temperature on the first setting display 271, the number of rinsing times on the second setting display 272, and the dehydrating strength on the third setting display 273.

As such, the washing machine 100 may display information about the washing operation or information about the washing setting of the washing machine 100 on the control panel 110 during the washer control mode.

The washing machine 100 may obtain the user input for activating the dryer control while the washer control is activated (1040).

The control panel 110 may be provided with the dryer control button 221 for obtaining the user input to activate the dryer control for controlling the drying machine 300. In order to activate the operation mode of the washing machine 100 to the dryer control that can control the drying machine 300 using the control panel 110 of the washing machine 100, the user may touch or press the dryer control button 221.

When the dryer control button 221 is touched or pressed, the controller 190 may determine that the user input for activating the dryer control is obtained.

The washing machine 100 may transmit a state switching request to the "on state" to the drying machine 300, and the drying machine 300 may receive the state switching request from the washing machine 100 (1045).

The controller 190 of the washing machine 100 may determine whether the washing machine 100 is connected to the drying machine 300. When it is determined that the washing machine 100 is connected to the drying machine 300, the controller 190 of the washing machine 100 may request to the drying machine 300 to switch the state of the drying machine 300.

Operation 1045 may be the same as operation 1015.

Upon receiving the state switching request, the drying machine 300 may switch to the 'on state' (1050).

In the 'ready state', the controller 390 of the drying machine 300 may switch to the 'on state' in response to the request from the washing machine 100. In the 'on state', the power may be supplied to each component of the drying machine 300, and in particular, the displays 451, 471, 472, 473, and 491 of the control panel 310 may be switched to the ON state. In other words, the control panel 310 may display information on the drying machine 300.

The drying machine 300 may transmit the state information of the drying machine 300 to the washing machine 100, and the washing machine 100 may receive the state information of the drying machine 300 (1055).

Operation 1055 may be the same as operation 1025.

As described above, when the washing machine 100 obtains the user input for activating the dryer control, the washing machine 100 may identify whether the washing machine 100 is connected to the drying machine 300 and receive the operation information and/or the setting information of the drying machine 300 from the drying machine 300.

However, the disclosure is not limited thereto, and the washing machine 100 may identify whether the washing machine 100 is connected to the drying machine 300 through the communication circuitry 180 at the predetermined cycle and receive the operation information and/or the setting information of the drying machine 300 from the drying machine 300.

Thereafter, the washing machine 100 may activate the dryer control and display drying-related information (1060). In addition, the washing machine 100 may obtain the user input related to drying.

In response to the dryer control button 221 being touched, the controller 190 may display the drying operation information and/or the drying setting information of the drying machine 300 and activate the dryer control for obtaining the user input to the drying machine 300.

The controller 190 may display information on the drying machine 300 received through the communication circuitry 180 and obtain the user input for the drying machine 300 while the dryer control is activated. Particularly, in the dryer control mode, the controller 190 may display the drying operation information and/or the drying setting information and obtain the user input for controlling the drying operation and/or the drying setting.

The controller 190 may control the control panel 110 so that the dryer control button 221 emits light. The controller 190 may control the control panel 110 to display the drying course on the display panel 251. In addition, the controller 190 may control the control panel 110 to display the 'degree of drying,' 'anti-wrinkle,' and 'time setting' on the first setting button 261, the second setting button 262, and the third setting button 263, respectively. In other words, the controller 190 may control the control panel 110 to display information related to the operation of the drying machine 300 on the display, and obtain inputs related to the operation of the drying machine 300 through input buttons.

When the drying machine 300 is in the drying operation, the controller 190 may display information about the drying operation of the drying machine 300 on the control panel 110. For example, the controller 190 may display the time remaining until the end of the drying operation on the display panel 251.

In addition, when the drying machine 300 is not in operation, the controller 190 may display information about the drying setting of the drying machine 300 on the control panel 110. For example, the controller 190 may display the drying course on the display panel 251, the degree of drying on the first setting display 271, the additional time for anti-wrinkle on the second setting display 272, and the drying time on the third setting display 273.

As such, the washing machine 100 may display information about the drying operation or information about the drying setting of the drying machine 300 on the control panel 110 while the dryer control is activated.

The washing machine 100 may obtain the user input for activating the washer control while the dryer control is activated (1070).

The control panel 110 may be provided with the washer control button 222 for obtaining the user input to activate the washer control for controlling the washing machine 100. In order to switch the operation mode of the washing machine 100 to the washer control mode that can control the washing machine 100 using the control panel 110 of the washing machine 100, the user may touch or press the washer control button 222.

When the washer control button 222 is touched or pressed, the controller 190 may determine that the user input for activating the washer control is obtained.

The washing machine 100 may transmit a state switching request to the 'ready state' to the drying machine 300, and the drying machine 300 may receive the state switching request from the washing machine 100 (1075).

Operation 1075 may be the same as operation 1015.

In the 'on state', the controller 390 of the drying machine 300 may switch to the 'ready state' in response to the request from the washing machine 100.

The drying machine 300 may transmit the state information of the drying machine 300 to the washing machine 100, and the washing machine 100 may receive the state information of the drying machine 300 (1085).

Operation 1055 may be the same as operation 1025.

After that, the washing machine 100 may activate the washer control and display washing-related information (1090). In addition, the washing machine 100 may obtain the user input related to washing.

Operation 1090 may be the same as operation 1030.

As described above, the washing machine 100, depending on the user input, may operate in the washer control mode for controlling the washing operation and/or the washing setting of the washing machine 100 or may operate in the dryer control mode for controlling the drying operation and/or the drying setting of the drying machine 300.

Thereby, the user may control the drying operation of the drying machine 300 and input the drying settings using the control panel 110 of the washing machine 100. For example, when the drying machine 300 is located on top of the washing machine 100, the user may control the drying machine 300 using the control panel 110 of the washing machine 100 without manipulating the control panel 310 of the drying machine 300.

Figure 15:
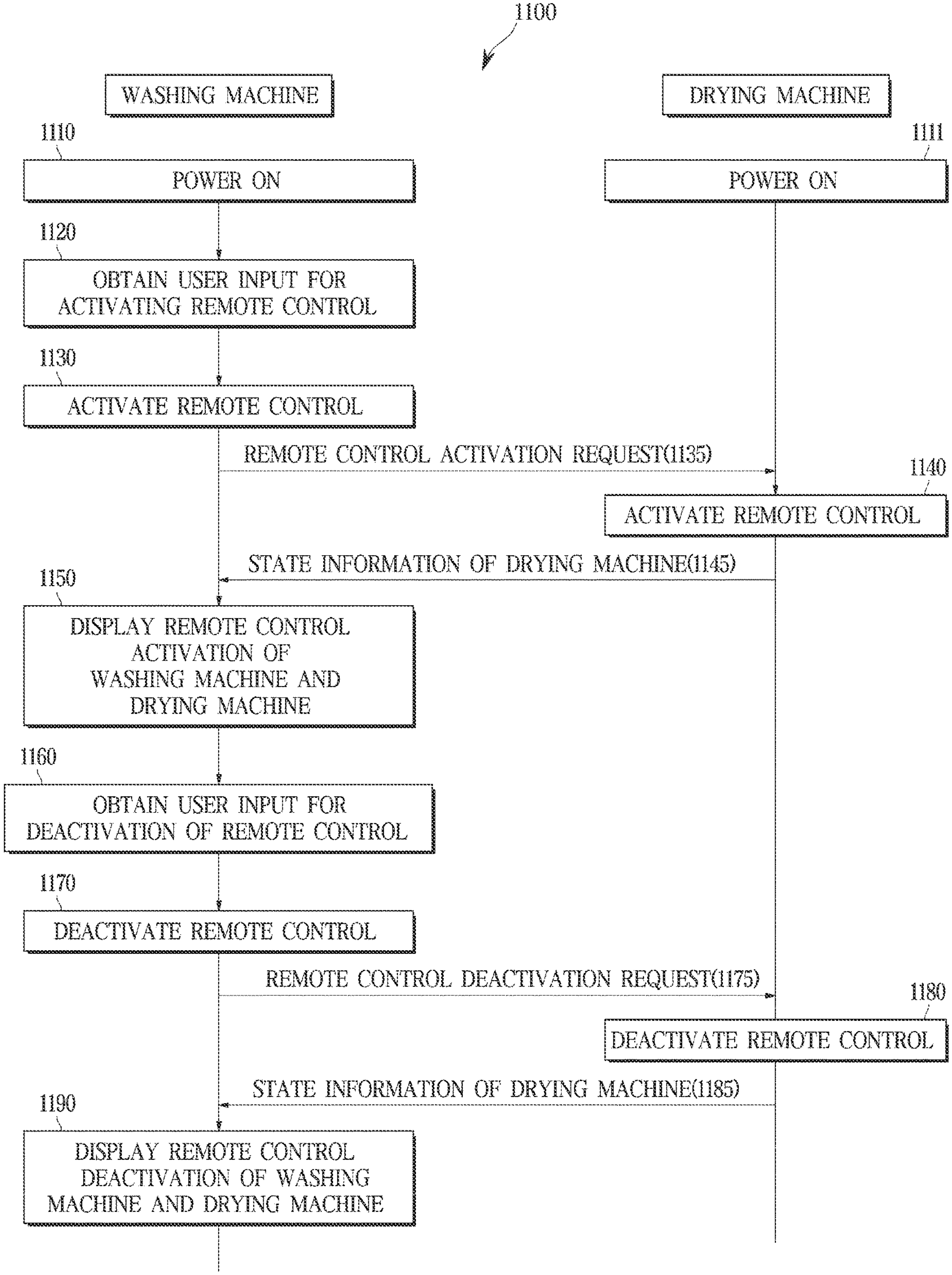
FIG. 15 is a view illustrating a method of activating remote control of a washing machine and a drying machine according to an embodiment of the disclosure.
Figure 16:
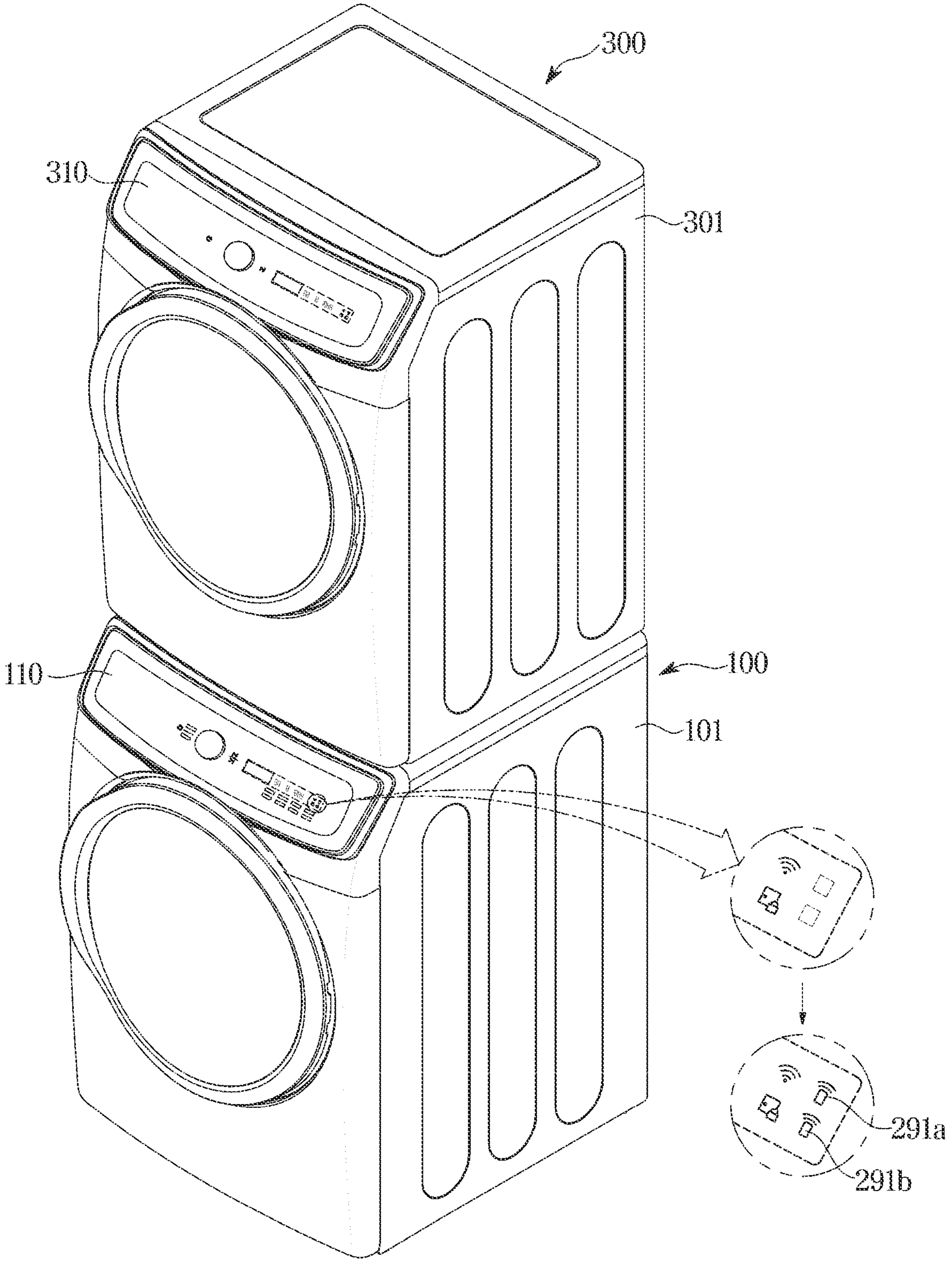
FIG. 16 is a view illustrating that a washing machine displays activation of remote control of the washing machine and a drying machine according to an embodiment of the disclosure.

FIG. 15 is a view illustrating a method of activating remote control of a washing machine and a drying machine according to an embodiment of the disclosure. FIG. 16 is a view illustrating that a washing machine displays activation of remote control of the washing machine and a drying machine according to an embodiment of the disclosure.

Referring to FIGS. 15 and 16, a method 1100 of activating remote control of the washing machine 100 and the drying machine 300 will be described.

The washing machine 100 is powered on (1110), and the drying machine 300 is powered on (1111).

The washing machine 100 may be switched from the 'off state' to the 'on state' by power on.

The drying machine 100 may be in the 'ready state' or the 'on state'. The drying machine 300 may be in the 'ready state' in response to the state information request from the washing machine 100 and may also be in the 'on state' in response to the state switching request from the washing machine 100. Both the 'ready state' and the 'on state' of the drying machine 300 may be in a power-on state.

Operation 1110 may be the same as operation 1010 illustrated in FIG. 14.

Operation 1111 may be the same as at least one of operation 1020, operation 1050, and operation 1080 illustrated in FIG. 14.

The washing machine 100 may obtain the user input for activating the remote control (1120).

Here, the remote control of the washing machine 100 may refer to control of the washing machine 100 by the external device such as the terminal, the portable device, the user device, the computing device, the communication circuitry, or the server device. For safety reasons, the remote control of the washing machine 100 may be activated only by the remote control button 281 provided on the washing machine 100.

The control panel 110 of the washing machine 100 may include the remote control button 281 for activating or deactivating the remote control of the washing machine 100 and/or the drying machine 300 using the external device (e.g., the user device). For example, the user may input the user input for activating the remote control of the washing machine 100 and/or the drying machine 300 through the remote control button 281.

The controller 190 of the washing machine 100 may obtain the user input for activating the remote control of the washing machine 100 and/or the drying machine 300 through the remote control button 281.

The washing machine 100 may activate the remote control in response to the user input for activation of the remote control (1130).

The controller 190 of the washing machine 100 may allow the remote control of the washing machine 100 by the external device (e.g., the user device, etc.). For example, the controller 190 may wirelessly obtain the control command for the remote control from the external device through the communication circuitry 180, and control the operation of the washing machine 100 in response to the obtained control command.

The washing machine 100 may transmit a remote control activation request to the drying machine 300 and the drying machine 300 may receive the remote control activation request from the washing machine 300 (1135).

The controller 190 of the washing machine 100 may determine whether it is connected to the drying machine 300. When it is determined that it is connected to the drying machine 300, the controller 190 may request the drying machine 300 to activate the remote control. The controller 190 may transmit the request for activation of the remote control of the drying machine 300 regardless of whether the washing machine 100 has activated the washer control or the dryer control activated.

Operation 1135 may be similar to operation 1015 illustrated in FIG. 14.

The drying machine 300 may activate the remote control in response to receiving the request for activation of the remote control (1140).

The controller 390 of the drying machine 300 may allow the remote control of the drying machine 300 by the external device (e.g., the user device). For example, the controller 390 may wirelessly obtain the control command for remote control from the external device through the communication circuitry 380 and control the operation of the drying machine 300 in response to the obtained control command.

The drying machine 300 may transmit the state information on which the remote control is activated to the washing machine 100, and the washing machine 100 may receive the state information of the drying machine 300 (1145).

The controller 390 of the drying machine 300 may transmit the state information of the drying machine 100 on which the remote control is activated to the washing machine 100. The controller 190 of the washing machine 100 may obtain information about activation of the remote control of the drying machine 300 through the communication circuitry 180 and store activation of the remote control of the drying machine 300.

The washing machine 100 may display remote control activation of the washing machine 100 and the drying machine 300 (1150).

The controller 190 of the washing machine 100 may display activation of the remote control of the washing machine 100 and the drying machine 300 through the control panel 110.

Referring to FIG. 16, the controller 190 may control the control panel 110 so that the remote control of the drying machine 300 displays the first indicator 291*a* indicating activation and the second indicator 291*b* indicating activation by the remote control of the washing machine 100. Particularly, the controller 190 may control the control panel 110 to turn on the ninth upper light source 291*u* of the first indicator 291*a* and the ninth lower light source 291*d* of the second indicator 291*b*.

The washing machine 100 may obtain the user input for deactivation of the remote control (1160).

The user may input the user input for deactivating the remote control of the washing machine 100 and/or the drying machine 300 through the remote control button 281 while the remote control of the washing machine 100 and/or the drying machine 300 is activated.

The controller 190 of the washing machine 100 may obtain the user input for deactivating the remote control of the washing machine 100 and/or the drying machine 300 through the remote control button 281.

The washing machine 100 may deactivate the remote control in response to the user input for deactivation of the remote control (1170).

The controller 190 of the washing machine 100 may block the remote control of the washing machine 100 by the external device (e.g., the user device).

The washing machine 100 may transmit a remote control deactivation request to the drying machine 300 and the drying machine 300 may receive the remote control deactivation request from the washing machine 300 (1175).

The controller 190 of the washing machine 100 may transmit the request for deactivation of the remote control of the drying machine 300 regardless of whether the washing machine 100 has activated the washer control or the dryer control.

Operation 1175 may be similar to operation 1015 illustrated in FIG. 14.

In response to receiving the request for deactivation of the remote control, the drying machine 300 may deactivate the remote control (1180).

The controller 390 of the drying machine 300 may block the remote control of the drying machine 300 by the external device (e.g., the user device).

The drying machine 300 may transmit the state information in which the remote control is deactivated to the washing machine 100, and the washing machine 100 may receive the state information of the drying machine 300 (1185).

The controller 190 of the washing machine 100 may obtain information about remote control deactivation of the drying machine 300 through the communication circuitry 180 and store deactivation of the remote control of the drying machine 300.

The washing machine 100 may display remote control deactivation of the washing machine 100 and the drying machine 300 (1190).

The controller 190 of the washing machine 100 may display deactivation of remote control of the washing machine 100 and the drying machine 300 through the control panel 110.

For example, the controller 190 may control the control panel 110 so that the first indicator 291*a* and the second indicator 291*b* are not displayed. Particularly, the controller 190 may control the control panel 110 to turn off the ninth upper light source 291*u* of the first indicator 291*a* and the ninth lower light source 291*d* of the second indicator 291*b*.

As described above, the user may input the user input for activating or deactivating a common function of both the washing machine 100 and the drying machine 300, that is, the remote control by touching one button provided on the washing machine 100. When both the washing machine 100 and the drying machine 300 are provided, the user generally uses both the washing machine 100 and the drying machine 300. In addition, the user may remotely control both the washing machine 100 and the drying machine 300.

By activating the remote control of both the washing machine 100 and the drying machine 300 through one button, the washing machine 100 and the drying machine 300 may satisfy needs of the user who wants to simultaneously control the common functions of the washing machine 100 and the drying machine 300 and provide convenience to the user.

Figure 17:
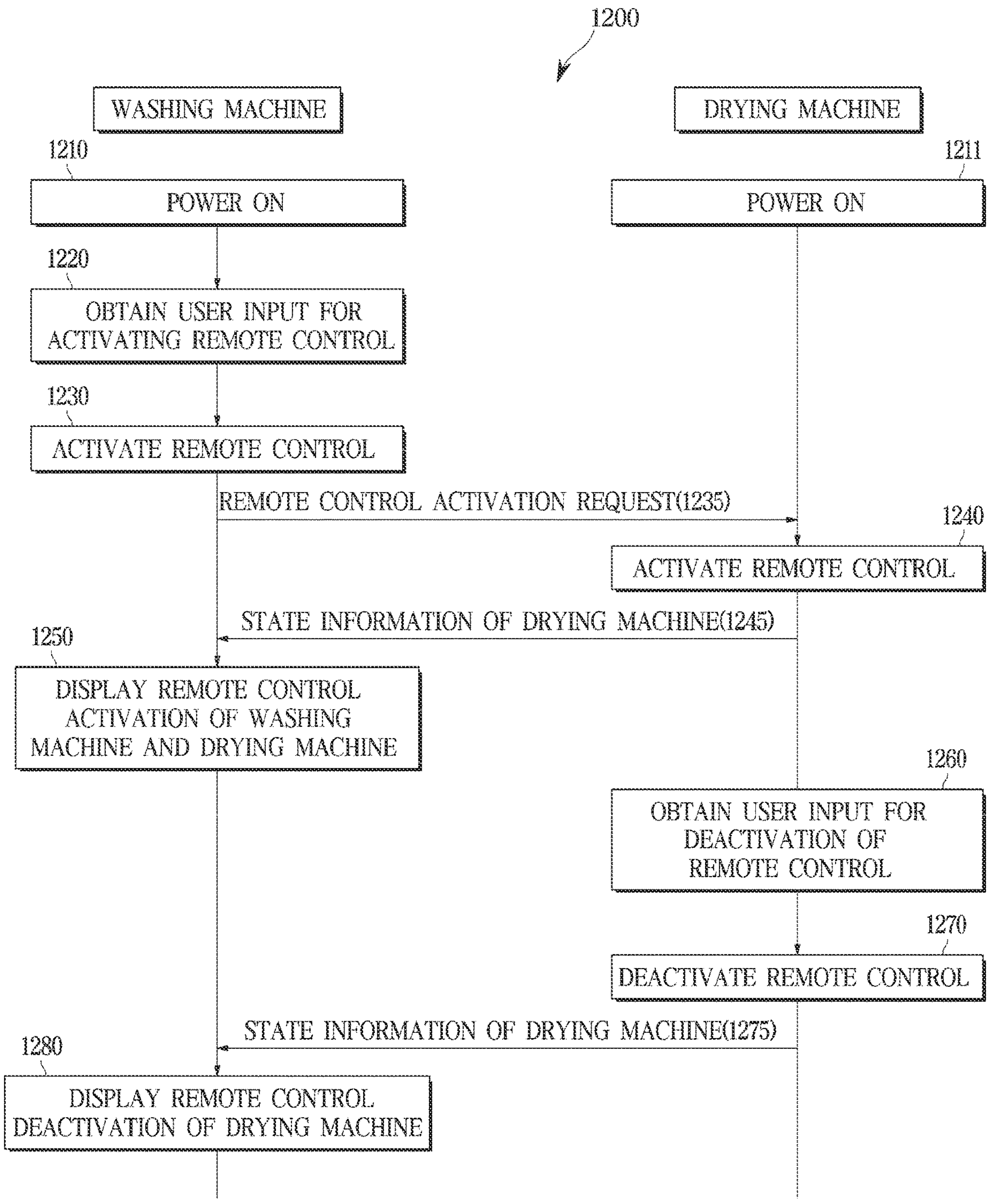
FIG. 17 is a view illustrating a method of activating remote control of a washing machine and a drying machine according to an embodiment of the disclosure.
Figure 18:
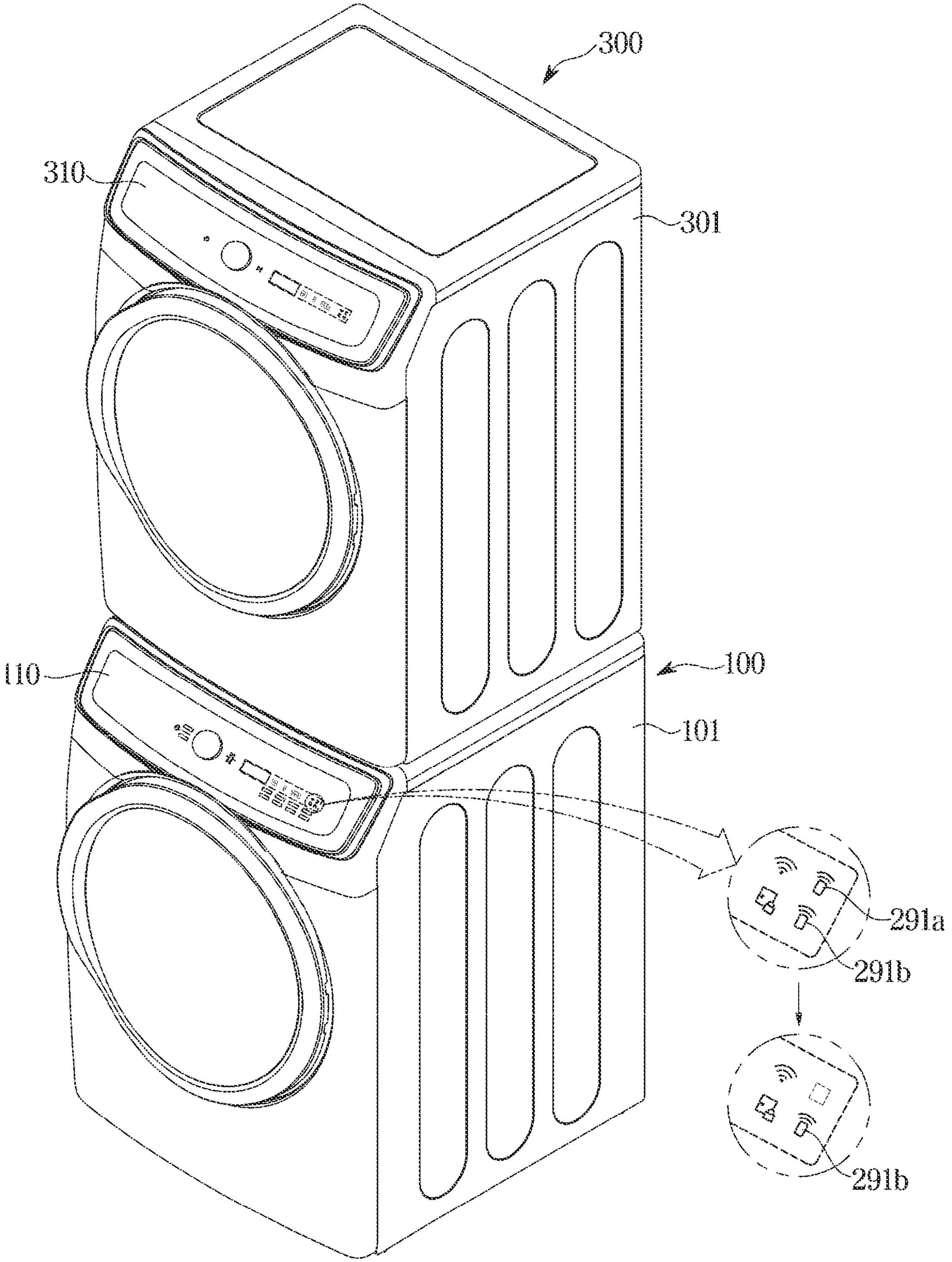
FIG. 18 is a view illustrating that a washing machine displays activation of remote control of the washing machine and a drying machine according to an embodiment of the disclosure.

FIG. 17 is a view illustrating a method of activating remote control of a washing machine and a drying machine according to an embodiment of the disclosure. FIG. 18 is a view illustrating that a washing machine displays activation of remote control of the washing machine and a drying machine according to an embodiment of the disclosure.

Referring to FIGS. 17 and 18, a method 1200 of activating remote control of the washing machine 100 and the drying machine 300 will be described.

The washing machine 100 is powered on (1210), and the drying machine 300 is powered on (1211).

Operations 1210 and 1211 may be the same as operations 1110 and 1111 illustrated in FIG. 15.

The washing machine 100 may obtain the user input for activating the remote control (1220), activate the remote control in response to the user input for activating the remote control (1230), and transmit the remote control activation request to the drying machine 300 (1235). The drying machine 300 may receive the remote control activation request from the washing machine 300 (1235), activate the remote control in response to receiving the remote control activation request (1240), and transmit the state information on which the remote control is activated to the washing machine 100 (1245). The washing machine 100 may receive the state information of the drying machine 300 (1245), and the washing machine 100 may display remote control activation of the washing machine 100 and the drying machine 300 (1250).

Operation 1220, operation 1230, operation 1235, operation 1240, operation 1245, operation 1250 may be the same as operation 1120, operation 1130, operation 1135, operation 1140, operation 1145 and operation 1150 illustrated in FIG. 15. At operation 1280, remote control deactivation of the drying machine 300 is displayed.

The drying machine 300 may obtain the user input for deactivation of the remote control (1260).

The remote control button 481 for activating or deactivating the remote control of the drying machine 300 using the external device (for example, the user device, etc.) may be provided on the control panel 310 of the drying machine 300. For example, the user may input the user input for deactivating the remote control of the drying machine 300 through the remote control button 481.

The controller 390 of the drying machine 300 may obtain the user input for deactivating the remote control of the drying machine 300 through the remote control button 481.

The drying machine 300 may deactivate the remote control in response to the user input for deactivation of the remote control (1260).

The controller 390 of the drying machine 300 may block the remote control of the drying machine 300 by the external device (e.g., a user device, etc.).

The controller 390 may display inactivation of the remote control through the control panel 310. For example, the controller 390 may switch the power state of the drying machine from the 'ready state' to the 'on state' in response to the user input for deactivating the remote control. In other words, the controller 390 may display the state information of the drying machine 300 on the displays 451, 471, 472, 473 and 491 of the control panel 310. For example, the controller 390 may control the control panel 310 so as not to display an indicator of the additional setting display 491 indicating activation of the remote control of the drying machine 300.

The drying machine 300 may transmit the state information in which the remote control is deactivated to the washing machine 100, and the washing machine 100 may receive the state information of the drying machine 300 (1275).

Operation 1275 may be the same as operation 1185 illustrated in FIG. 15.

The washing machine 100 may display the remote control deactivation of the drying machine 300 (1280).

The controller 190 of the washing machine 100 may display deactivation of the remote control of the drying machine 300 through the control panel 110.

For example, as illustrated in FIG. 18, the controller 190 may control the control panel 110 so that the remote control of the drying machine 300 does not display the first indicator 291*a* indicating activation, and the remote control of the washing machine 100 displays the second indicator 291*b* indicating activation. Particularly, the controller 190 may control the control panel 110 to turn off the ninth upper light source 291*u* of the first indicator 291*a* and turn on the ninth lower light source 291*d* of the second indicator 291*b*.

As described above, the user may input the user input for activating or deactivating the remote control of both the washing machine 100 and the drying machine 300 by touching one button provided on the washing machine 100. In addition, the user may input the user input for activating or deactivating the remote control of the drying machine 300 by touching the button provided on the drying machine 300.

By allowing the drying machine 300 to selectively activate or deactivate the remote control, the washing machine 100 and the drying machine 300 may satisfy the need of the user who wants to separately control the drying machine 300 and provide convenience to the user.

Figure 19:
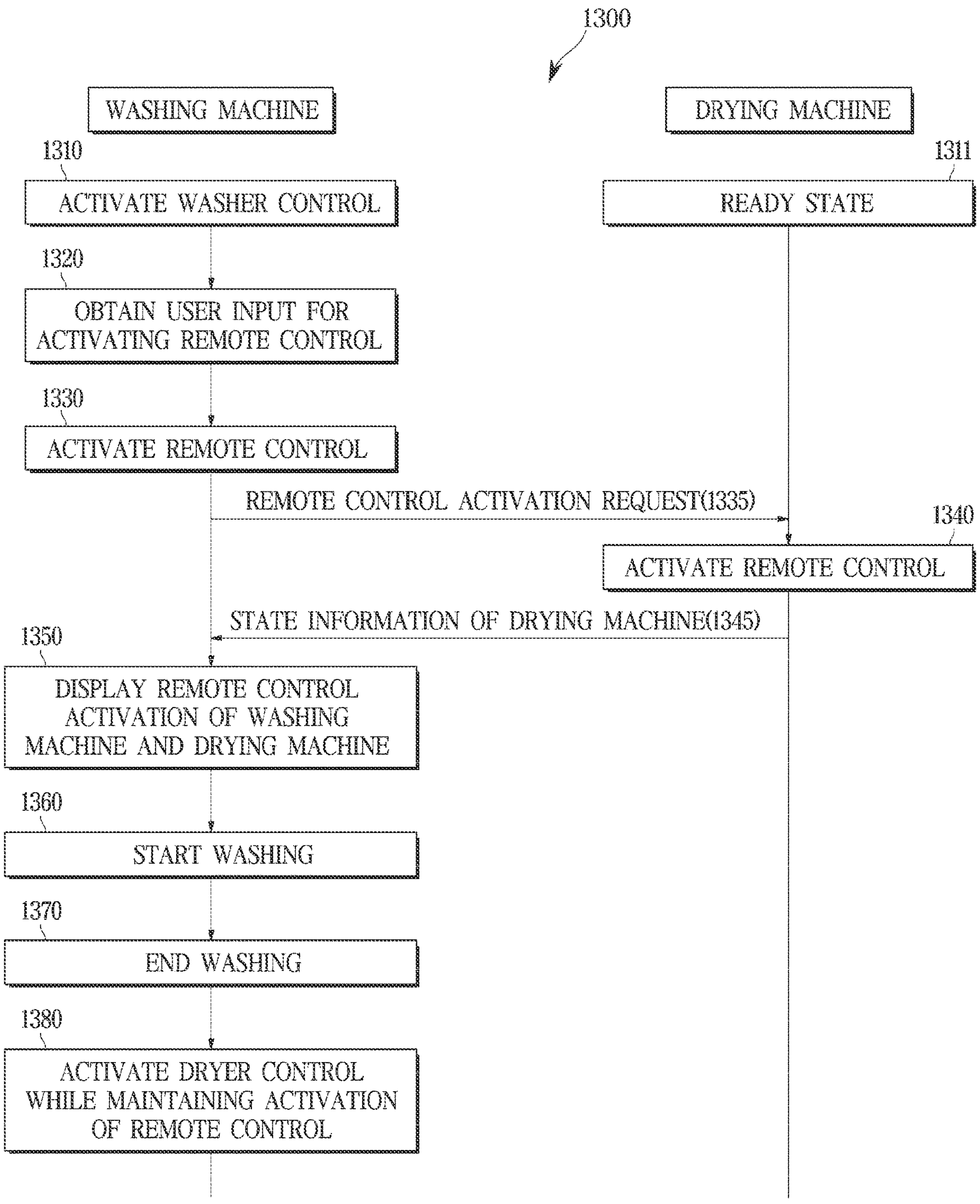
FIG. 19 is a view illustrating an operation of maintaining remote control after a washing of a washing machine is completed according to an embodiment of the disclosure.

FIG. 19 is a view illustrating an operation of maintaining remote control after a washing of a washing machine is completed according to an embodiment of the disclosure.

Referring to FIG. 19, operation 1300 of maintaining the remote control after the washing of the washing machine 100 is completed will be described.

The washing machine 100 is activated with the washer control (1310), and the drying machine 300 is in the 'ready state' (1311).

For example, when the washing machine 100 is turned on in response to the user input for turning on in the 'off state', the washer control may be activated. In addition, the washing machine 100 may activate the washer control in response to the user input for mode switching while the dryer control is activated. When the washer control is activated, the controller 190 of the washing machine 100 may display the information of the washing machine 100 on the control panel 110, and obtain the user input for the washing machine 100 through the control panel 110.

When the drying machine 300 is turned on in response to the request from the washing machine 100 in the 'off state', the drying machine 300 may be placed in the 'ready state'. In addition, the drying machine 300 may be switched from the 'on state' to the 'ready state' in response to the request from the washing machine 100. In the 'ready state', the controller 390 of the drying machine 300 and the touch sensors of the control panel 310 are activated, and the displays such as the light emitting diode of the control panel 310 may be deactivated.

The washing machine 100 may obtain the user input for activating the remote control (1320), activate the remote control in response to the user input for activating the remote control (1330), and transmit the remote control activation request to the drying machine 300 (1335). The drying machine 300 may receive the remote control activation request from the washing machine 300 (1335), activate the remote control in response to receiving the remote control activation request (1340), and transmit the state information on which the remote control is activated to the washing machine 100 (1345). The washing machine 100 may receive the state information of the drying machine 300 (1345), and display the remote control activation of the washing machine 100 and the drying machine 300 (1350).

Operation 1320, operation 1330, operation 1335, operation 1340, operation 1345, and operation 1350 may be the same as operation 1120, operation 1130, operation 1135, operation 1140, operation 1145 and operation 1150 illustrated in FIG. 15.

The washing machine 100 may start the washing (1360).

The controller 190 of the washing machine 100 may obtain the user input for setting the washing course and detailed washing from the user through the control panel 110 while the washer control is activated. For example, the user may select the washing course by rotating the dial 241. In addition, the user may select detailed washing settings by touching the first, second and third setting buttons 261, 262, and 263.

After selecting the washing course and detailed setting, the user may input the user input for the operation of the washing machine 100 by touching the washing operation button 232. The washing machine 100 may start the washing in response to the user input for washing.

During the washing, the washing machine 100 may perform at least one of the washing process, the rinsing process, and the dehydrating process. The controller 190 may control the drum motor 140, the water supply valve 152, the drain pump 162, and the door lock to sequentially perform the washing, rinsing, and dehydrating processes.

The washing machine 100 may end the washing (1370).

The controller 190 of the washing machine 100 may end the operation of the washing machine 100 when the washing process, the rinsing process, and the dehydrating process are sequentially completed.

The washing machine 100 may activate the dryer control while maintaining the activation of the remote control (1380).

The controller 190 of the washing machine 100 may identify whether the drying machine 300 is in the 'ready state' based on previously stored state information of the drying machine 300. When the drying machine 300 is in the 'ready state', the controller 190 may activate the dryer control while maintaining the activation of the remote control after the operation of the washing machine 100 is ended.

In general, after washing the laundry using the washing machine 100, the user may move the laundry to the drying machine 300 to dry the laundry. Therefore, when the drying machine 300 is not in operation and the washing of the washing machine 100 is completed, it is expected that the user moves the laundry of the washing machine 100 to the drying machine 300 and operates the drying machine 300.

For this reason, when the washing is completed while the drying machine 300 is not operating, the controller 190 may maintain the 'on state' in which the remote control of the washing machine 100 and the drying machine 300 is activated.

Thereby, the washing machine 100 may allow the user to continuously control the washing machine 100 and the drying machine 300 after the operation of the washing machine 100 is completed.

Figure 20:
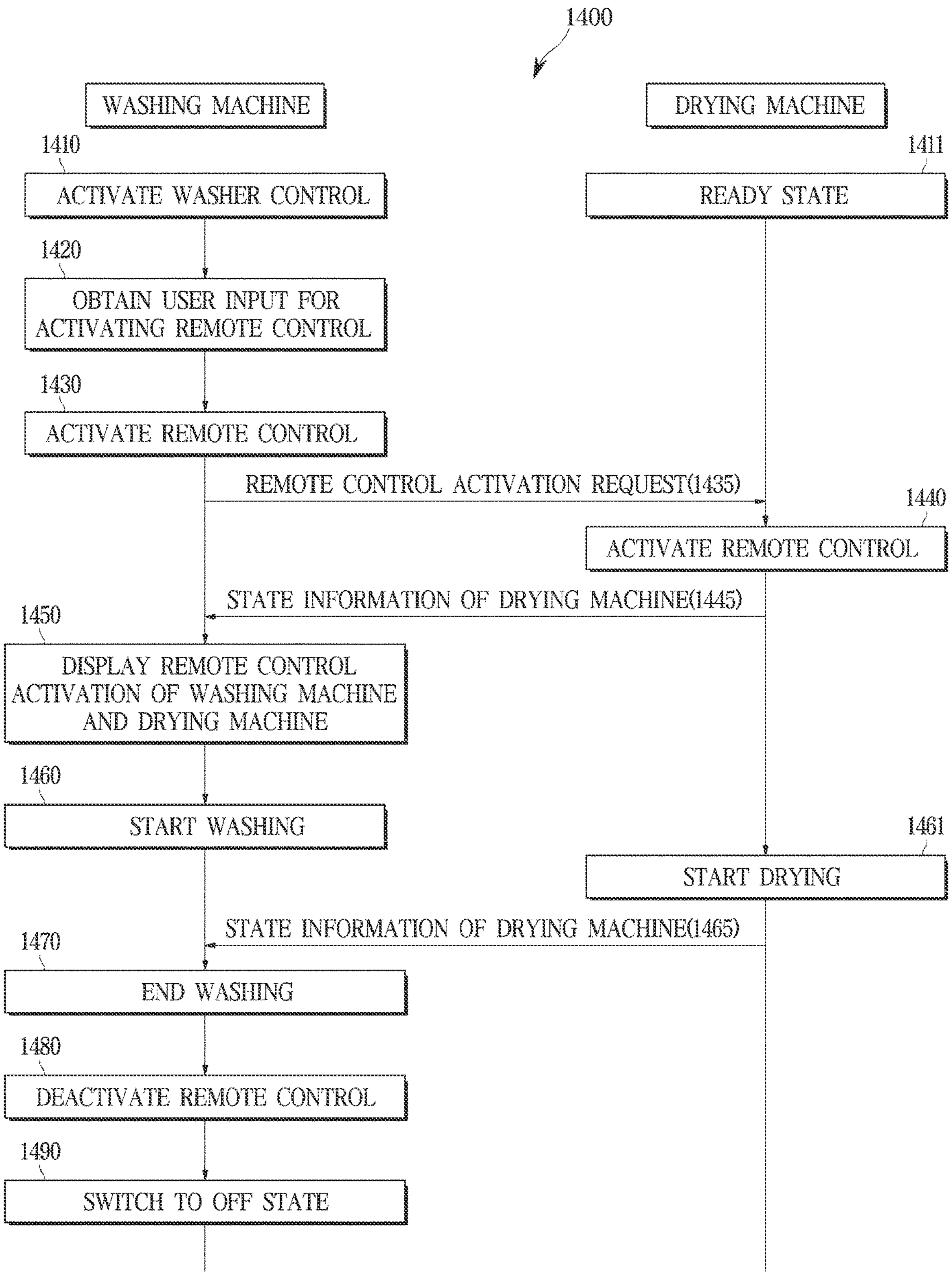
FIG. 20 is a view illustrating an operation of blocking remote control after a washing of a washing machine is completed according to an embodiment of the disclosure.

FIG. 20 is a view illustrating an operation of blocking remote control after a washing of a washing machine is completed according to an embodiment of the disclosure.

Referring to FIG. 20, a method 1400 of blocking the remote control after the washing of the washing machine 100 is completed will be described.

The washing machine 100 may be activated with the washer control (1410), and the drying machine 300 is in the 'ready state' (1411).

Operations 1410 and 1411 may be the same as operations 1310 and 1311 illustrated in FIG. 19.

The washing machine 100 may obtain the user input for activation of the remote control (1420), activate the remote control in response to the user input for activation of the remote control (1430), and transmit the remote control activation request to the drying machine 300 (1435). The drying machine 300 may receive the remote control activation request from the washing machine 300 (1435), activate the remote control in response to receiving the remote control activation request (1440), and transmit the state information on which the remote control is activated to the washing machine 100 (1445). The washing machine 100 may receive the state information of the drying machine 300 (1445), and display the remote control activation of the washing machine 100 and the drying machine 300 (1450).

Operation 1420, operation 1430, operation 1435, operation 1440, operation 1445, and operation 1450 may be the same as operation 1120, operation 1130, operation 1135, operation 1140, operation 1145 and operation 1150 illustrated in FIG. 15.

The washing machine 100 may start the washing (1460).

Operation 1460 may be the same as operation 1360 illustrated in FIG. 19.

The drying machine 300 may start drying (1461).

The drying machine 300 may perform an operation independently from the operation of the washing machine 100.

In the drawings, the washing of the washing machine 100 and the drying of the drying machine 300 are illustrated to be started almost simultaneously. The reference numerals in the drawings are numbered as starting the drying of the drying machine 300 after the washing of the washing machine 100 is started, but the reference numerals are not limited thereto.

The drying machine 300 may start the drying prior to the start of washing of the washing machine 100, and may also start the drying at the same time as the washing machine 100 starts the washing. In addition, the drying machine 300 may start the drying after the washing machine 100 starts the washing.

For example, the drying machine 300 may start the drying in response to the user input through the control panel 310 of the drying machine 300.

The user may touch the control panel 310 of the drying machine 300 to use the drying machine 300. In response to the user's touch input, the drying machine 300 may be switched from the 'ready state' to the 'on state', and turned on the displays 451, 471, 472, 473, and 491 of the control panel 310.

The controller 390 of the drying machine 300 may obtain the user input for setting the drying course and detailed drying from the user through the control panel 310. For example, the user may select the drying course by rotating the dial 441. In addition, the user may select detailed drying settings by touching the first, second and third setting buttons 461, 462, and 463.

After selecting the drying course and detailed setting, the user may input the user input for washing by touching the drying operation button 431. The washing machine 100 may start the drying in response to the user input for the washing.

As another example, the drying machine 300 may start the drying in response to the user input through the control panel 110 of the washing machine 100.

The user may operate the control panel 110 of the washing machine 300 to operate the drying machine 300. The controller 190 of the washing machine 100 may obtain the user input for setting the drying course and detailed drying from the user through the control panel 110 while the dryer control is activated.

After selecting the drying course and drying setting, the user may input the user input for the operation of the drying machine 300 by touching the drying operation button 231. The washing machine 100 may transmit a message for the drying operation to the drying machine 300, and the drying machine 300 may start the drying in response to the message of the washing machine 100.

The drying machine 300 may transmit the state information including that the drying operation is continuing to the washing machine 100, and the washing machine 100 may receive the state information from the drying machine 300 (1465).

The controller 190 of the washing machine 100 may obtain the state information of the drying machine 300 through the communication circuitry 180 and store the state information of the drying machine 300.

During the operation of the drying machine 300, the washing machine 100 may end the washing (1470).

During continuation of the operation of the drying machine 300, the controller 190 of the washing machine 100 may end the operation of the washing machine 100 when the washing, rinsing, and dehydrating processes are sequentially completed.

The washing machine 100 may deactivate the remote control (1480) and switch to the 'off state' (1490).

The controller 190 of the washing machine 100 may identify whether the drying machine 300 is operating based on the state information of the drying machine 300 previously stored. When the drying machine 300 is in operation, the controller 190 may deactivate the remote control after the operation of the washing machine 100 is ended, and may switch the washing machine 300 to the 'off state'.

In general, after the washing the laundry using the washing machine 100, the user moves the laundry to the drying machine 300 to dry the laundry. However, when the drying machine 300 is in operation, it is not expected that the user moves the laundry of the washing machine 100 to the drying machine 300 and operates the drying machine 300.

For this reason, when the washing is completed while the drying machine 300 is operating, the controller 190 may deactivate the remote control of the washing machine 100 and the drying machine 300, and may switch the washing machine 100 to the 'off state'.

As such, the washing machine 100 may prevent power consumption by maintaining the remote control and the 'on state' by switching to the 'off state' if the operation of the drying machine 300 is not expected after the operation is completed.

Figure 21:
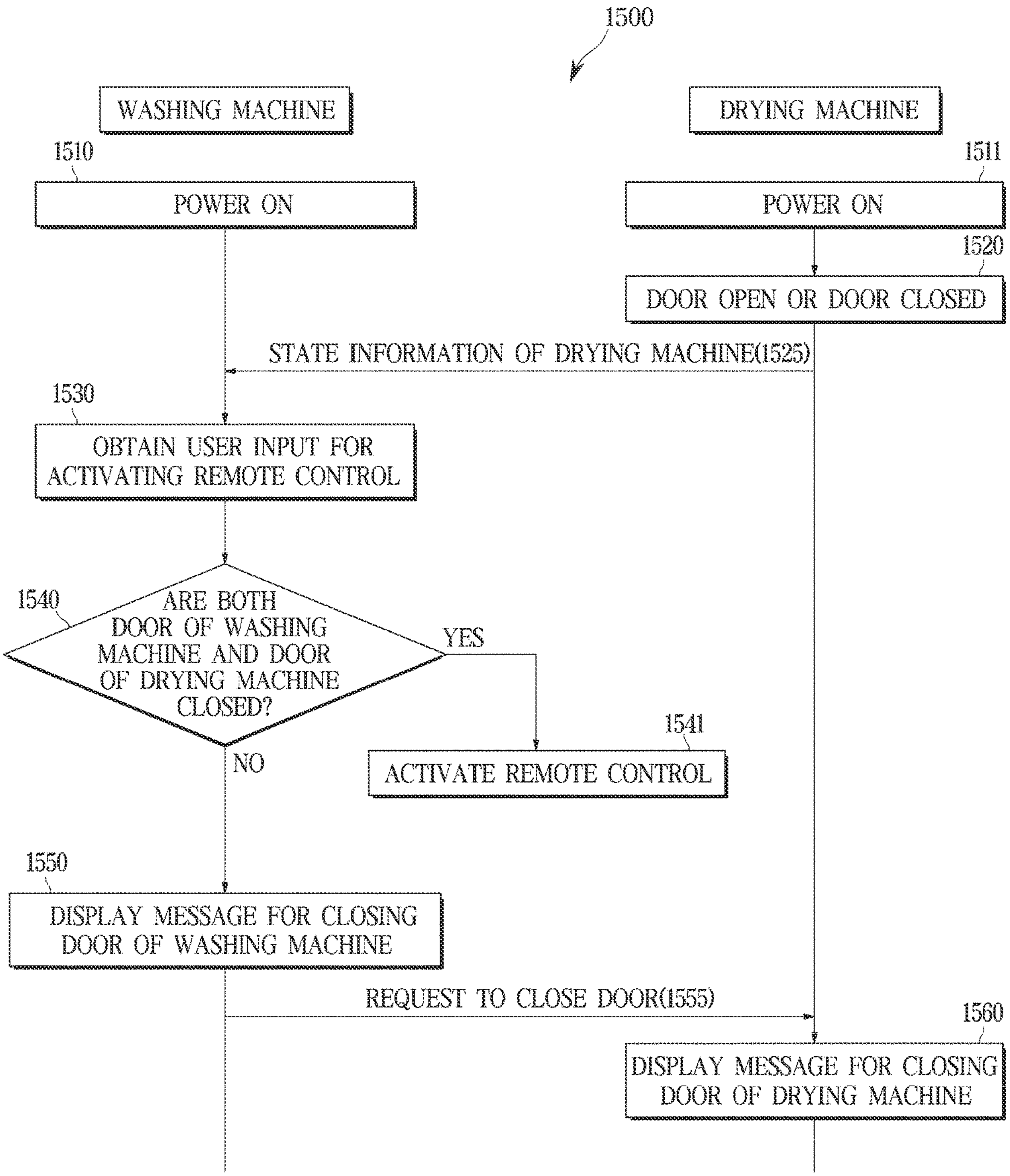
FIG. 21 is a view illustrating a method of activating remote control of a washing machine and a drying machine according to an embodiment of the disclosure.
Figure 22:
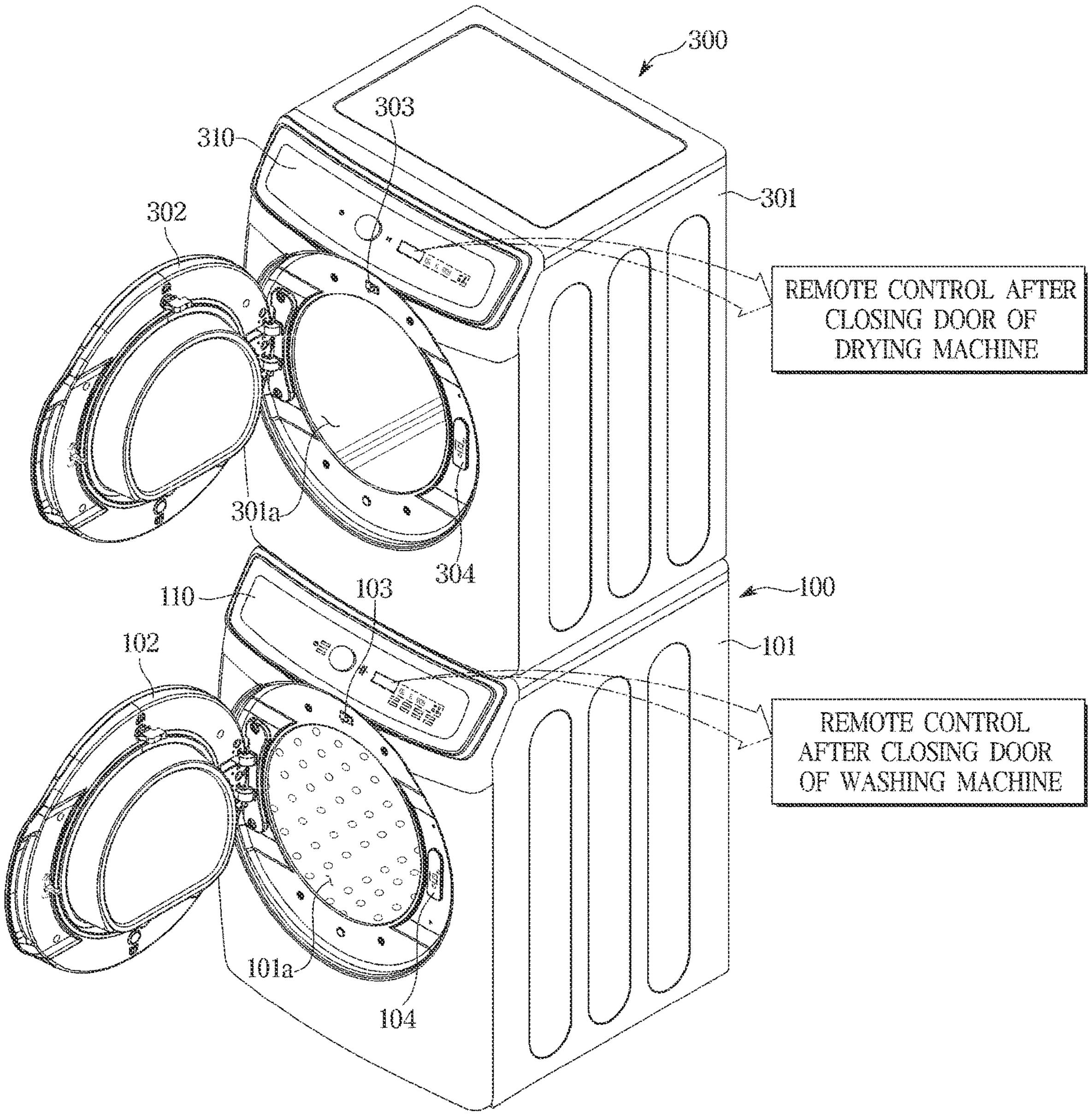
FIG. 22 is a view illustrating displaying a message for activating remote control of a washing machine and a drying machine according to an embodiment of the disclosure.

FIG. 21 is a view illustrating a method of activating remote control of a washing machine and a drying machine according to an embodiment of the disclosure. FIG. 22 is a view illustrating displaying a message for activating remote control of a washing machine and a drying machine according to an embodiment of the disclosure.

Referring to FIGS. 21 and 22, a method 1500 of activating the remote control of the washing machine 100 and the drying machine 300 will be described.

The washing machine 100 may be powered on (1510), and the drying machine 300 may be powered on (1511).

Operations 1510 and 1511 may be the same as operations 1110 and 1111 illustrated in FIG. 15.

The door 302 of the drying machine 300 may be opened or closed (1520).

The user may open or close the door 302 of the drying machine 300. For example, the user may open the door 302 of the drying machine 300 while the drying machine 300 is not operating, and the user may close the door 302 of the drying machine 300 to operate the drying machine 300 (302).

The controller 390 of the drying machine 300 may identify the opening or closing of the door 302 based on an output signal of the door switch 303. The door switch 303 may detect a state in which the door 302 is closed and a state in which the door 302 is open, respectively, and may provide a signal indicating the state in which the door 302 is closed or the state in which the door 302 is open to the controller 390.

The drying machine 300 may transmit state information including the opening or closing of the door 302 to the washing machine 100, and the washing machine 100 may receive the state information of the drying machine 300 (1525).

The controller 190 of the washing machine 100 may obtain the state information of the drying machine 300 through the communication circuitry 180 and store the state information of the drying machine 300.

The washing machine 100 may obtain the user input for activating the remote control (1530).

Operation 1530 may be the same as operation 1120 illustrated in FIG. 15.

The washing machine 100 may determine whether both the door 102 of the washing machine 100 and the door 303 of the drying machine 300 are closed (1540).

The controller 190 of the washing machine 100 may identify whether the door 303 of the drying machine 300 is closed based on the state information of the drying machine 300 received and stored from the drying machine 300.

The controller 190 may also identify the opening or closing of the door 102 based on the output signal of the door switch 103. The door switch 103 may detect the state in which the door 102 is closed and the state in which the door 102 is open, respectively, and may provide the signal indicating the state in which the door 102 is closed or the state in which the door 102 is open to the controller 190.

When it is determined that both the door 102 of the washing machine 100 and the door 303 of the drying machine 300 are closed (YES in 1540), the washing machine 100 may activate the remote control of the washing machine 100 and the machine 300 (1541).

The washing machine 100 may activate the remote control and transmit the request to activate the remote control to the drying machine 300. The drying machine 300 may receive the remote control activation request from the washing machine 300, activate the remote control in response to receiving the remote control activation request, and transmit the state information on which the remote control is activated to the washing machine 100. The washing machine 100 may receive the state information of the drying machine 300 and display the remote control activation of the washing machine 100 and the drying machine 300.

In addition, when the remote control is activated for safety reasons, the door 102 of the washing machine 100 and the door 302 of the drying machine 300 may be locked.

When it is determined that the door 102 of the washing machine 100 or the door 303 of the drying machine 300 is not closed (NO in 1540), the washing machine 100 may display a message for closing the door (1550).

By the remote control, the user may remotely control the washing machine 100 and/or the drying machine 300. In other words, the user may control the washing machine 100 and/or the drying machine 300 without checking the inside of the drum 130 of the washing machine 100 and/or the inside of the drum 330 of the drying machine 300. Therefore, there is a concern of a safety accident. For example, in a state in which a child or companion animal enters the drum 130 of the washing machine 100 or the drum 330 of the drying machine 300, the washing machine 100 or the drying machine 300 may operate.

Therefore, for safety reasons, the remote control of the washing machine 100 may be activated only by the remote control button 281 provided in the washing machine 100. Further, the remote control of the drying machine 300 may be activated only by the remote control button 281 provided on the washing machine 100 or the remote control button provided on the drying machine 300.

In addition, for safety reasons, the remote control of the washing machine 100 may be activated only when the door 102 is closed. When the remote control of the washing machine 100 is activated, the door 102 may be locked by the door lock 104. The remote control of the drying machine 300 may also be activated only when the door 302 of the drying machine 300 is closed. When the remote control of the drying machine 300 is activated, the door 302 of the drying machine 300 may be locked.

Accordingly, when the door 102 of the washing machine 100 is open or the door 302 of the drying machine 300 is open, the remote control of the washing machine 100 and the drying machine 300 is not activated. In other words, when either of the door 102 of the washing machine 100 and the door 302 of the drying machine 300 is open, the remote control of the washing machine 100 and the drying machine 300 is not activated.

In addition, in order to guide the closing of the door 102, the controller 190 of the washing machine 100 may display a message inducing the closing of the door 102 on the control panel 110. For example, as illustrated in FIG. 22, the controller 190 may display an image message stating "Execute remote control after closing the door" on the display panel 251.

The washing machine 100 may transmit a message display request for door closing to the drying machine 300, and the drying machine 300 may receive the message display request from the washing machine 100 (1555).

The controller 190 of the washing machine 100 may determine whether it is connected to the drying machine 300. When it is determined that it is connected to the drying machine 300, the controller 190 may request to display a message for closing the door.

In response to the request of the washing machine 100, the drying machine 300 may display a message for closing the door (1560).

In order to guide the closing of the door 102, the controller 390 of the drying machine 300 may display a message on the control panel 310 to induce closing the door 302. For example, as illustrated in FIG. 22, the controller 390 may display the image message stating "Execute remote control after closing the door" on the display panel 451.

As described above, only in the state in which the door 102 of the washing machine 100 and the door 302 of the drying machine 300 are both closed, the washing machine 100 and the drying machine 300 may activate the remote control. Thereby, the safety accident due to activation of the remote control while the door 102 of the washing machine 100 or the door 302 of the drying machine 300 is open may be prevented.

In addition, when the remote control of the washing machine 100 and the drying machine 300 is activated, the door 102 of the washing machine 100 and the door 302 of the drying machine 300 may be locked. Thereby, the safety accident due to opening of the door 102 of the washing machine 100 or the door 302 of the drying machine 300 after the remote control may be prevented.

Figure 23:
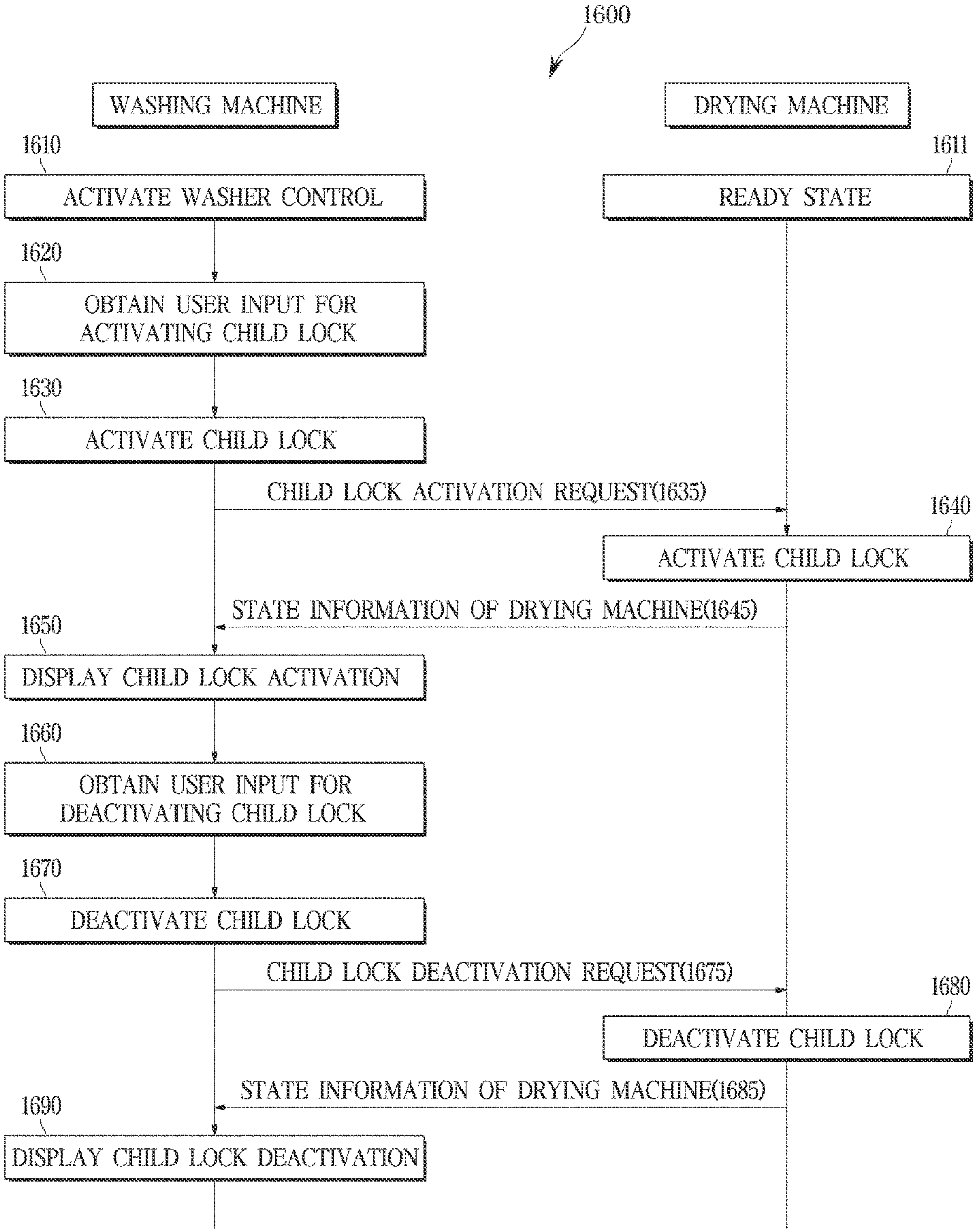
FIG. 23 is a view illustrating a method of activating a child lock of a washing machine and a drying machine according to an embodiment of the disclosure.
Figure 24:
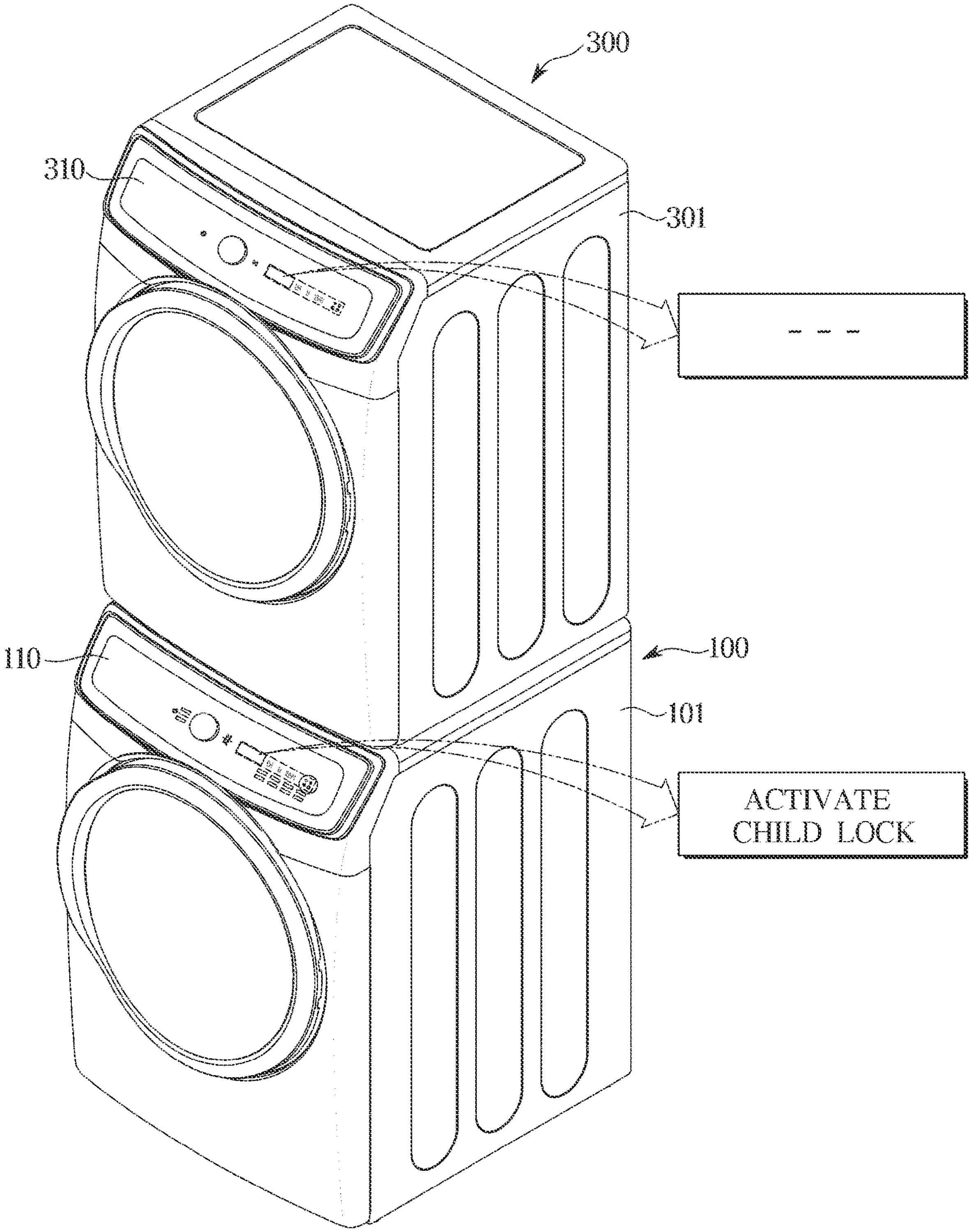
FIG. 24 is a view illustrating that a washing machine displays activation of a child lock of the washing machine and a drying machine according to an embodiment of the disclosure.

FIG. 23 is a view illustrating a method of activating a child lock of a washing machine and a drying machine according to an embodiment of the disclosure. FIG. 24 is a view illustrating that a washing machine displays activation of a child lock of the washing machine and a drying machine according to an embodiment of the disclosure.

Referring to FIGS. 23 and 24, a method 1600 of activating the child lock of the washing machine 100 and drying machine 300 will be described.

The washing machine 100 may activate the washer control (1610), and the drying machine 300 is in the 'ready state' (1611).

Operations 1610 and 1611 may be the same as operations 1310 and 1311 illustrated in FIG. 19.

The washing machine 100 may obtain the user input for activating the child lock (1620).

The additional function button 282 for obtaining the user input for activating selection of the additional function including the child lock may be provided on the control panel 110 of the washing machine 100. The user may input the user input for activating selection of the additional function by touching the additional function button 282, and may input the user input for selecting the additional function to be activated among the plurality of additional functions by rotating the dial 241.

The controller 190 of the washing machine 100 may obtain the user input for activating the child lock of the washing machine 100 and/or the drying machine 300 through the additional function button 282 and the dial 241.

The washing machine 100 may activate the child lock in response to the user input for activation of the child lock (1630).

The controller 190 of the washing machine 100 may block obtaining the user input by the control panel 110. For example, obtaining the user input by touching the buttons 211, 221, 222, 231, 232, 261, 262, 263, 281, and 282 of the control panel 110 and rotating the dial 241 may be blocked. Further, the buttons 221, 222, 231, 232, 261, 262, 263, and 281 of the control panel 110 may not emit light. However, the additional function button 282, which obtains the user input for deactivation of the child lock, is activated and may emit light.

The washing machine 100 may transmit a child lock activation request to the drying machine 300, and the drying machine 300 may receive the child lock activation request from the washing machine 300 (1635).

The controller 190 of the washing machine 100 may transmit the request for activation of the child lock of the drying machine 300 regardless of whether the washing machine 100 has activated the washer control or the dryer control.

Operation 1635 may be similar to operation 1015 illustrated in FIG. 14.

The drying machine 300 may activate the child lock in response to receiving the request for activation of the child lock (1640).

The controller 390 of the drying machine 300 may block the obtaining the user input by the control panel 310. For example, the obtaining the user input by touching the buttons 411, 431, 461, 462, 463, 481, and 482 of the control panel 310 and rotating the dial 441 may be blocked. Also, the buttons 411, 431, 461, 462, 463, 481, and 482 of the control panel 310 may not emit light. However, the additional function button 482 for obtaining the user input for deactivating the child lock of the drying machine 300 may be activated.

The drying machine 300 may transmit the state information in which the child lock is activated to the washing machine 100, and the washing machine 100 may receive the state information of the drying machine 300 (1645).

The controller 390 of the drying machine 300 may transmit the state information of the drying machine 100 on which the child lock is activated to the washing machine 100, and the controller 190 of the washing machine 100 may obtain information about activation of the child lock of the drying machine 300 through the communication circuitry 180 and store the activation of the child lock of the drying machine 300.

The washing machine 100 may display the activation of the child lock of the washing machine 100 (1650).

The controller 190 of the washing machine 100 may display the activation of the child lock of the washing machine 100 through the control panel 110.

For example, the controller 190 may control the control panel 110 to display the message indicating activation of the child lock on the display panel 251 as illustrated in FIG. 24. In FIG. 24, since the drying machine 300 is in the 'ready state', the message indicating activation of the child lock may not be displayed.

The washing machine 100 may obtain the user input for deactivation of the child lock (1660).

The user may input the user input for activating selection of the additional function by touching the additional function button 282, select the child lock among the plurality of additional functions by rotating the dial 241, and input the user input for deactivating the child lock.

The controller 190 of the washing machine 100 may obtain the user input for deactivating the child lock of the washing machine 100 and/or the drying machine 300 through the additional function button 282 and the dial 241.

The washing machine 100 may deactivate the child lock in response to the user input for deactivation of the child lock (1670).

The controller 190 of the washing machine 100 may permit acquisition of the user input through the control panel 110.

The washing machine 100 may transmit a child lock deactivation request to the drying machine 300, and the drying machine 300 may receive the child lock deactivation request from the washing machine 300 (1675).

In response to receiving the child lock deactivation request, the drying machine 300 may deactivate the child lock (1680).

The controller 390 of the drying machine 300 may allow acquisition of the user input through the control panel 310.

The drying machine 300 may transmit the state information in which the child lock is deactivated to the washing machine 100, and the washing machine 100 may receive the state information of the drying machine 300 (1685).

The washing machine 100 may display the deactivation of the child lock (1690).

The controller 190 of the washing machine 100 may display the deactivation of the child lock through the display panel 251 of the control panel 110.

As described above, the user may input the user input for activating or deactivating the child lock, that is, the common function of both the washing machine 100 and the drying machine 300 by touching one button provided on the washing machine 100.

By activating the child lock of both the washing machine 100 and the drying machine 300 through one button, the washing machine 100 and the drying machine 300 may satisfy the need of the user who wants to simultaneously control the common functions of the washing machine 100 and the drying machine 300 and provide the convenience to the user.

Figure 25:
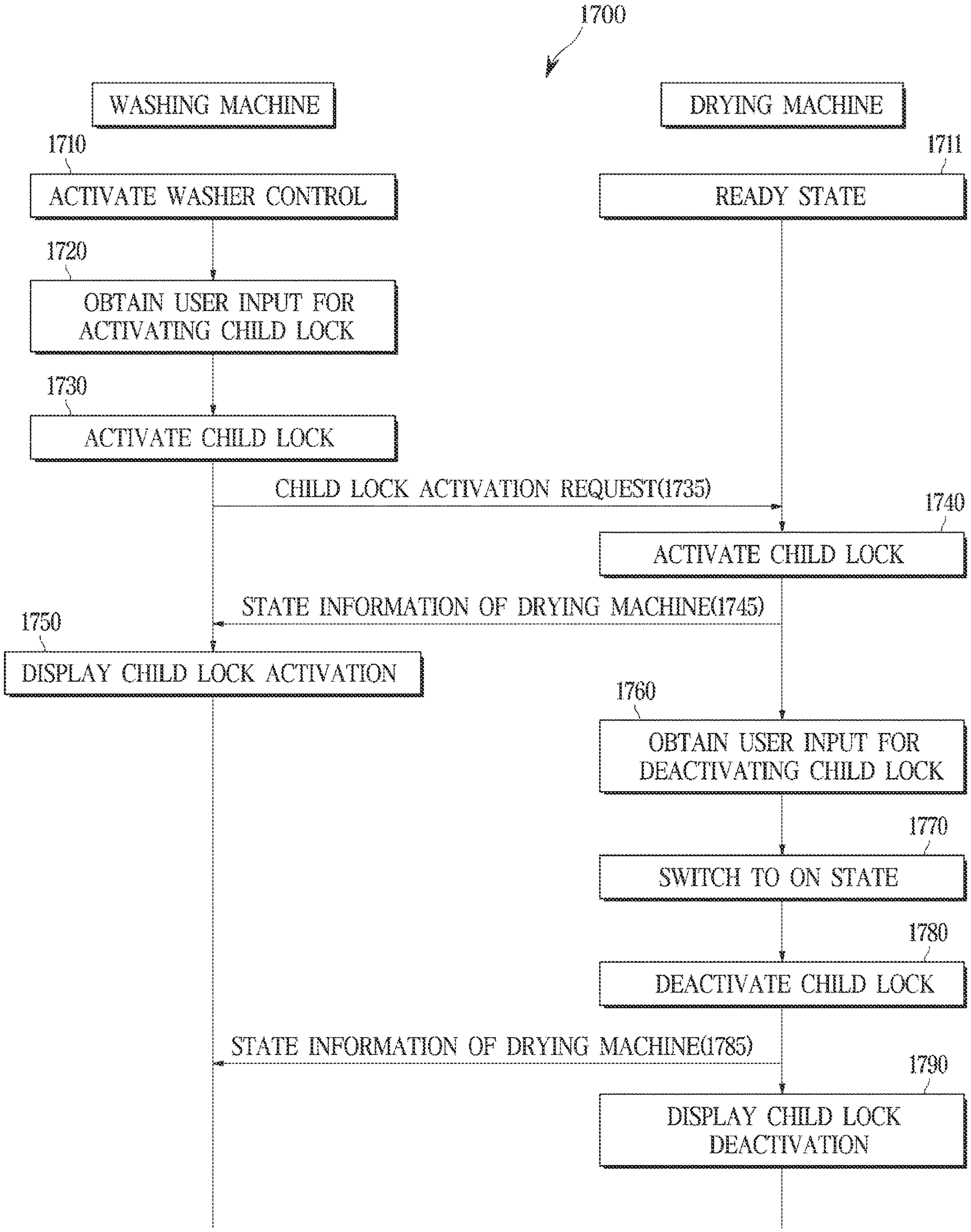
FIG. 25 is a view illustrating a method of activating a child lock of a washing machine and a drying machine according to an embodiment of the disclosure.
Figure 26:
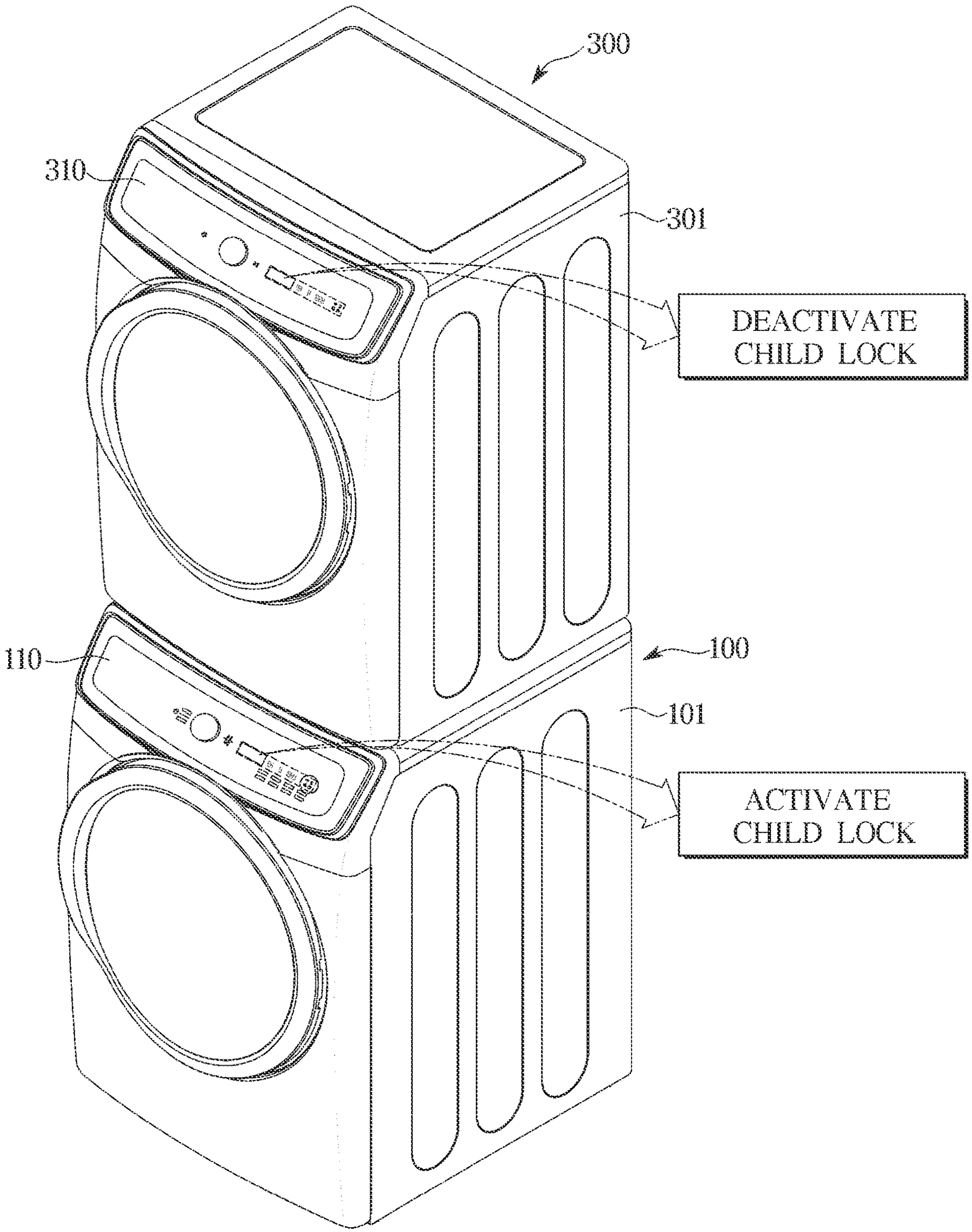
FIG. 26 is a view illustrating that a washing machine displays activation of a child lock of the washing machine and a drying machine according to an embodiment of the disclosure.

FIG. 25 is a view illustrating a method of activating a child lock of a washing machine and a drying machine according to an embodiment of the disclosure. FIG. 26 is a view illustrating that a washing machine displays activation of a child lock of the washing machine and a drying machine according to an embodiment of the disclosure.

Referring to FIGS. 25 and 26, a method 1700 of activating the child lock of the washing machine 100 and drying machine 300 will be described.

The washing machine 100 may activate the washer control (1710), and the drying machine 300 is in the 'ready state' (1711).

Operations 1710 and 1711 may be the same as operations 1310 and 1311 illustrated in FIG. 19.

The washing machine 100 may obtain the user input for activating the child lock (1720), activate the child lock in response to the user input for activation of the child lock (1730), and transmit the child lock activation request to the drying machine 300 (1735). The drying machine 300 may receive the child lock activation request from the washing machine 300 (1735), activate the child lock in response to receiving the child lock activation request (1740), and transmit the state information in which the child lock is activated to the washing machine 100 (1745). The washing machine 100 may receive the state information of the drying machine 300 (1745), and display the activation of the child lock of the washing machine 100 (1750).

Operation 1720, operation 1730, operation 1735, operation 1740, operation 1745, and operation 1750 may be the same as operation 1620, operation 1630, operation 1635, operation 1640, operation 1645 and operation 1650 illustrated in FIG. 23.

The drying machine 300 may obtain the user input for deactivation of the child lock (1760).

The control panel 310 of the drying machine 300 may be provided with the additional function button 482 for obtaining the user input for activating selection of the additional function including the child lock. The user may input the user input for activating selection of the additional function by touching the additional function button 482, and may input the user input for selecting the additional function to be activated or deactivated among the plurality of additional functions by rotating the dial 441.

The controller 390 of the drying machine 300 may obtain the user input for deactivating the child lock of the drying machine 300 through the additional function button 482 and the dial 441.

In response to the user input for deactivation of the child lock, the drying machine 300 may switch to the 'on state' (1770) and deactivate the child lock (1780).

In response to the user's touch input, the drying machine 300 may switch from the 'ready state' to the 'on state', and the displays 451, 471, 472, 473, and 491 of the control panel 310 may be turned on.

Further, the controller 390 of the drying machine 300 may allow acquisition of the user input through the control panel 310.

The drying machine 300 may transmit the state information in which the child lock is deactivated to the washing machine 100, and the washing machine 100 may receive the state information of the drying machine 300 (1785).

The drying machine 300 may display the inactivation of the child lock (1790).

The controller 390 of the drying machine 300 may display the inactivation of the child lock through the control panel 310.

For example, the controller 390 may control the control panel 310 to display a message indicating deactivation of the child lock on the display panel 451 as illustrated in FIG. 26. In FIG. 26, the washing machine 100 may display the activation of the child lock.

As described above, the user may input the user input for activating or deactivating the child lock of the drying machine 300 by touching the button provided on the drying machine 300.

By allowing the drying machine 300 to selectively activate or deactivate the child lock, the washing machine 100 and the drying machine 300 may satisfy the need of the user who wants to separately control the drying machine 300 and provide the convenience to the user.

Figure 27:
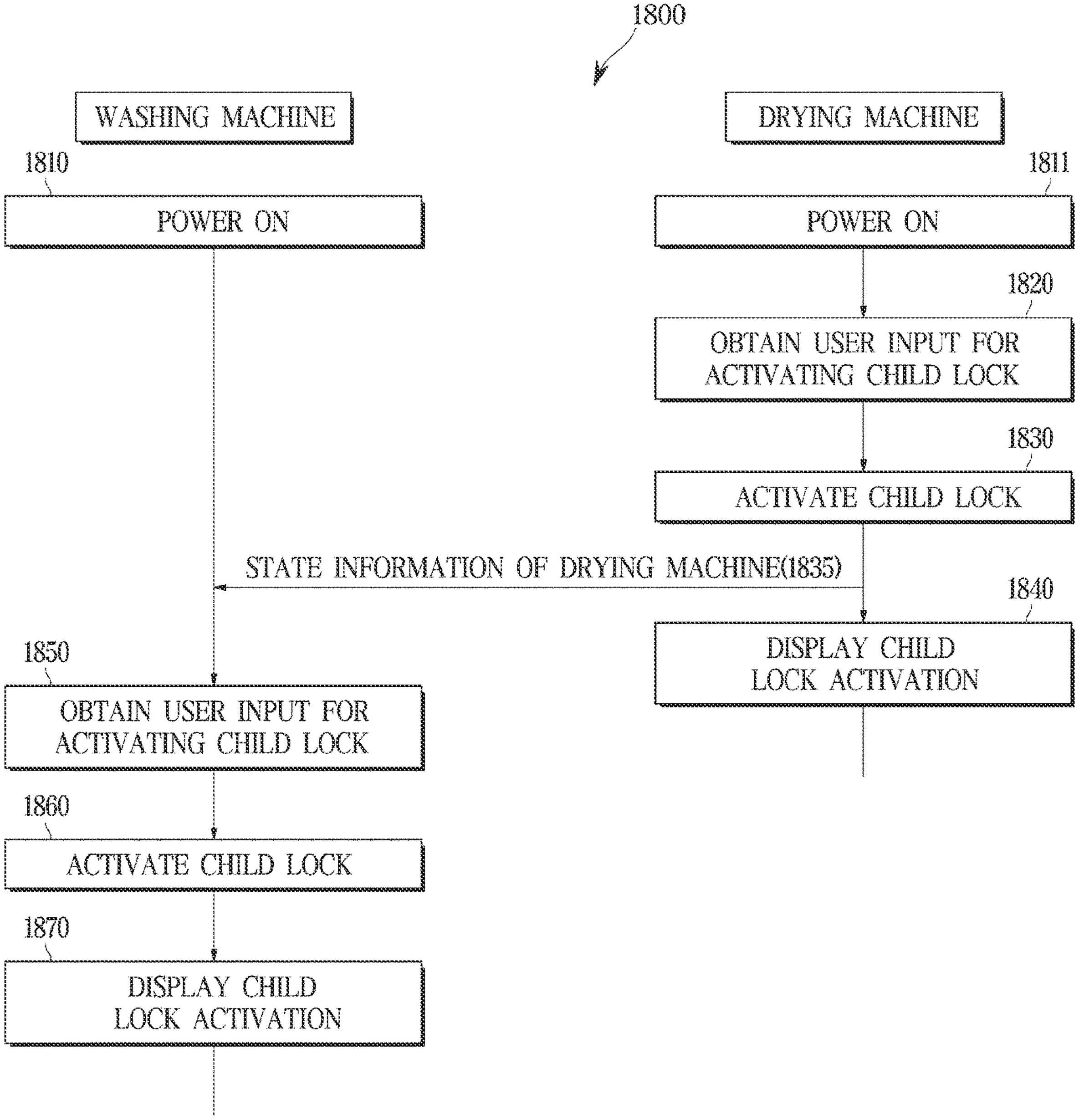
FIG. 27 is a view illustrating a method of activating a child lock of a washing machine and a drying machine according to an embodiment of the disclosure.

FIG. 27 is a view illustrating a method of activating a child lock of a washing machine and a drying machine according to an embodiment of the disclosure.

Referring to FIG. 27, a method 1800 of activating the child lock of the washing machine 100 and drying machine 300 will be described.

The washing machine 100 may be powered on (1810), and the drying machine 300 may be powered on (1811).

Operations 1810 and 1811 may be the same as operations 1110 and 1111 illustrated in FIG. 15.

The drying machine 300 may obtain the user input for activation of the child lock (1820).

The controller 390 of the drying machine 300 may obtain the user input for activating the child lock of the drying machine 300 through the additional function button 482 and the dial 441.

In response to the user input for activation of the child lock, the child lock may be activated (1830).

The controller 390 of the drying machine 300 may block acquisition of the user input through the control panel 310. However, the additional function button 482 for obtaining the user input for deactivating the child lock of the drying machine 300 may be activated.

The drying machine 300 may transmit the state information on which the child lock is activated to the washing machine 100, and the washing machine 100 may receive the state information of the drying machine 300 (1835).

The controller 190 of the washing machine 100 may obtain and store the state information including activation of the child lock of the drying machine 300.

The drying machine 300 may display the activation of the child lock (1840).

The controller 390 of the drying machine 300 may display the inactivation of the child lock through the control panel 310. In addition, the controller 390 may turn off the buttons 431, 461, 462, 463 and 481 of the control panel 310.

After the child lock of the drying machine 300 is activated, the washing machine 100 may obtain the user input for activation of the child lock (1850), and in response to the user input for activation of the child lock, the child lock may be activated (1860).

Operation 1850 and operation 1860 may be the same as operation 1620 and operation 1630 illustrated in FIG. 23.

The washing machine 100 may display the activation of the child lock (1870).

The controller 190 of the washing machine 100 may identify the activation of the child lock of the drying machine 300 based on the state information of the drying machine 300.

Accordingly, the controller 190 may display the activation of the child lock on the control panel 110 without transmitting the request for activating the child lock to the drying machine 300.

As described above, the drying machine 300 may activate or deactivate the child lock independently from the operation of the washing machine 100 in response to the user input. In addition, the washing machine 100 may transmit the request to activate or deactivate the child lock to the drying machine 300 based on the state information of the drying machine 300.

Figure 28:
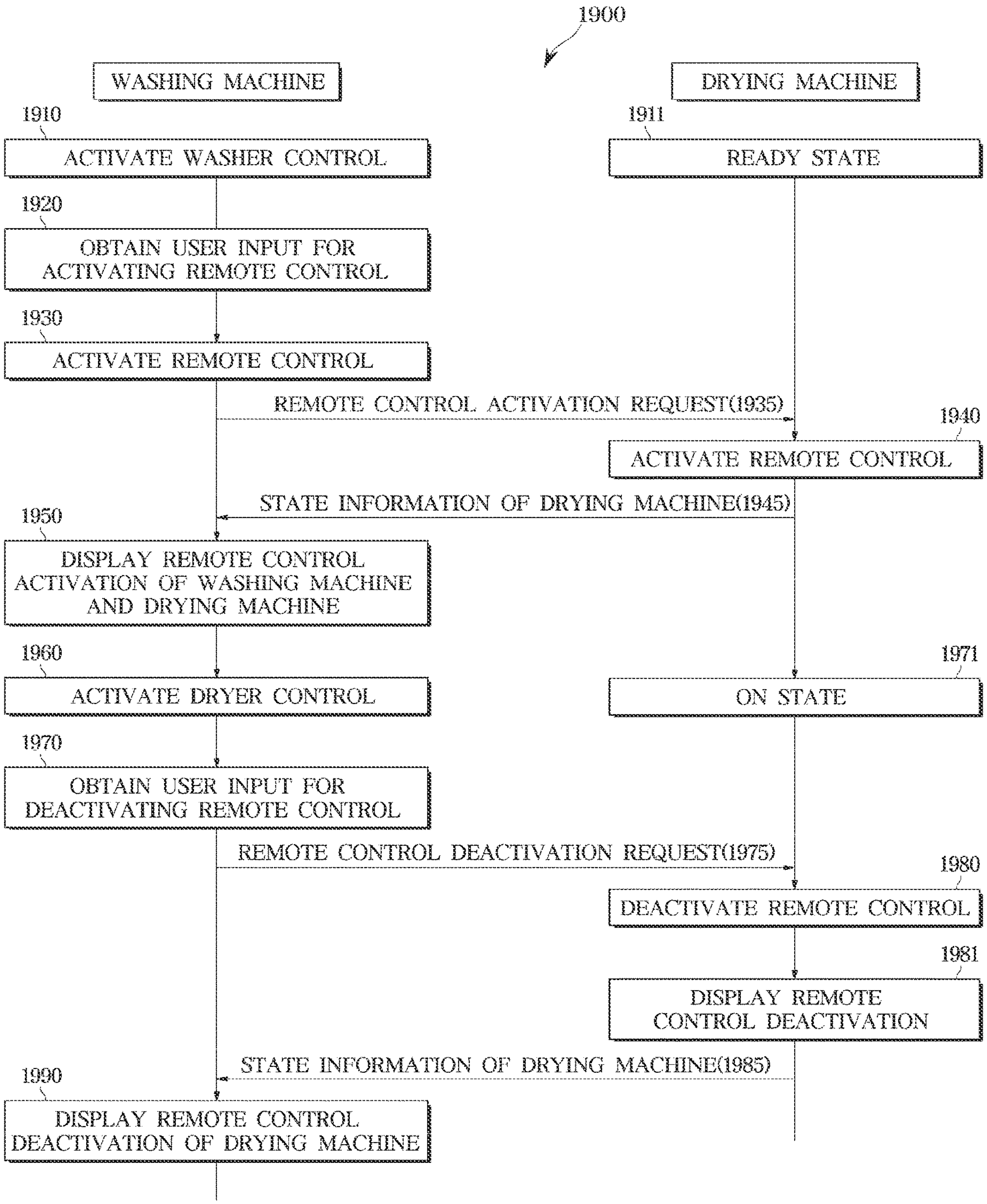
FIG. 28 is a view illustrating a method of activating remote control of a washing machine and a drying machine according to an embodiment of the disclosure.

FIG. 28 is a view illustrating a method of activating remote control of a washing machine and a drying machine according to an embodiment of the disclosure.

Referring to FIG. 28, a method 1900 of activating the remote control of the washing machine 100 and the drying machine 300 will be described.

The washing machine 100 may be activated with the washer control (1910), and the drying machine 300 is in the 'ready state' (1911).

Operations 1910 and 1911 may be the same as operations 1310 and 1311 illustrated in FIG. 19.

The washing machine 100 may obtain the user input for activation of the remote control (1920), activate the remote control in response to the user input for activation of the remote control (1930), and transmit the remote control activation request to the drying machine 300 (1935). The drying machine 300 may receive the remote control activation request from the washing machine 300 (1935), activate the remote control in response to receiving the remote control activation request (1940), and transmit the state information on which the remote control is activated to the washing machine 100 (1945). The washing machine 100 may receive the state information of the drying machine 300 (1945), and display the remote control activation of the washing machine 100 and the drying machine 300 (1950).

Operation 1920, operation 1930, operation 1935, operation 1940, operation 1945, and operation 1950 may be the same as operation 1120, operation 1130, operation 1135, operation 1140, operation 1145 and operation 1150 illustrated in FIG. 15.

When the dryer control of the washing machine 100 is activated (1960), the drying machine 300 may be turned on (1971).

For example, the washing machine 100 may activate the dryer control in response to the user input for mode switching while the washer control is activated. When the dryer control is activated, the controller 190 of the washing machine 100 may display the information of the drying machine 300 on the control panel 110 and obtain the user input for the drying machine 300 through the control panel 110.

The drying machine 300 may be switched from the 'ready state' to the 'on state' in response to the request from the washing machine 100. In the 'on state', both the controller 390 of the drying machine 300 and the touch sensors and displays of the control panel 310 may be activated.

The washing machine 100 may obtain the user input for deactivation of the remote control (1970).

Operation 1970 may be the same as operation 1160 of FIG. 15.

The washing machine 100 may transmit the remote control deactivation request to the drying machine 300 and the drying machine 300 may receive the remote control deactivation request from the washing machine 300 (1975).

When the washing machine 100 obtains the user input for deactivation of the remote control while the dryer control is activated, the washing machine 100 only transmits the remote control deactivation request to the drying machine 300 and may not deactivate the remote control of the washing machine 100.

In response to receiving the request for deactivation of the remote control, the drying machine 300 may deactivate the remote control (1980).

The controller 390 of the drying machine 300 may block the remote control of the drying machine 300 by the external device (e.g., the user device).

The drying machine 300 may display the remote control deactivation of the drying machine 300 (1981).

The controller 390 of the drying machine 300 may display deactivation of the remote control of the drying machine 300 through the control panel 310.

The drying machine 300 may transmit the state information on which the remote control is activated to the washing machine 100, and the washing machine 100 may receive the state information of the drying machine 300 (1985).

The washing machine 100 may display the remote control deactivation of the drying machine 300 (1990).

The controller 190 of the washing machine 100 may display the deactivation of the remote control of the drying machine 300 through the control panel 110.

As described above, in response to the user input for activating or deactivating the remote control while the washer control of the washing machine 100 is activated, the washing machine 100 may activate or deactivate the remote control of both the washing machine 100 and the drying machine 300. In addition, in response to the user input for activating or deactivating the remote control while the dryer control of the washing machine 100 is activated, the washing machine 100 may only activate or deactivate the remote control of the drying machine 300.

In addition, in response to the user input for activating or deactivating the remote control while the washer control of the washing machine 100 is activated, the washing machine 100 may only activate or deactivate the remote control of the washing machine 100. In addition, in response to the user input for activating or deactivating the remote control while the dryer control of the washing machine 100 is activated, the washing machine 100 may activate or deactivate the remote control of both the washing machine 100 and the drying machine 300.

Thereby, the user may activate the remote control of both the washing machine 100 and the drying machine 300 using the washing machine 100, or only activate the remote control of the drying machine 300. In addition, the washing machine 100 may allow the user to selectively control the washing machine 100 and the drying machine 300 for common functions of the washing machine 100 and the drying machine 300.

A washing machine according to an embodiment may include a communication circuitry configured to exchange data with an external device including a drying machine; a control panel including a dedicated button configured to obtain a user input for activating or deactivating a common function common with the drying machine; and a controller configured to, in response to obtaining the user input for activating the common function through the dedicated button, control the communication circuitry to activate the common function and transmit a communication signal for activating the common function to the drying machine.

As such, the washing machine may allow the user to activate both the common function of the washing machine and the common function of the drying machine through the control panel of the washing machine. Thereby, the user may activate the common functions of both the washing machine and the drying machine in a single operation.

The common function may include a remote control by the external device. The controller may be configured to, in response to obtaining the user input through the dedicated button, activate the remote control and control the communication circuitry to transmit a communication signal for activating the remote control to the drying machine.

As such, the washing machine may allow the user to activate both the remote control of the washing machine and the remote control of the drying machine through the control panel of the washing machine. Thereby, the user may activate the remote control of both the washing machine and the drying machine in a single operation.

The controller may be further configured to, based on identifying that at least one of a door of the washing machine or a door of the drying machine is opened, maintain deactivation of the common function.

The washing machine may further include a door switch configured to output an open signal indicating that the door of the washing machine is opened or a closing signal indicating that the door is closed. The controller may be further configured to, based on obtaining the open signal from the door switch, maintain the deactivation of the common function.

The controller may be further configured to, based on receiving a communication signal indicating that the door of the drying machine is opened through the communication circuitry, maintain the deactivation of the common function.

As such, the washing machine may not activate the common function in the state in which the door of either the washing machine or the drying machine is opened. Thereby, it is possible to prevent the safety accident due to the operation of the washing machine or the drying machine while the door of the washing machine or the door of the drying machine is opened.

The controller may be further configured to, based on identifying that at least one of a door of the washing machine or a door of the drying machine is opened, control the control panel to display an image message inducing to close the door of the washing machine, and control the communication circuitry to transmit a communication signal for displaying an image message inducing to close the door of the drying machine to the drying machine.

As such, the washing machine may induce the user to close the door of the washing machine and the door of the drying machine in order to activate the common function of the washing machine and the drying machine. Thereby, it is possible to minimize the inconvenience that the user cannot activate the common functions of the washing machine and the drying machine.

The controller may be configured to, in response to obtaining the user input through the dedicated button, control the control panel to display a first indicator indicating activation of the common function of the washing machine and a second indicator indicating activation of the common function of the drying machine.

The controller may be configured to, in response to receiving a communication signal indicating that the common function of the drying machine is deactivated, control the control panel to turn off the second indicator.

As such, the washing machine may guide the user that the common function of the washing machine and the drying machine is activated. Thereby, the user may identify whether the common function of the washing machine and the drying machine is activated through the control panel of the washing machine.

According to an aspect of the disclosure, there is provided the washing machine capable of controlling a drying machine using a control panel of the washing machine, and the method of controlling the washing machine. Thereby, even if the drying machine is installed on the washing machine, the user may operate the drying machine without inconvenience.

According to another aspect of the disclosure, there is provided the washing machine capable of integrating a menu (or input button) for controlling common functions of the washing machine and a drying machine, and a method of controlling the washing machine. Thereby, in order to activate the common functions of the washing machine and the drying machine, the user may control both the washing machine and the drying machine through the integrated menu (input button) without having to operate the washing machine and the drying machine separately.

Embodiments of the disclosure have been described above. In the embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Further, as only an example, the processing element could include at least one processor or at least one computer processor, and processing elements may be distributed and/or included in a single device.

While embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A washing machine comprising:
- a communication circuitry configured to exchange data with an external device including a drying machine;
- a control panel including a dedicated button configured to obtain a user input for activating or deactivating a common function common with the drying machine; and
- at least one processor configured to:
  - in response to obtaining the user input for activating the common function through the dedicated button,
    - activate the common function, and
    - control the communication circuitry to transmit a communication signal for activating the common function to the drying machine, and
  - in response to identifying that at least one of a door of the washing machine or a door of the drying machine is opened, maintain deactivation of the common function.

2. The washing machine according to claim 1,
- wherein the common function comprises a remote control by the external device; and
- wherein the at least one processor is further configured to, in response to obtaining the user input through the dedicated button:
  - activate the remote control, and
  - control the communication circuitry to transmit a communication signal for activating the remote control to the drying machine.

3. The washing machine according to claim 1, further comprising:

a door switch configured to output:

an open signal indicating that the door of the washing machine is opened, or a closing signal indicating that the door is closed, wherein the at least one processor is further configured to, based on obtaining the open signal from the door switch, maintain the deactivation of the common function.

4. The washing machine according to claim 1, wherein the at least one processor is further configured to, based on receiving a communication signal indicating that the door of the drying machine is opened through the communication circuitry, maintain the deactivation of the common function.

5. The washing machine according to claim 1, wherein the at least one processor is further configured to, based on identifying that at least one of a door of the washing machine or a door of the drying machine is opened:

control the control panel to display an image message inducing to close the door of the washing machine, and control the communication circuitry to transmit a communication signal for displaying an image message inducing to close the door of the drying machine to the drying machine.

6. The washing machine according to claim 1, wherein the at least one processor is further configured to, in response to obtaining the user input through the dedicated button, control the control panel to display:

a first indicator indicating activation of the common function of the washing machine, and a second indicator indicating activation of the common function of the drying machine.

7. The washing machine according to claim 6, wherein the at least one processor is further configured to, in response to receiving a communication signal indicating that the common function of the drying machine is deactivated, control the control panel to turn off the second indicator.

8. A method of controlling a washing machine operable to communicate with an external device including a drying machine, the method comprising:

in response to obtaining a user input through a dedicated button provided on a control panel of the washing machine and configured to obtain the user input for activating or deactivating a common function common with the drying machine, activating, by at least one processor, the common function; and in response to obtaining the user input through the dedicated button, controlling a communication circuitry to transmit a communication signal for activating the common function to the drying machine.

9. The method according to claim 8, wherein the common function comprises a remote control by the external device.

10. The method according to claim 9, further comprising:

based on identifying that at least one of a door of the washing machine or a door of the drying machine is opened, maintaining, by the at least one processor, deactivation of the common function.

11. The method according to claim 10, wherein the maintaining of the deactivation of the common function comprises:

based on obtaining an open signal indicating that the door of the washing machine is opened from a door switch of the washing machine, maintaining, by the at least one processor, the deactivation of the common function.

12. The method according to claim 10, wherein the maintaining of the deactivation of the common function comprises:

based on receiving a communication signal indicating that the door of the drying machine is opened from the drying machine, maintaining, by the at least one processor, the deactivation of the common function.

13. The washing machine according to claim 8, further comprising:

based on identifying that at least one of a door of the washing machine or a door of the drying machine is opened, displaying, by the at least one processor, an image message inducing to close the door of the washing machine and controlling the communication circuitry to transmit a communication signal for displaying an image message inducing to close the door of the drying machine to the drying machine.

14. The method according to claim 8, further comprising:

displaying, by the at least one processor, a first indicator indicating activation of the common function of the washing machine and a second indicator indicating activation of the common function of the drying machine.

15. A washing machine operable to communicate with an external device including a drying machine, the washing machine comprising:

a first control switch configured to obtain a user input for activating controlling the drying machine;

a second control switching configured to obtain a user input for activating controlling the washing machine;

a setting switch configured to:

obtain a user input for selecting a drying setting while controlling the drying machine is activated, and obtain a user input for selecting a washing setting while controlling the washing machine is activated; and a dedicated switch configured to obtain a user input for activating or deactivating a common function common with the drying machine.

16. The washing machine according to claim 15, further comprising:

at least one processor configured to, in response to obtaining the user input for activating the common function through a dedicated button:

activate the common function, and transmit a communication signal for activating the common function to the drying machine.

17. The washing machine according to claim 16, wherein the at least one processor is further configured to, based on identifying that at least one of a door of the washing machine or a door of the drying machine is opened, maintain deactivation of the common function.

18. The washing machine according to claim 16, wherein the at least one processor is further configured to, based on identifying that at least one of a door of the washing machine or a door of the drying machine is opened:

control a communication circuitry to transmit a communication signal for displaying an image message inducing to close the door of the washing machine, and control a display to display an image message inducing to close the door of the drying machine to the drying machine.

19. The washing machine according to claim 16, wherein the at least one processor is further configured to, in response to obtaining the user input through the dedicated button, display:

a first indicator indicating activation of the common function of the washing machine, and a second indicator indicating activation of the common function of the drying machine.

* * * * *